(12) United States Patent
Fricke et al.

(10) Patent No.: US 10,563,713 B2
(45) Date of Patent: *Feb. 18, 2020

(54) DISC BRAKE FOR A COMMERCIAL VEHICLE AND BRAKE PAD SET

(71) Applicant: KNORR-BREMSE Systeme fuer Nutzfahrzeuge GmbH, Munich (DE)

(72) Inventors: Jens Fricke, Vilshofen (DE); Abdelaziz Rguichi, Olching (DE); Thomas Eichler, Munich (DE); Oliver Krause, Wolfratshausen (DE); Matthias Klingner, Moorenweis (DE); Michael Peschel, Schoengeising (DE); Tobias Schoefberger, Mainburg (DE); Philipp Adamczyk, Stoettwang (DE); Manfred Schoenauer, Munich (DE); Martin Pleintinger, Eichendorf (DE); Markus Molnar, Fuerstenzell (DE); Franz Gasslbauer, Johanniskirchen (DE); Martin Tropp, Bad Birnbach (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,068

(22) Filed: Dec. 15, 2017

(65) Prior Publication Data
US 2018/0106313 A1  Apr. 19, 2018

Related U.S. Application Data

(63) Continuation of application No. PCT/EP2016/063594, filed on Jun. 14, 2016.

(30) Foreign Application Priority Data

Jun. 15, 2015 (DE) .................. 10 2015 109 540
Oct. 9, 2015 (DE) .................. 10 2015 117 285
Mar. 17, 2016 (DE) .................. 10 2016 104 970

(51) Int. Cl.
F16D 65/097 (2006.01)
F16D 55/226 (2006.01)
(Continued)

(52) U.S. Cl.
CPC ....... *F16D 55/226* (2013.01); *F16D 65/0068* (2013.01); *F16D 65/097* (2013.01);
(Continued)

(58) Field of Classification Search
CPC .............. F16D 65/097; F16D 65/0975; F16D 65/0976; F16D 65/0977; F16D 65/0978
(Continued)

(56) References Cited

U.S. PATENT DOCUMENTS 4,491,204 A * 1/1985 Dirauf ............... F16D 65/097
                                                    116/208
5,069,313 A * 12/1991 Kato ................. B60T 17/221
                                                    188/72.3
(Continued)

FOREIGN PATENT DOCUMENTS

CN   104235239 A      12/2014
DE      3023333 A1 *  1/1982   ......... F16D 65/0975
(Continued)

OTHER PUBLICATIONS

Chinese-language Office Action issued in counterpart Chinese Application No. 201680042229.9 dated Jan. 21, 2019 with English translation (17 pages).
(Continued)

*Primary Examiner* — Thomas W Irvin
(74) *Attorney, Agent, or Firm* — Crowell & Moring LLP

(57) ABSTRACT

A disc brake has a brake caliper, which reaches over a brake disc, is designed as a sliding caliper, is fastened to a
(Continued)

stationary brake bracket and has a central opening over the brake disc. Two brake pads, which are arranged in the brake caliper and can be moved in opposite directions each have a backing plate and a friction lining fastened thereto. An action-side brake pad can be pressed against the brake disc by an application device by way of at least one brake piston. At least one restoring device is provided, by which the brake caliper can be returned after displacement and release of the brake caused by braking, wherein the restoring device has a spreading device, which acts on the brake pads lying opposite each other and acts in the same way against each particular application direction and has resilient spreading elements that act on the respective backing plates. The spreading device is arranged in the central opening, wherein the spreading elements act directly or indirectly outside of the friction linings on one side in the center region or at least two contact regions of the brake pads arranged at a distance from each other with respect to the center, wherein the contact regions each have a contact surface and a bearing surface, on which the spreading elements are movably arranged.

24 Claims, 46 Drawing Sheets

(51) Int. Cl.
  *F16D 65/18* (2006.01)
  *F16D 65/16* (2006.01)
  *F16D 65/54* (2006.01)
  *F16D 65/00* (2006.01)
  *F16D 55/00* (2006.01)
(52) U.S. Cl.
  CPC ......... *F16D 65/0977* (2013.01); *F16D 65/16* (2013.01); *F16D 65/183* (2013.01); *F16D 65/54* (2013.01); *F16D 2055/0029* (2013.01)
(58) Field of Classification Search
  USPC ........................................................ 188/72.3
  See application file for complete search history.

(56) References Cited

U.S. PATENT DOCUMENTS

| | | | | |
|---|---|---|---|---|
| 5,249,647 A * | 10/1993 | Kobayashi | ............ | F16D 65/092 188/72.3 |
| 5,310,024 A | 5/1994 | Takagi | | |
| 5,538,103 A | 7/1996 | Rueckert et al. | | |
| 5,549,181 A * | 8/1996 | Evans | .................. | F16D 65/097 188/216 |
| 6,378,665 B1 * | 4/2002 | McCormick | ........ | F16D 65/0975 188/72.3 |
| 6,719,105 B1 * | 4/2004 | Wemple | ................ | F16D 65/097 188/205 A |
| 6,920,965 B2 * | 7/2005 | Burgdorf | .............. | F16D 65/097 188/344 |
| 6,957,724 B2 * | 10/2005 | Gherardi | ............. | F16D 65/0975 188/73.38 |
| 8,393,441 B2 * | 3/2013 | Gutelius | ............. | F16D 65/0972 188/72.3 |
| 9,212,710 B2 * | 12/2015 | Asakura | ................ | F16D 65/097 |
| 9,422,992 B2 * | 8/2016 | Bach | .................... | F16D 65/0972 |
| 2008/0060888 A1 | 3/2008 | Arakawa | | |
| 2010/0000828 A1 | 1/2010 | Pericevic et al. | | |
| 2013/0025981 A1 * | 1/2013 | Maehara | ............... | F16D 55/227 188/72.3 |
| 2013/0256068 A1 * | 10/2013 | Hazeki | .................. | F16D 55/226 188/72.4 |
| 2014/0151166 A1 | 6/2014 | Tironi et al. | | |
| 2014/0339026 A1 | 11/2014 | Gutelius et al. | | |
| 2014/0367208 A1 | 12/2014 | Miyake et al. | | |
| 2015/0008078 A1 | 1/2015 | Asen et al. | | |
| 2018/0106308 A1 * | 4/2018 | Fricke | .................. | F16D 55/226 |
| 2018/0106309 A1 * | 4/2018 | Fricke | .................. | F16D 55/226 |

FOREIGN PATENT DOCUMENTS

| | | | | |
|---|---|---|---|---|
| DE | 43 01 621 A1 | 8/1993 | | |
| DE | 10 2007 001 213 A1 | 7/2008 | | |
| DE | 10 2009 009 567 A1 | 9/2009 | | |
| DE | 102008051236 A1 * | 4/2010 | ........... | F16D 55/228 |
| DE | 10 2012 006 111 A1 | 9/2013 | | |
| JP | 57-179435 A | 11/1982 | | |
| JP | 62-147736 U | 9/1987 | | |
| JP | 7-38771 U | 7/1995 | | |
| JP | 2000-104764 A | 4/2000 | | |
| JP | 2008-64232 A | 3/2008 | | |
| RU | 2 549 594 C2 | 4/2015 | | |
| WO | WO 96/08663 A1 | 3/1996 | | |

OTHER PUBLICATIONS

International Preliminary Report on Patentability (PCT/IB/373) issued in PCT Application No. PCT/EP2016/063594 dated Dec. 19, 2017 (one page).

International Search Report (PCT/ISA/210) issued in PCT Application No. PCT/EP2016/063594 dated Oct. 26, 2016 with English translation (eight pages).

German-language Written Opinion (PCT/ISA/237) issued in PCT Application No. PCT/EP2016/063594 dated Oct. 26, 2016 with English translation (14 pages).

Russian-language Office Action issued in counterpart Russian Application No. 2018100419/14(000533) dated Sep. 21, 2018 with English translation (18 pages).

Japanese Office Action issued in Japanese counterpart application No. 2017-564456 dated Jul. 3, 2019, with English translation (Fourteen (14) pages).

* cited by examiner

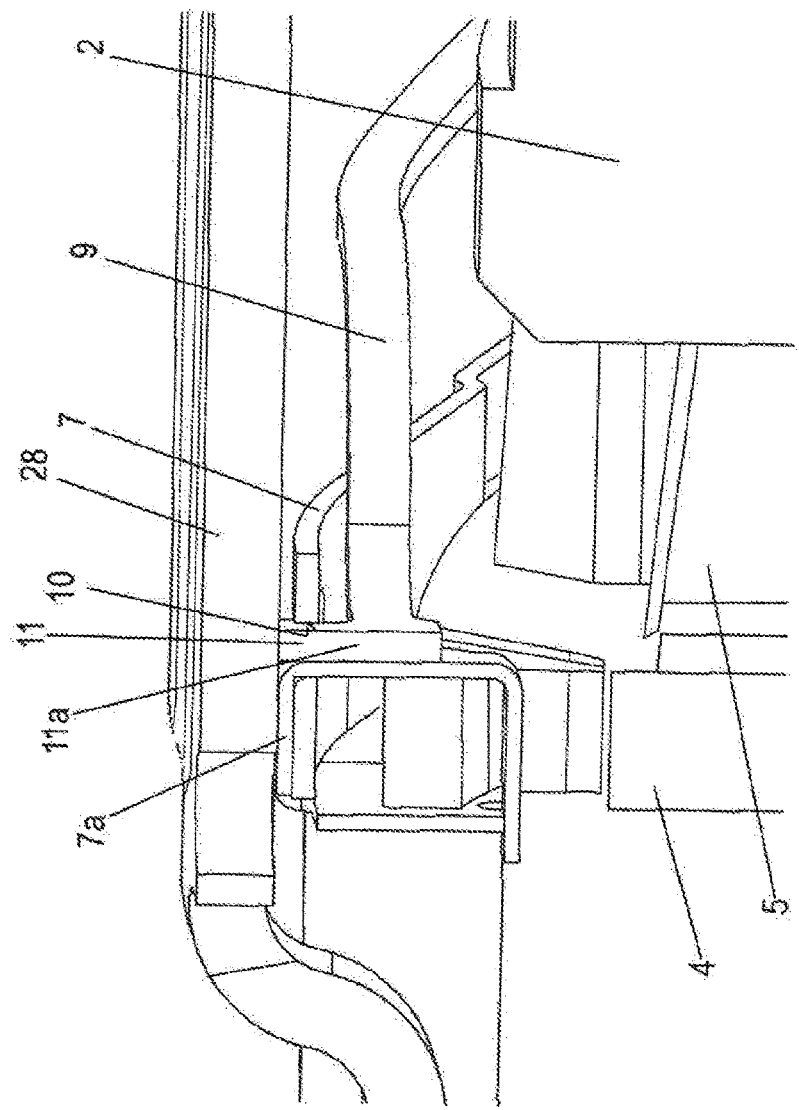

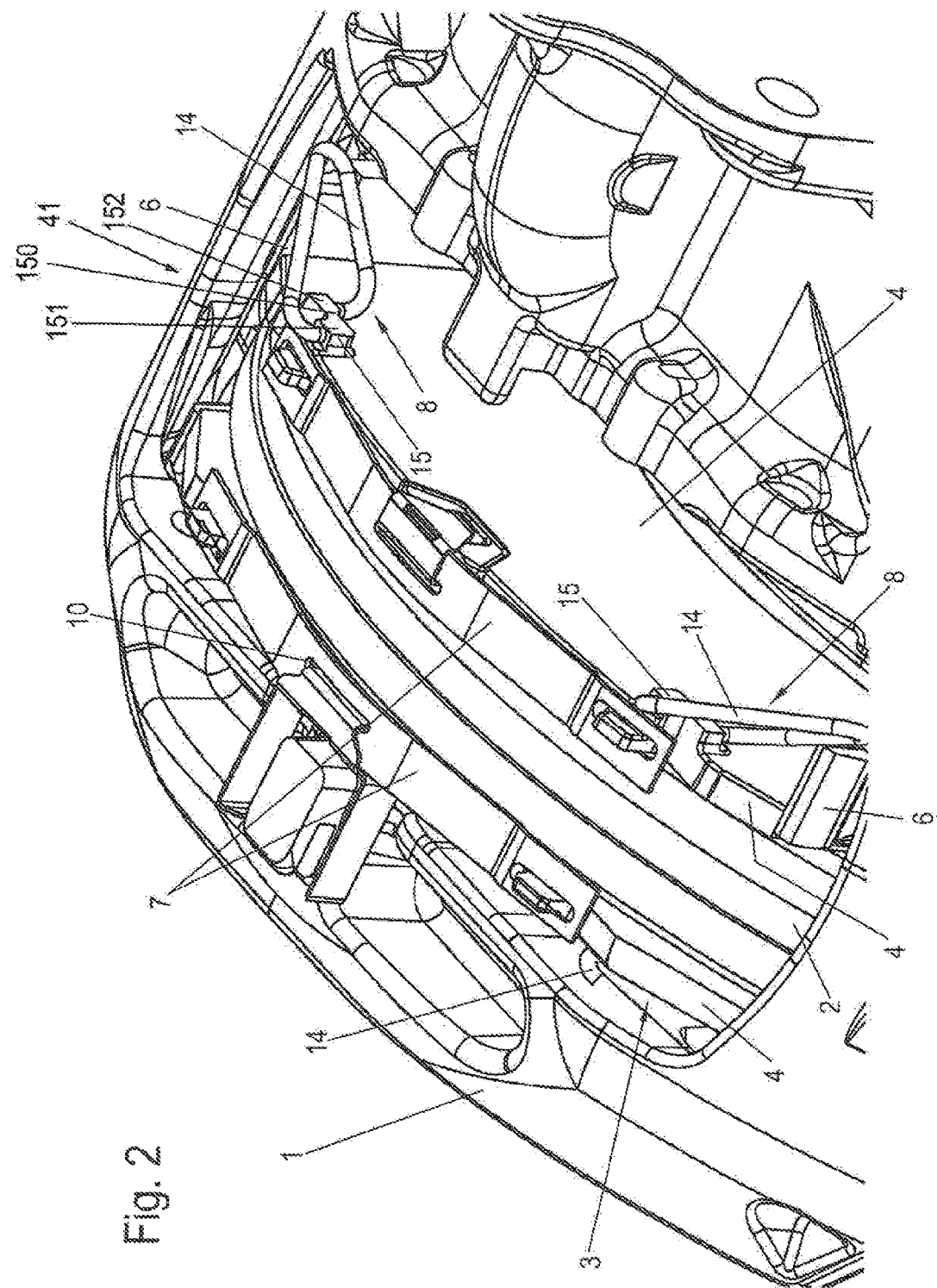

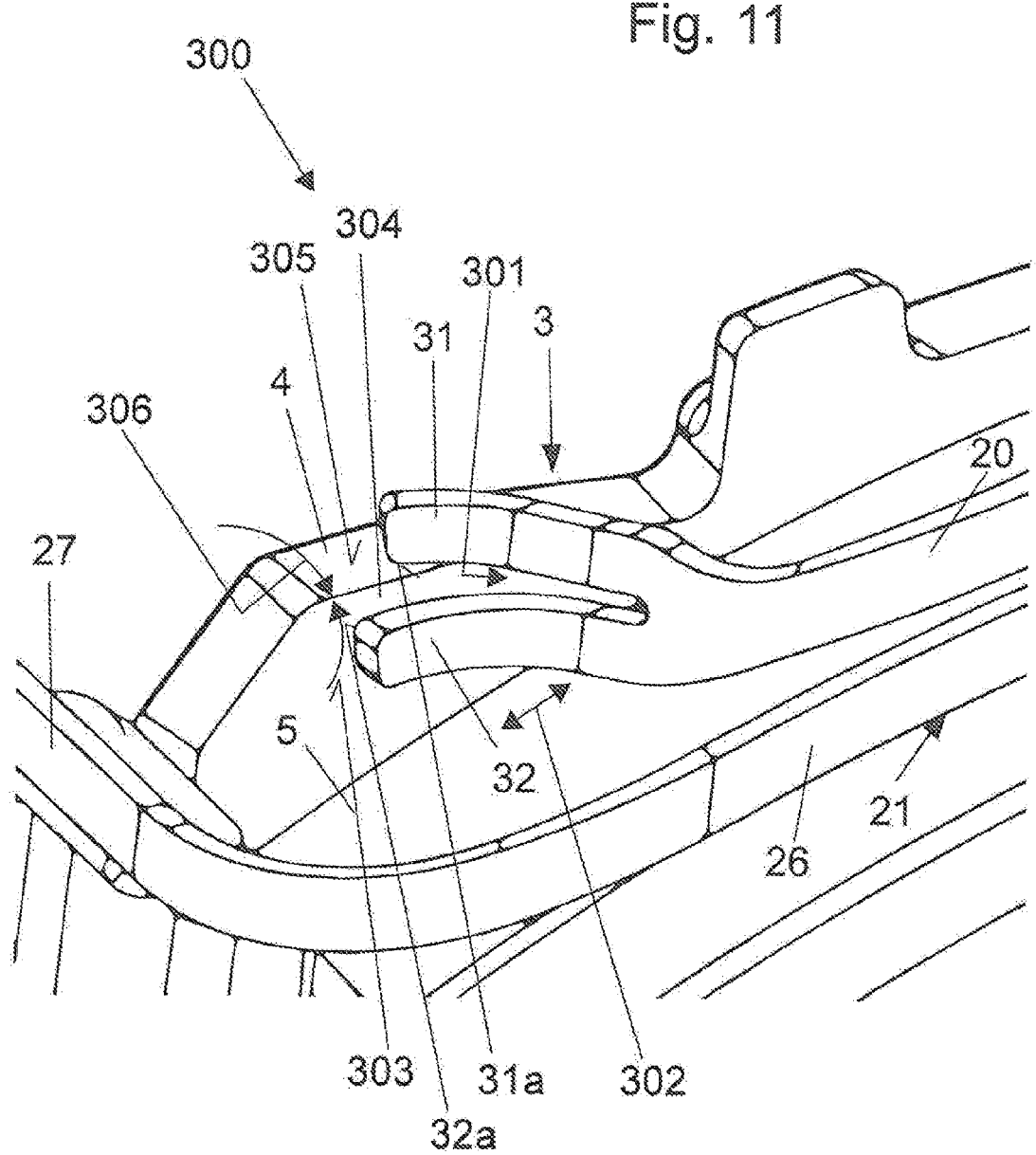

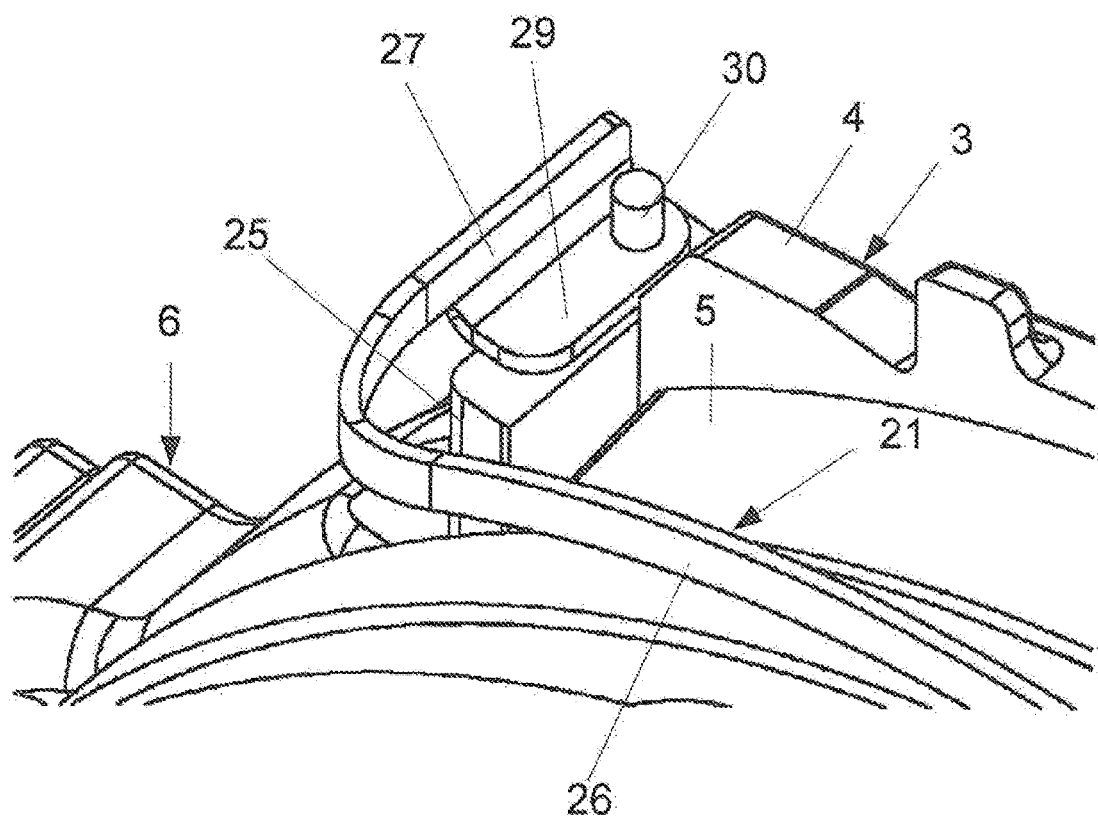

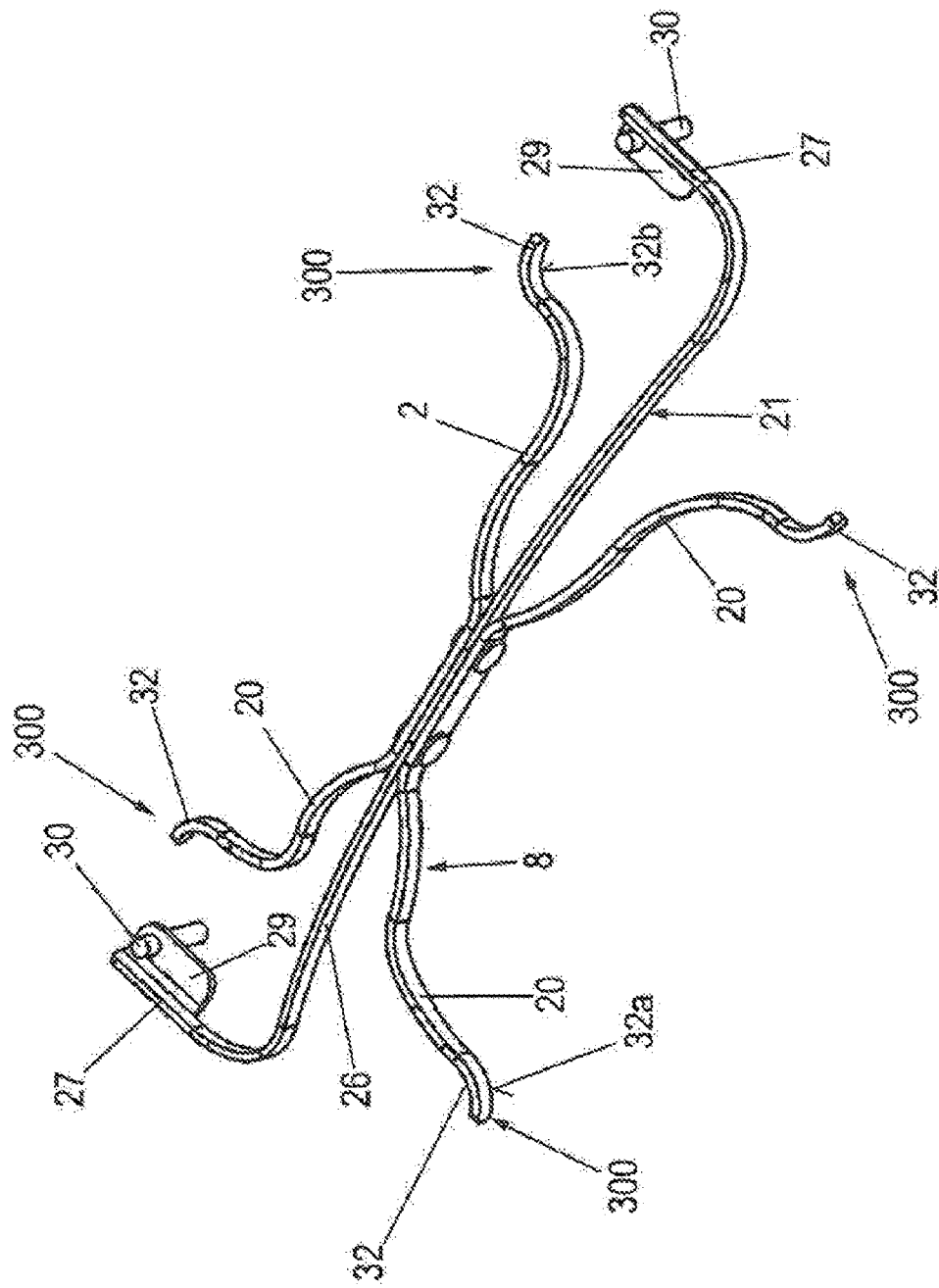

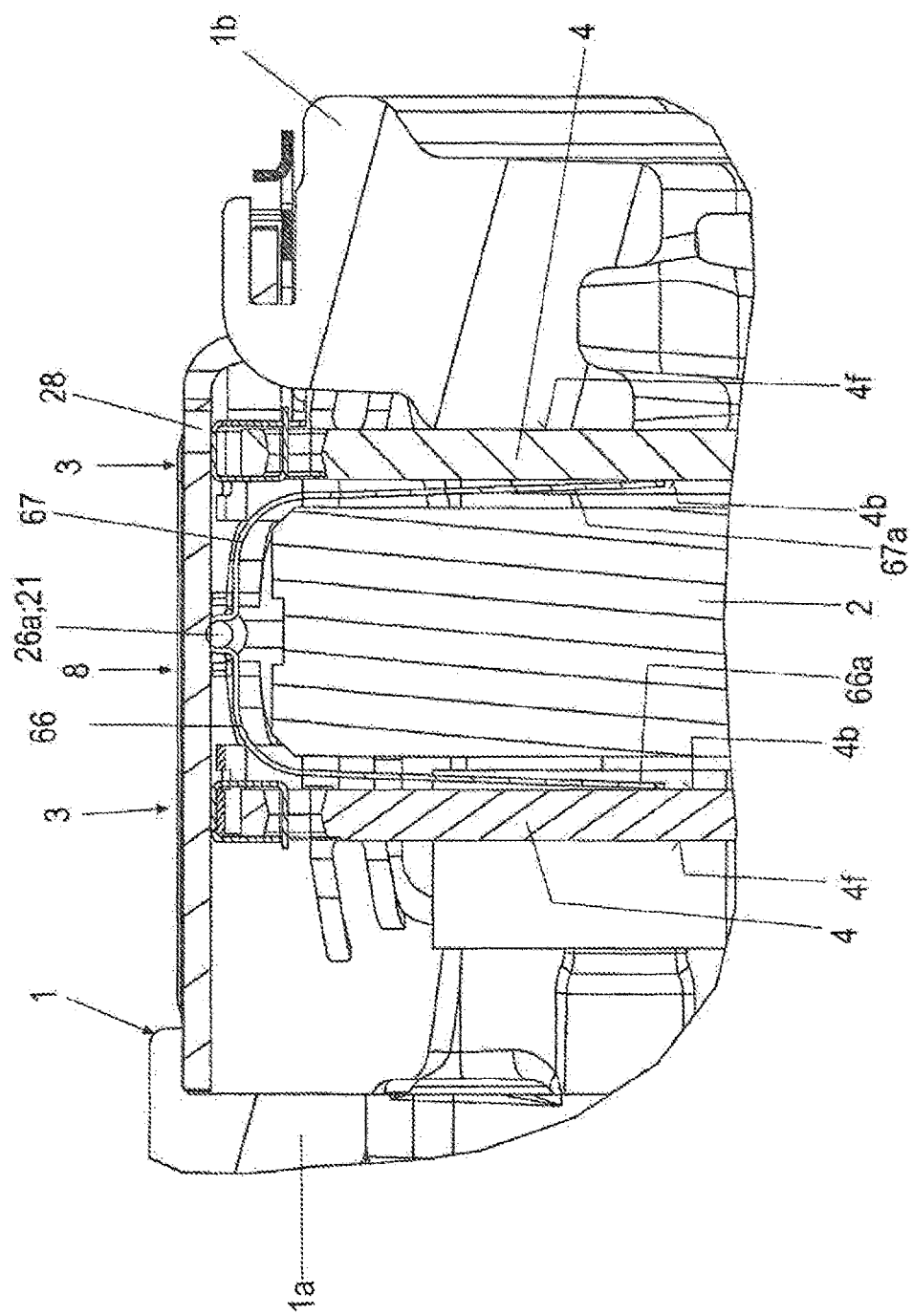

DISC BRAKE FOR A COMMERCIAL VEHICLE AND BRAKE PAD SET

CROSS REFERENCE TO RELATED APPLICATIONS

This application is a continuation of PCT International Application No. PCT/EP2016/063594, filed Jun. 14, 2016, which claims priority under 35 U.S.C. § 119 from German Patent Applications Nos. 10 2015 109 540.8, filed Jun. 15, 2015, 10 2015 117 285.2, filed Oct. 9, 2015, and 10 2016 104 970.0, filed Mar. 17, 2016, the entire disclosures of which are herein expressly incorporated by reference.

BACKGROUND AND SUMMARY OF THE INVENTION

The invention relates to a disc brake for a commercial vehicle as per the preamble of claim 1. The invention also relates to a brake pad set.

In the case of a generic disc brake, also known as a sliding-caliper brake, in a braking situation, an action-side brake pad is pressed against a vehicle-side brake disc by way of an application device, which is actuable pneumatically or by electric motor. During the further course of the braking process, the brake caliper is, relative to the brake disc, displaced counter to the application direction of the action-side brake pad, causing the opposite, reaction-side brake pad to be driven along and pressed against the other side of the brake disc.

In the case of the known disc brake, after a release of the brake, the brake caliper remains in said position, in which the brake pads, or at least the reaction-side brake pad, lies against the brake disc duly without pressure but with a rubbing action. The residual rubbing torques of the brake pads that thereby arise during driving operation have a disadvantageous effect because they lead to increased fuel consumption and to a reduction of the service life of the components involved, specifically of the brake disc and of the brake pads.

It is duly the case that the brake pads are released slightly during driving operation for example as a result of a wobbling movement of the brake disc and as a result of vibrations and lateral accelerations during cornering. These effects are however not sufficient to prevent said residual rubbing torques in an effective manner.

To counteract this problem, the generic DE 10 2007 001 213 discloses a disc brake having a resetting device which is arranged in one of the guide beams by way of which the brake caliper is displaceably held on the brake carrier, which resetting device has a resilient resetting element by means of which the brake caliper is displaced into an initial position.

This construction has proven successful in principle. However, the use of said known resetting device can lead to problems in the case of compressed-air-actuated disc brakes of heavy commercial vehicles, because here, there are wide-ranging influences resulting from component tolerances and component deformations, which have the effect that reliable functioning of said resetting device is not permitted in all situations.

Similar problems arise in the case of a disc brake such as that to which DE 10 2012 006 111 A1 relates. Here, a resetting device is arranged on the side which is situated opposite the application device and which faces toward the reaction-side brake pad, whereby effective, in particular automatic resetting of the brake caliper is realized, with a simultaneously minimal effect on the system rigidity.

In any case, the resetting device acts on the brake caliper, wherein the brake carrier functions as a counterbearing.

DE 43 01 621 A1 describes a floating-caliper disc brake having a positionally static brake carrier which has two carrier arms which project over the outer edge of a disc brake, having brake shoes which are arranged on both sides of the brake disc and which have in each case one friction pad and one rear plate and which are supported displaceably on the carrier arms, having a floating caliper which is guided axially displaceably on the brake carrier and which engages around the brake shoes and has an actuating device designed for pressing the brake shoes against the brake disc, having a spring arrangement which acts axially on the brake shoes in a brake release direction and which, after the braking operation, assists in the setting of an air gap between the brake shoes and the brake disc. The spring arrangement has at least one spreading spring which is fastened in altogether non-displaceable fashion in an axial direction to a carrier arm of the brake carrier, in that the fastening is performed to a section of the carrier arm situated over the outer edge of the brake disc, and in that the spreading spring has at least two spring arms which lie resiliently in an axial direction against the rear plates of the brake shoes.

US2014/0339026 A1 describes a spreading spring comprising a locking arm which connects the spreading spring to a brake component, a retraction arm; and a preload device which is arranged between the locking arm and the retraction arm, wherein the preload device comprises six or more spiral-shaped loops which store energy during a braking activation and which retract the brake components (brake pad) as soon as the braking process has ended. A brake caliper in the form of a floating caliper, which is not a sliding caliper, is specified. This is suitable for a passenger vehicle but not for a commercial vehicle.

The invention is based on the object of further developing a disc brake of the generic type such that, with the simplest structural means, the service life in particular of the brake pads and of the brake disc is lengthened, and the operating costs are altogether lowered.

A further object consists in providing a corresponding brake pad set.

Said object is achieved by way of a brake disc according to embodiments of the invention.

The further object is achieved by way of a brake pad set according to embodiments of the invention.

A disc brake according to the invention for a commercial vehicle, having a brake caliper which engages over a brake disc and which is in the form of a sliding caliper and which is fastened to a positionally static brake carrier and which has a central opening over the brake disc, comprises two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and comprises at least one resetting device by means of which the brake caliper can be reset after a braking-induced displacement and release of the brake, wherein the resetting device has a spreading device which engages on the opposite brake pads and which acts equally counter to the respective application direction and which has resilient spreading elements which engage on the respective pad carrier plate. The spreading device is arranged in the central opening, wherein the spreading elements engage, outside the friction pads, directly or indirectly on one side in the center region, or at least two abutment regions arranged spaced apart from one another relative to the center, of the brake pads, wherein the abutment regions have in each case one abutment surface and one bearing surface on which the spreading elements are movably arranged.

By means of the design of the disc brake according to the invention, synchronous resetting of both brake pads and resetting of the brake caliper when the brake is released are realized, wherein the synchronicity relates both to the resetting forces and to the resetting travels. Here, the resetting force acts counter to the respective application direction of the two brake pads, that is to say, in the case of the reaction-side brake pad, toward the caliper rear section, and in the case of the action-side brake pad, toward the caliper head, with gaps with respect to the brake disc being formed.

The spreading device expediently engages on the two brake pads at the pad carrier plates, specifically on the side facing toward the friction pad fastened thereto or on the opposite rear side. To prevent jamming of the respective brake pad during the resetting movement, the spreading element engages either centrally on an upper exposed edge region of the pad carrier plate or symmetrically on two abutment regions to the right and to the left.

A brake pad set according to the invention for the disc brake according to the invention has at least two brake pads with in each case one pad carrier plate and with a friction pad attached to the pad carrier plate, and has the spreading device as indicated above. The pad carrier plate have, outside the friction pads and on one side in the center region or at at least two abutment regions arranged spaced apart from one another relative to the center, in each case one abutment surface and one bearing surface. This yields the advantage that multiple functions (axial and radial transmission of spring force, spring end guidance) are realized in a small space.

In one embodiment, the spreading elements extend, proceeding from a central region in the center of the opening, from the inside to the outside to the abutment regions which are arranged spaced apart from one another relative to the center. It is also possible for the spreading elements to extend, proceeding from a central region in the center of the opening, from the inside to the outside to the abutment regions which are arranged spaced apart from one another uniformly relative to the center.

In this way, the spreading device is arranged in the center in the brake caliper, wherein said spreading device is likewise arranged within an envelope of a wheel rim of an associated wheel.

The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, can be minimized by way of the unilateral engagement of in each case one spring per pad.

A further embodiment provides that the central region of the opening extends to both sides of a virtual center of the opening approximately parallel to the plane of the brake disc over a length in a range from 30 to 50% of a longitudinal axis of the opening. This yields an advantageous adaptation of the spring forces.

In another embodiment, the spreading device has spring arms, of which in each case two lie against an associated pad carrier plate, wherein the spring arms are connected to one another in the central region of the opening, which simplifies installation during assembly and maintenance work.

According to a further concept of the invention, the spreading device has oppositely acting spreading elements, preferably with elastic action, in particular in the form of spring elements.

In the simplest form, a compression spring in the form of a helical spring or leg spring is arranged between the two brake pads, wherein the leg spring is mounted in the center above the brake disc, for example on a pad retaining stirrup by means of which the two brake pads can be pushed under preload into a pad slot. In principle, with the use of a helical spring, the attachment of the ends thereof to the pad carrier plates is sufficient to realize the spreading function to an adequate extent.

According to a further concept of the invention, the spreading device is operatively connected not to the pad retaining stirrup but to the brake carrier, which forms a counterbearing and in which the brake pads are mounted so as to be displaceable coaxially with respect to the brake disc.

For this purpose, a retaining bow is provided which extends over the brake disc in the circumferential region as far as brake carrier horns of the brake carrier which delimit a pad slot on both sides, which retaining bow is, in relation to the thickness of the brake disc, arranged in the center relative to said brake disc. The retaining bow is not the pad retaining stirrup, but is an additional component which is not attached to the pad retaining stirrup.

In one embodiment, the retaining bow may be attached to two mutually oppositely situated stirrups which are connected to the brake carrier, which permits simple attachment.

Alternatively, the retaining bow may be connected to at least the two brake carrier horns of a pad slot, whereas the spreading elements, which engage on the two brake pads, are connected to the retaining bow. Said retaining bow thus forms a centering device which, in correspondence with the brake carrier as a fixed bearing, may also be realized in some other way in terms of construction.

The retaining bow is preferably of C-shaped form in terms of its contour, with a center limb which extends over the brake disc to the extent mentioned and with two end limbs which are angled in the same direction as said center limb toward the brake carrier horns and of which in each case one is fastened to a brake carrier horn of the corresponding pad slot.

By way of the retaining bow to which the spreading device is fastened by way of its spring arms, automatic centering of the brake caliper after a release of the brake, that is to say after the ending of a braking process, is realized, wherein, by way of the thus fixed positioning of the spreading device, the brake pads are reset such that the brake caliper is centered relative to the brake disc.

Furthermore, the spreading device is designed so as to act over the entire range of wear of the brake pads.

Since the points of force engagement on the brake pads change with progressive wear, those functional parts of the spreading device which make contact with the brake pads are designed so as to be supported in sliding fashion on the pad carrier plate of the respective brake pads.

To ensure secure retention of the spring limbs, or, in the case of a different design variant, of the spring arms, even under the action of vibrations during driving operation, the spring arms are supported on the upper edge of the pad carrier plate in relation to the base of the pad slot, likewise in sliding fashion as described above.

With corresponding design of the spreading device, it is moreover possible to dispense with the use of pad retaining springs, which, as is known from the prior art, are fastened to the upper edge of the pad carrier plates and on which a pad retaining stirrup is supported, such that the respective brake pad is retained under preload in the pad slot of the brake carrier.

The structural realization of the spreading device according to the invention may differ in terms of construction, wherein a major advantage emerges from the fact that it is possible to substantially dispense with moving components, self-evidently with the exception of the resilient spreading elements which, for their function, perform a resilient deflection.

The omission of moving parts that is now possible self-evidently has the effect of lengthening the service life of the spreading device, as does the low number of components required, resulting, moreover, in extremely inexpensive production and assembly.

In a further embodiment, each spring arm is formed, at the end, with a fork-shaped spring end such that a support limb and a thrust-imparting limb are formed, wherein the support limb lies movably on a bearing surface of a narrow side of the pad carrier plate, and the thrust-imparting limb lies movably with pressure against an abutment surface of that side of the pad carrier plate which faces toward the friction pad. In this way, an advantageous simultaneous functionality is possible, specifically in that the spring arm can not only introduce thrust forces via the abutment surface into the pad carrier plate but is also guided displaceably in terms of its movements by the abutment surface and the bearing surface. It is furthermore possible for the brake pad to be retained resiliently in its brake pad slot by way of the spring force that is introduced into said brake pad via the bearing surface.

In one embodiment, the bearing surface may be arranged at an angle with respect to a horizontal, wherein the angle lies in a range from 3 to 15°.

In another embodiment, the abutment surface may protrude from the pad carrier plate or be formed into the pad carrier plate. An advantageous adaptation to different brake designs is thus possible.

Furthermore, a projection may be provided on the abutment surface, wherein the projection protrudes from the abutment surface into a slot between the support limb and the thrust-imparting limb. This can permit precise guidance and improved transmission of force.

In an alternative embodiment, each spring arm is formed, at the end, with a spring end with a thrust-imparting limb, wherein the thrust-imparting limb is in contact with a support section of that side of the pad carrier plate which faces toward the friction pad, wherein the thrust-imparting limb, by way of an abutment section, lies movably with pressure against an abutment surface of the support section of the pad carrier plate, and at the same time, by way of a bearing section, lies movably on a bearing surface of the support section of the pad carrier plate. This yields the advantage that two functions can be realized in the thrust-imparting limb, specifically transmission of spring force in an axial and in a radial direction to the brake pad, with simultaneous guidance of the spring end and a saving of structural space and material.

In an alternative refinement, a thrust-imparting limb and a support limb at right angles thereto may be formed in the manner of an angled lug, which can reduce a structural space.

In one embodiment, it is preferable for the support section with the abutment surface and the bearing surface to be formed into the pad carrier plate. This is advantageous because it results in a saving of space and material.

The bearing surface of the abutment regions may be arranged at an angle with respect to a horizontal, wherein the angle lies in a range from 3 to 15°. Guidance of the spring end is improved in this way.

If the abutment surface protrudes from the pad carrier plate or is formed into the pad carrier plate, it is thereby possible to realize an advantageous adaptation to different installation situations.

It is also possible for a projection to be provided on the abutment surface, wherein the projection protrudes from the abutment surface. More precise guidance of the spring end is thus possible.

A particularly advantageous embodiment can be made possible if the abutment regions have a support section which, with the abutment surface and the bearing surface, is formed into the pad carrier plate. This yields a saving of space and material.

In a particularly preferred embodiment, it is provided that the abutment surface runs so as to be offset, in a direction pointing away from the friction pad, relative to that side surface of the pad carrier plate which is equipped with the friction pad. This yields advantageous guidance of the spring end in the pad carrier plate together with a transmission of spring force in a small installation space.

The spreading device comprises two spreading elements, wherein a first spreading element acts on a first pad and a second spreading element acts on a second pad. The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, are minimized by way of the unilateral engagement of in each case one spring per pad.

A uniform application of force by the springs on the action side and on the reaction side, or on the thrust-piece side and on the caliper side, can be realized by way of a flexible adjustment of the center web. Furthermore, it is possible for slight incorrect geometrical positioning of disc, pad and carrier to be compensated by way of the flexible center web.

By way of the center web, it is possible for the active resetting device to be easily positioned and held down by the pad retaining stirrup. It is advantageously possible, during a pad change, for the resetting device to be easily removed and also exchanged.

Through the utilization of the entire pad slot between the carrier horns, it is possible for use to be made of spreading elements or springs with a relatively low spring rate in order to impart relatively constant forces in the event of pad wear. Owing to the long spring travels, the spring elements can be tolerant with regard to spring forces. The spring travels lead to a constant spring rate with low tolerances.

In a preferred design variant, only two springs are used.

The spreading elements may be formed from inexpensive and geometrically flexible metal sheets.

As a result of the offset with different centers of rotation, it is possible to replicate a relatively low spring rate (see patent 4943—FIG. 2). There is advantageously no need for a large number of windings (expensive, bulky).

Further advantages are:
Adjustability (of the centering)
Spring constants adaptable for each pad side, hence different for inside/outside and better adaptable to surroundings—within limits
Installation by way of center centering stirrup—compensates uneven force build-up
Possible "active" caliper centering
Active pad suspension by way of "fork" on the end of the spider Another embodiment provides that each spring arm is formed, at the end, with a spring end with a fastening section which, in its longitudinal direction, is formed with an elongated hole which is a guide section for the spring end of the spreading device. In this way, guidance during relative movements between the spring arms and the brake pads can be improved, and a lift-off of the spring arms can be prevented.

Here, each fastening section may lie in each case on a bearing surface of a respective pad carrier plate, wherein the elongated holes of each fastening section interact in each case with an abutment section of the pad rear plate. This yields a simple and effective construction.

For example, a pin fixedly connected to the pad carrier plate may have the abutment surface, which interacts with the respective elongated hole, of the pad carrier plate, wherein the bearing surfaces run in each case tangentially with respect to the brake disc and lie in a plane. A pin is an inexpensive, high-quality component, and can be easily installed.

In one alternative, the elongated holes may form a guide opening which interacts with a contour of the pad carrier plate, wherein the contour is formed as a peg or a projection. Such contours can be easily integrally cast in the case of the pad carrier plate being produced as a cast part. Here, it is possible for the contour to protrude from the pad carrier plate in an axial direction, in a radial direction and/or in a tangential direction relative to the brake disc. In one variant, the contour may also be formed in.

The contour offers a further advantage in that it can form a coding of the brake pads; for example, the application-side brake pads and the rear-side brake pads may have different contours.

Alternatively, the contour may be a projection which forms a retainer for a pad retaining spring. This is particularly simple.

In yet another embodiment, each spring arm is formed, at the end, with a spring end with a thrust-imparting limb, wherein the thrust-imparting limb is in contact with a guide projection of that side of the pad carrier plate which faces toward the friction pad, wherein the thrust-imparting limb, by way of a first abutment section, lies movably with pressure against an abutment surface of the pad carrier plate, and at the same time, by way of a second abutment section arranged at right angles to the first abutment section, lies movably on a guide surface of the guide projection. In this way, simple spring ends can be used.

Here, in one embodiment, it is provided that the guide projection is of cuboidal form and is arranged below an upper edge of a corner region of the pad carrier plate on the pad side thereof. This yields a compact arrangement.

A further embodiment provides that the spreading device has at least one additional resetting element which, in addition to the engagement point/the engagement points of the spring arms, engages at a further engagement point on the respective pad carrier plate of a brake pad. This is advantageous because, in this way, an assisted resetting of the brake pads can be effected. A residual rubbing torque can thereby be prevented.

In one embodiment, the at least one resetting element may be fastened by way of one section, in a lower region of the pad carrier plate of an application-side brake pad on a thrust side of the pad carrier plate, to a retaining section, wherein the at least one resetting element is fastened by way of a further section in a lower region of a base plate of an application section of the brake caliper. In this way, it is advantageously possible for a pulling force to be exerted on the brake pad by the resetting element.

Here, the at least one resetting element may be formed as a spring element with a central section, two spring arms and two fastening sections with in each case one U-shaped lug, wherein the central section is fastened to the retaining section of the pad carrier plate, and wherein each spring arm is attached by way of the fastening section to the base plate. This is a simple and compact design. The fastening to the pad carrier plate can be performed quickly and easily for example by means of a claw-type connection to a pin of the pad carrier plate.

In a yet further embodiment, it is provided that the spreading device has at least one further additional resetting element, which is arranged between a lower region of the pad carrier plate of the rear-side brake pad and a caliper rear section of the brake caliper. It is thus also possible for the rear-side brake pad to be reset, with assistance from the further resetting element, in order to prevent a residual rubbing torque.

Here, the at least one further resetting element may be formed as a type of leaf spring with a spring body with in each case one spring end, wherein one spring end is articulated, in a lower region of the rear-side pad carrier plate on the thrust side thereof, on a holding section, and the other spring end is articulated on a fastening section of the caliper rear section of the brake caliper. In this way, a pulling force can also be exerted on the rear-side brake pad.

In an alternative embodiment, the spreading device has at least two additional recesses elements which are situated opposite one another and which are of spring form, wherein each resetting element is fastened by way of one end to a section of the spreading device and/or to a pad retaining stirrup, and wherein each free end of each resetting element is, by way of in each case one thrust-imparting limb, in contact with the respective pad carrier plate of each brake pad. This yields a simple construction, wherein a thrust force is exerted on each brake pad by a respective setting element in order to assist a resetting of the brake pads.

For this purpose, it may be provided that the at least two additional resetting elements are arranged in each case in an elongate intermediate space between a friction pad and a pad side of the respective pad carrier plate, wherein the thrust-imparting limbs are in each case in contact with the pad side of the respective pad carrier plate and each exert a thrust force on the brake pad in a direction pointing away from the brake disc. This is advantageous because the brake pads are not modified, or are modified only to a very small extent.

In the case of a brake pad set, it is provided that the bearing surface of the abutment regions is arranged at an angle with respect to a horizontal, wherein the angle lies in a range from 3 to 15°. A free relative movement of spring arm and brake pad is thus possible.

It is advantageous if the abutment surface protrudes from the pad carrier plate or is formed into the pad carrier plate, because an extensive adaptation to different installation conditions is possible in this way.

For example, one projection may be provided on the abutment surface, wherein the other projection protrudes from the abutment surface.

In another embodiment, the abutment regions may have a support section which, with the abutment surface and the bearing surface, is formed into the pad carrier plate, in order to permit a space-saving construction.

The abutment surface may also run so as to be offset, in a direction pointing away from the friction pad, relative to that side surface of the pad carrier plate which is equipped with the friction pad.

For the guidance of the spring arms, the pad carrier plates may be equipped with at least one contour which protrudes from the respective pad carrier plate or which is formed into the respective pad carrier plate. Thus, a movement travel can be easily defined, wherein a lift-off of the spring arms, for example in the event of vibrations, shocks etc., can be prevented.

A further advantage arises in that the at least one contour (50) forms a pad coding, by virtue of the application-side brake pad having a different contour than the rear-side brake pad.

In a further embodiment, the pad carrier plate of an application-side brake pad may be equipped with at least one resetting element. A coding may be possible in this way also.

Accordingly, the pad carrier plate of a rear-side brake pad may also be equipped with at least one resetting element.

One embodiment of the brake pads provides that in each case one elongate intermediate space is arranged between a friction pad and a pad side of the respective pad carrier plate, whereby simple contacting for the spring arms of further resetting elements is realized.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1 and 2 show in each case a detail of a disc brake according to the invention in a perspective plan view;

FIG. 1A shows an enlarged schematic partially sectional illustration of the disc brake as per FIG. 1;

FIGS. 8-28 show further exemplary embodiments of the invention, in each case as a detail of the disc brake in a perspective view;

FIGS. 42-44 show views of a yet further exemplary embodiment of the disc brake having a spreading device with additional resetting elements.

The expressions "top", "bottom", "left", "right" relate to the respective arrangements in the figures.

A "top side" and a "bottom side" of a brake pad 3 or of a pad carrier plate 4 always relate to the installation situation of the brake pad 3. Here, the bottom side of the brake pad 3 is situated closer in a radial direction to a brake disc axis of rotation 2a than the top side of said brake pad 3, as can be clearly seen for example from FIG. 3.

DETAILED DESCRIPTION OF THE DRAWINGS

Figure 1:
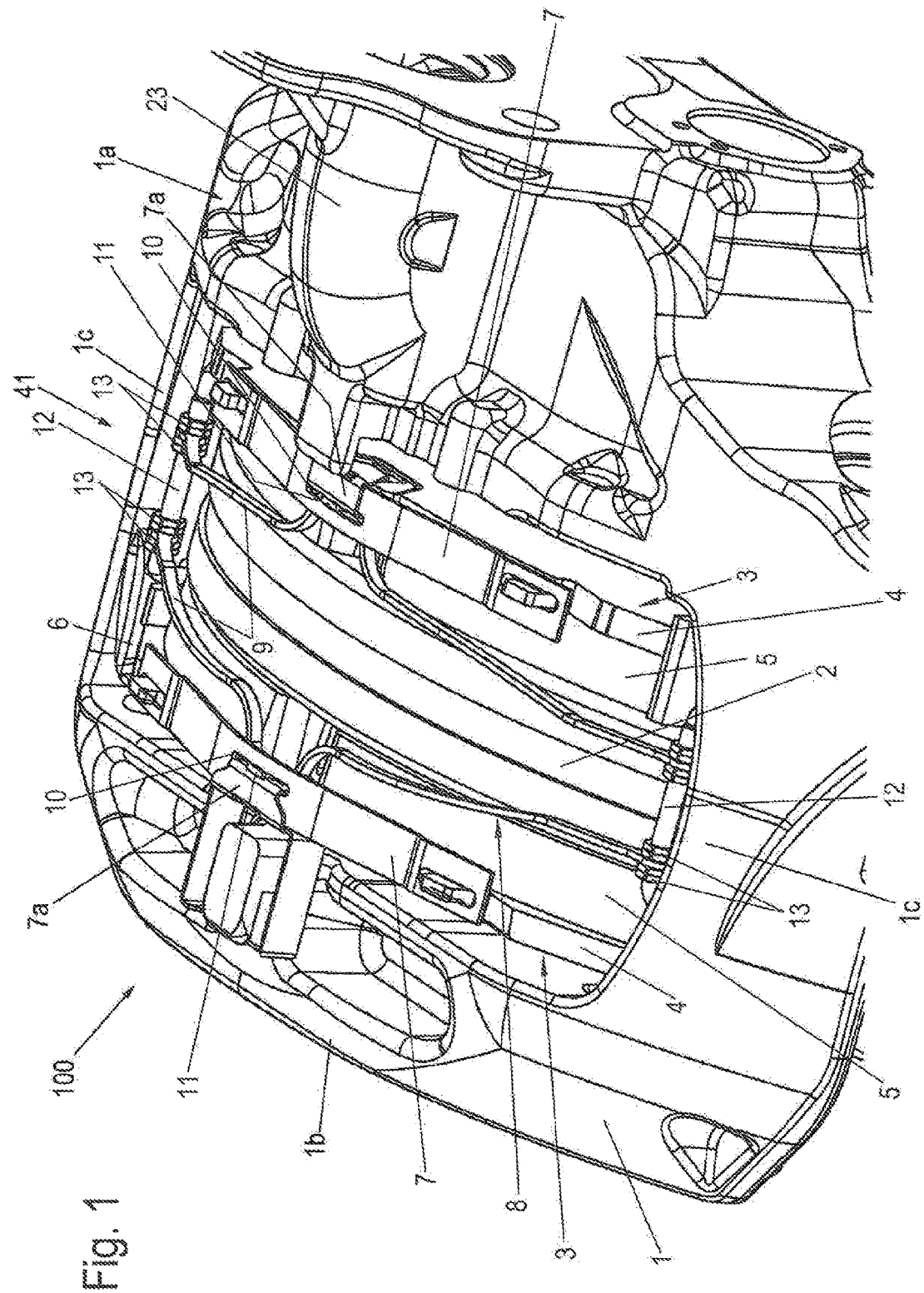

FIG. 1 shows a part of a disc brake 100 for a commercial vehicle, having a brake caliper 1 which engages over a brake disc 2. The brake disc 2 has a brake disc axis of rotation 2a (see FIG. 29). The brake caliper 1 is attached, displaceably relative to the brake disc 2 axially in the direction of the brake disc axis of rotation 2a, to a brake carrier 6, for which purpose the brake caliper 1 is mounted on guide beams (not illustrated) which are connected to the brake carrier 6 which is held in positionally static fashion on the vehicle.

The brake caliper 1 comprises an application section 1a, a caliper rear section 1b and two tension struts 1c. The application section 1a runs with one side parallel to the plane of the brake disc 2 on one side of the brake disc 2. The caliper rear section 1b is arranged on the other side of the brake disc 2, likewise so as to run parallel to the brake disc 2. The caliper rear section 1b is connected to the application section 1a at in each case one end by way of in each case one tension strut 1c. Here, the tension struts 1c run substantially at right angles to the application section 1a and to the caliper rear section 1b.

The application section 1a has an interior space in which an application device (not shown) of the disc brake 100 is arranged. An opening of the interior space points toward the brake disc 2 and is closed off by means of a plate, which is referred to as base plate 1e (see FIG. 29).

In this arrangement, the application section 1a, the caliper rear section 1b and the tension struts 1c define, between them, a central opening 41 which extends over the brake disc 2. The opening 41 has an imaginary longitudinal central line which lies in the plane of the brake disc 2 and which connects the imaginary centers of the tension struts 1c. Furthermore, the opening 41 has a further imaginary transverse central line which connects an imaginary center of the application section 1a to an imaginary center of the caliper rear section 1b. The longitudinal central line and the transverse central line intersect at an imaginary center point, which in this case is referred to as the virtual center of the opening 41.

In the brake carrier 6 there are arranged brake pads 3 which, during a braking operation, can be pressed against the brake disc 2 at both sides. Here, each brake pad 3 has a pad carrier plate 4 and a friction pad 5 fastened to said pad carrier plate on the side facing toward the brake disc 2, which friction pad is, during the functional operation thereof, that is to say during a braking operation, pressed against the brake disc 2.

The brake pads 3 are accessible, for an exchange and for maintenance, through the central opening 41. Said brake pads can, through said central opening 41, be inserted into their associated pad slots and removed from said pad slots again. The pad slots are defined in each case laterally by brake carrier horns 25 (see FIG. 8).

Braking is performed by way of the application device arranged in a receiving space in the application section 1a of the brake caliper 1, which application device has a brake lever which is positioned in a dome 23 of the brake caliper 1. The associated brake pad 3, referred to as action-side or application-side brake pad, is the first to make contact with the brake disc 2 during a braking operation. During the further course of the braking operation, reaction forces that occur cause the brake caliper 1 to be displaced in the opposite direction, driving the reaction-side brake pad 3 along until the latter likewise comes into frictional contact with the brake disc 2.

After a release of the brake, the two mutually oppositely situated brake pads 3 are, by way of a resetting device, released from the brake disc 2 to such an extent that said brake disc runs freely relative to the brake pads 3.

The resetting device is composed of at least one spreading device 8, which engages on the mutually oppositely situated brake pads 4, correspondingly to the invention, so as to act equally counter to the application direction.

In the example shown in FIG. 1, the spreading device 8 is composed of two flat springs 9 which are of mirror-symmetrical form but otherwise identical and which are retained on a pad retaining spring 7 of the respective pad carrier plate 4, for which purpose, on each flat spring 9, there is integrally formed a lug 11 which engages in positively locking fashion into a slot 10 of the pad retaining spring 7.

For this purpose, FIG. 1a illustrates an enlarged schematic partially sectional illustration of the disc brake 100 as per FIG. 1. The section runs through a plane which is vertical in relation to FIG. 1 and which runs through the brake disc axis of rotation 2a.

That part of the flat spring 9 which is in contact with the pad carrier plate 4 is situated in a central section of the flat spring 9, and in this case is referred to as thrust section 11a. The thrust section 11a is extended upward by the lug 11. In this example, the thrust section 11a lies against a clip element 7a which is attached, for the retention of the pad spring 7, to the pad carrier plate 4 in the central upper region thereof. A section of the clip element 7a extends through the slot 10 of the pad retaining spring 7. Said slot 10 is thus already provided and can be used for the positively locking engagement of the lug 11 of the flat spring 9.

That section of the clip element 7a whose outer side is in contact with the thrust section 11a of the flat spring 9 lies with its inner side against the pad carrier plate 4. In this way, the thrust force of the thrust section 11a of the flat spring 9 is transmitted to the pad carrier plate 4. These explanations self-evidently also apply to the other flat spring 9.

Furthermore, FIG. 1a shows a pad retaining stirrup 28 (see also FIG. 8) which is arranged, over the brake pads 3, between the application section 1a and the caliper rear section 1b in the transverse direction of the opening 41 or in the direction of the brake disc axis of rotation 1a and which is fastened to said application section and caliper rear section. Here, the pad retaining stirrup 28 presses, by way of sections of its bottom side, against the clip elements 7a and thus against the pad retaining springs 7, whereby the brake pads 3 are held in their pad slots.

At the ends, the respective flat spring 9 is held in axially secured fashion on a stirrup 12 which is fastened to the brake carrier 6, wherein the two flat springs 9 are arranged spaced apart from one another. For an axial securing action, securing means 13 are provided on the stirrup 12 so as to clamp the respective end of the flat spring 9 between them.

During an application movement of the brake pads 3, the flat springs 9 are correspondingly deformed, with a spring stress being built up, such that, after a release of the braking action, the brake pads 3 are pushed uniformly out of their braking position by the spring force that is provided.

FIG. 2 illustrates a further exemplary embodiment of the invention, in which the spreading device 8 is formed in each case from a spring stirrup 14, composed preferably of spring wire. Here, a spring stirrup 14 of said type is pivotably fixedly held on each end region of the pad carrier plate 4 on the side facing toward the pad retaining springs 7, for which purpose there is arranged on the pad carrier plate 4 a bracket 15 in which the ends of the spring stirrup 14 are, as viewed radially with respect to the brake disc 2, held rotatably so as to be offset relative to one another.

In FIG. 2, the bracket 15 comprises, for each end of the spring stirrup 14, a rectangular mount section 151, 152, which mount sections are connected by way of a connection 150 such that the mount section 151 protrudes upward from the connection 150 and the mount section 152 protrudes downward.

The bracket 15 may for example be formed in one piece with the pad carrier plate 4, for example by mechanical machining. It is also possible for the bracket 15 to be fastened to the pad carrier plate 4.

Figure 24:
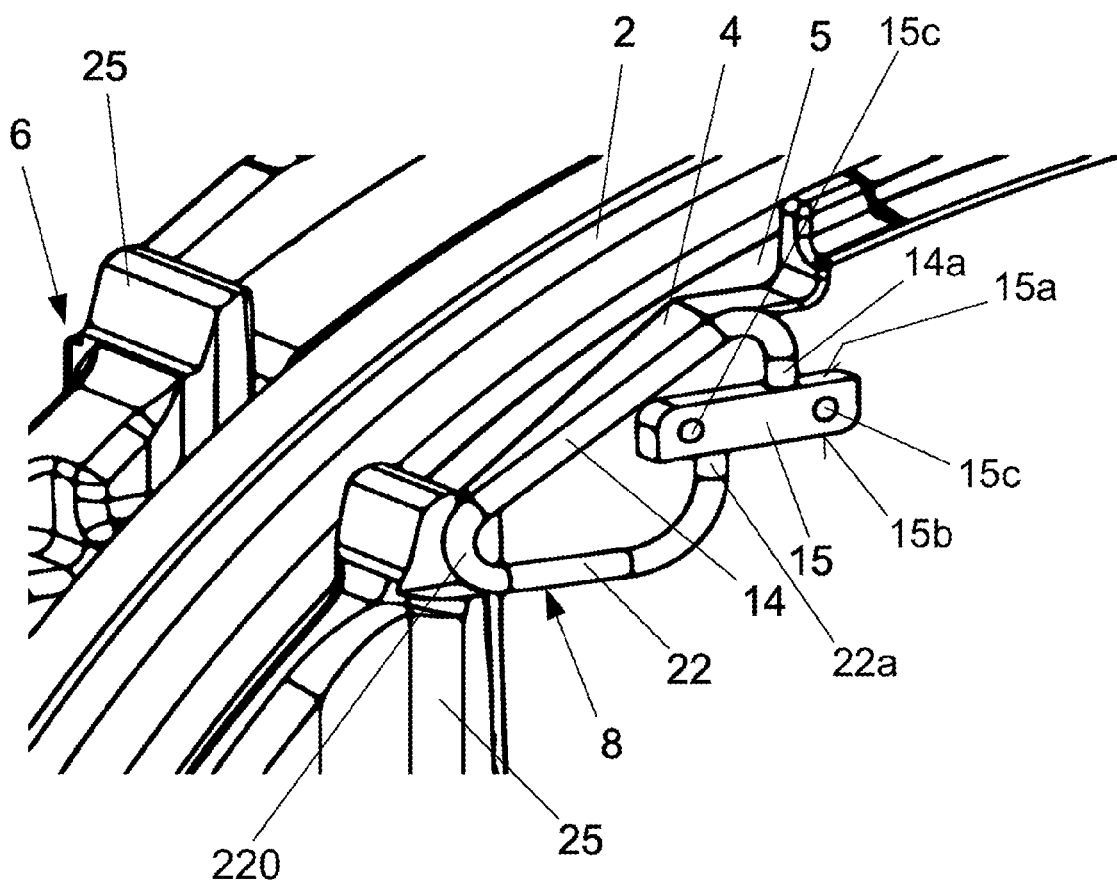

The bracket 15 may also be, for example, a rectangular plate such as will be described in more detail further below (FIG. 24).

A spring stirrup 14 lies against in each case one associated brake carrier horn of the brake carrier 6, specifically on the side situated opposite the brake disc 2, such that, during an application movement of the brake pads 3, the spring stirrups 14 deform under stress. In the event of a release of the brake, the brake pads 3 are pushed back counter to their application direction by the spring force of the spring stirrups 14, similarly to the exemplary embodiment as per FIG. 1.

Figure 3:
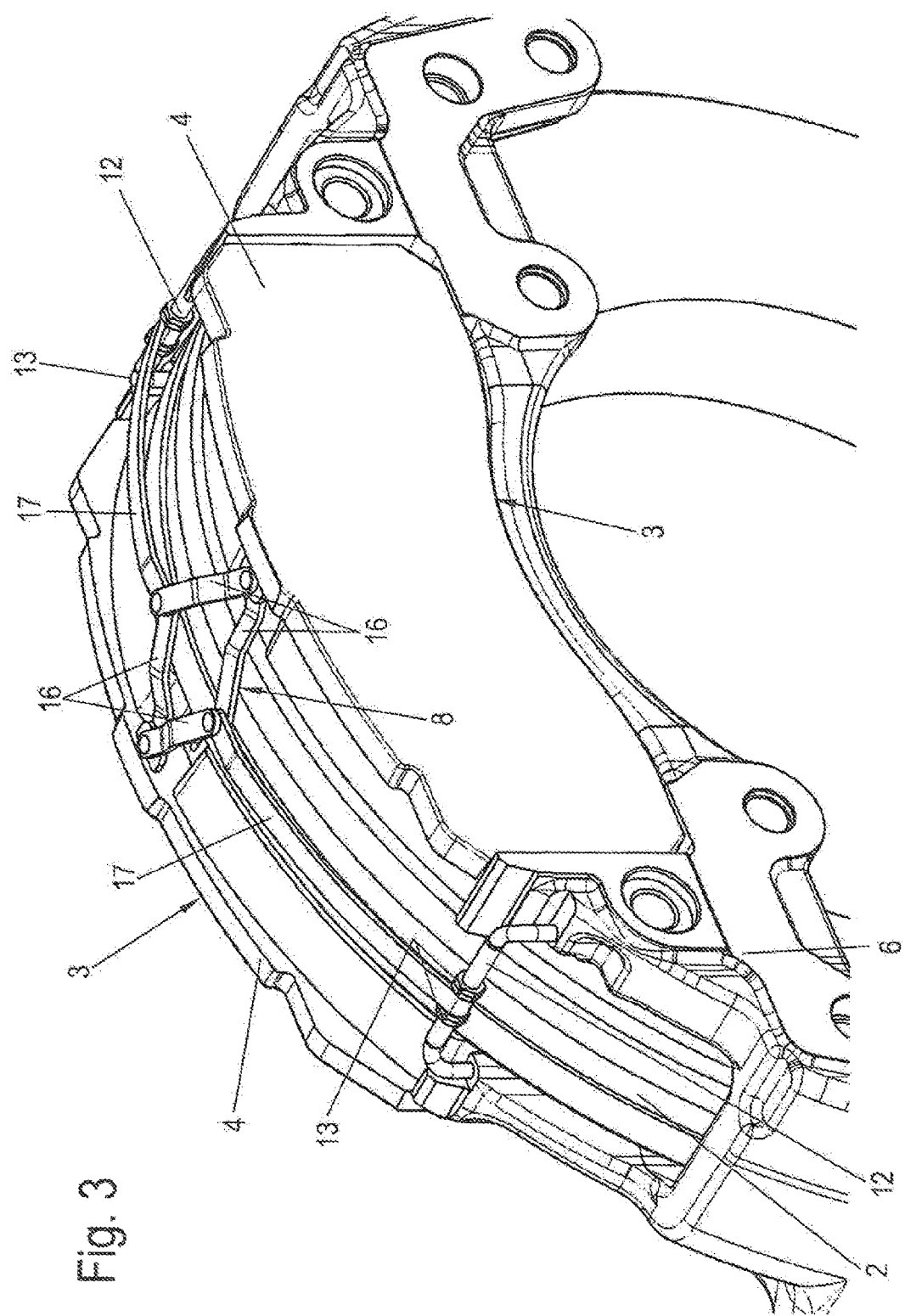
FIGS. 3-7 show further exemplary embodiments of the invention on the basis of a detail of the disc brake, in each case likewise in a diagrammatic illustration.

FIG. 3 illustrates a further exemplary embodiment of the spreading device 8, wherein here, the brake caliper has not been shown.

Said spreading device 8 is composed of two leaf springs 17 which are attached in each case stirrups 12 fastened to opposite sides of the brake carrier 6, each of which leaf springs carries, on the free ends thereof facing toward one another, two scissor elements 16, of which one is pivotably fastened to the action-side brake pad 3 and the other is pivotably fastened to the reaction-side brake pad 3.

The spring force to be imparted for the spreading action is, in this design variant, realized by way of the leaf springs 17, which arch radially outward during the application movement of the brake pads 3, and which straighten, during the release of the brake, correspondingly to the spring action, with the attached scissor elements 16 simultaneously being straightened and the brake pads 3 simultaneously being spread apart.

Figure 4:
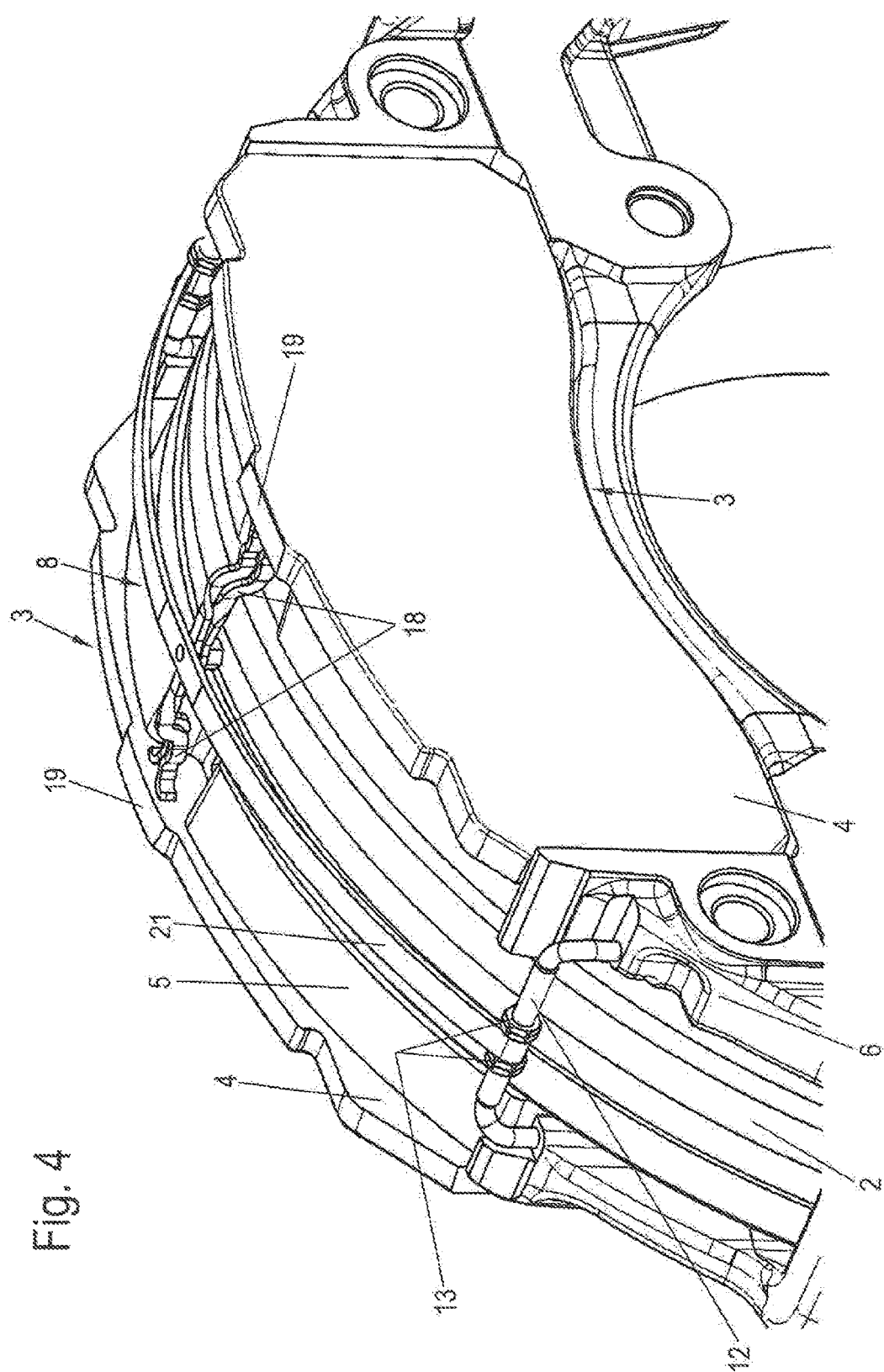

FIG. 4 illustrates a further variant of the spreading device 8, which has two criss-crossing spring limbs 18 which are fastened articulately to a retaining bow 21. Said retaining bow is, similarly to the fastening of the leaf springs 17 to the brake carrier 6, likewise retained on stirrups 12 which are connected thereto, which extends centrally over the brake disc 2, in relation to the thickness thereof, over a part of the circumference. The retaining bow is not the pad retaining stirrup 28.

The curved ends of the criss-crossing spring limbs 18 lie in each case against an abutment 19 of the pad carrier plate 4, such that said scissor-like construction spread in the event of an application movement of the brake, that is to say in the event of a movement of the brake pads 3 axially toward one another. Here, the spring limbs 18 are fastened to the retaining bow 21, such that the spring limbs 18 are preloaded during the application movement of the brake pads 3, and the brake pads 3 are spread apart from one another by said preload after a release of the brake.

Figure 5:
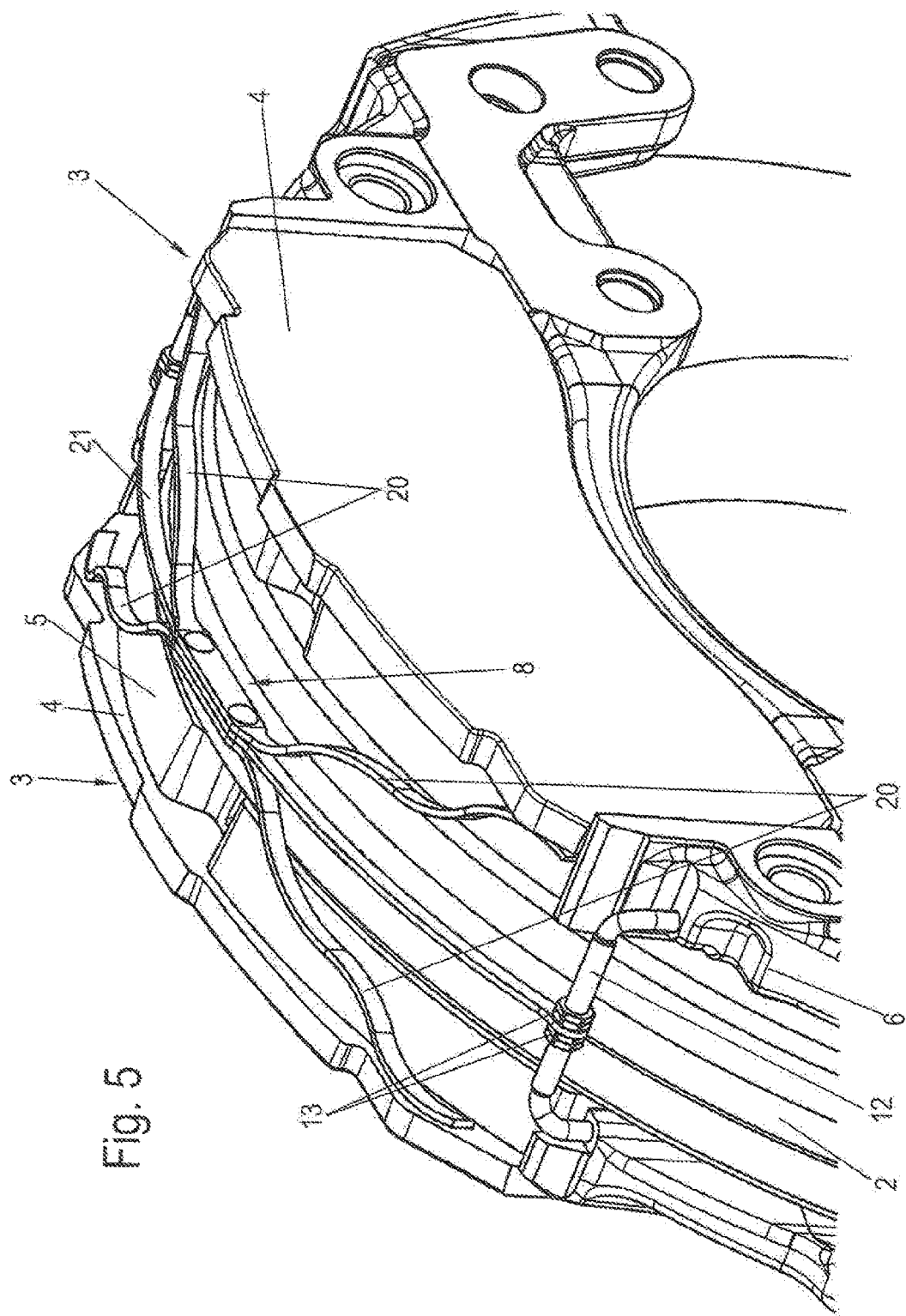

FIG. 5 illustrates a spreading device 8 which is composed of two identical spring arms 20 which are connected to one another in the central region in the longitudinal direction of the opening 41 and likewise to a retaining bow 21 which is fastened to the brake carrier 6 by way of stirrups 12.

Here, the spring arms 20 lie against two mutually oppositely situated end regions of the pad carrier plate 4, specifically in an edge region that protrudes at the top side. The ends of the spring arms 20 are likewise curved, such that sliding on the pad carrier plate surface during the application and release of the brake is possible without problems. In this case, too, spreading of the brake pads 3 after a release of the brake is possible by way of the preload that is generated during the application movement.

Figure 6:
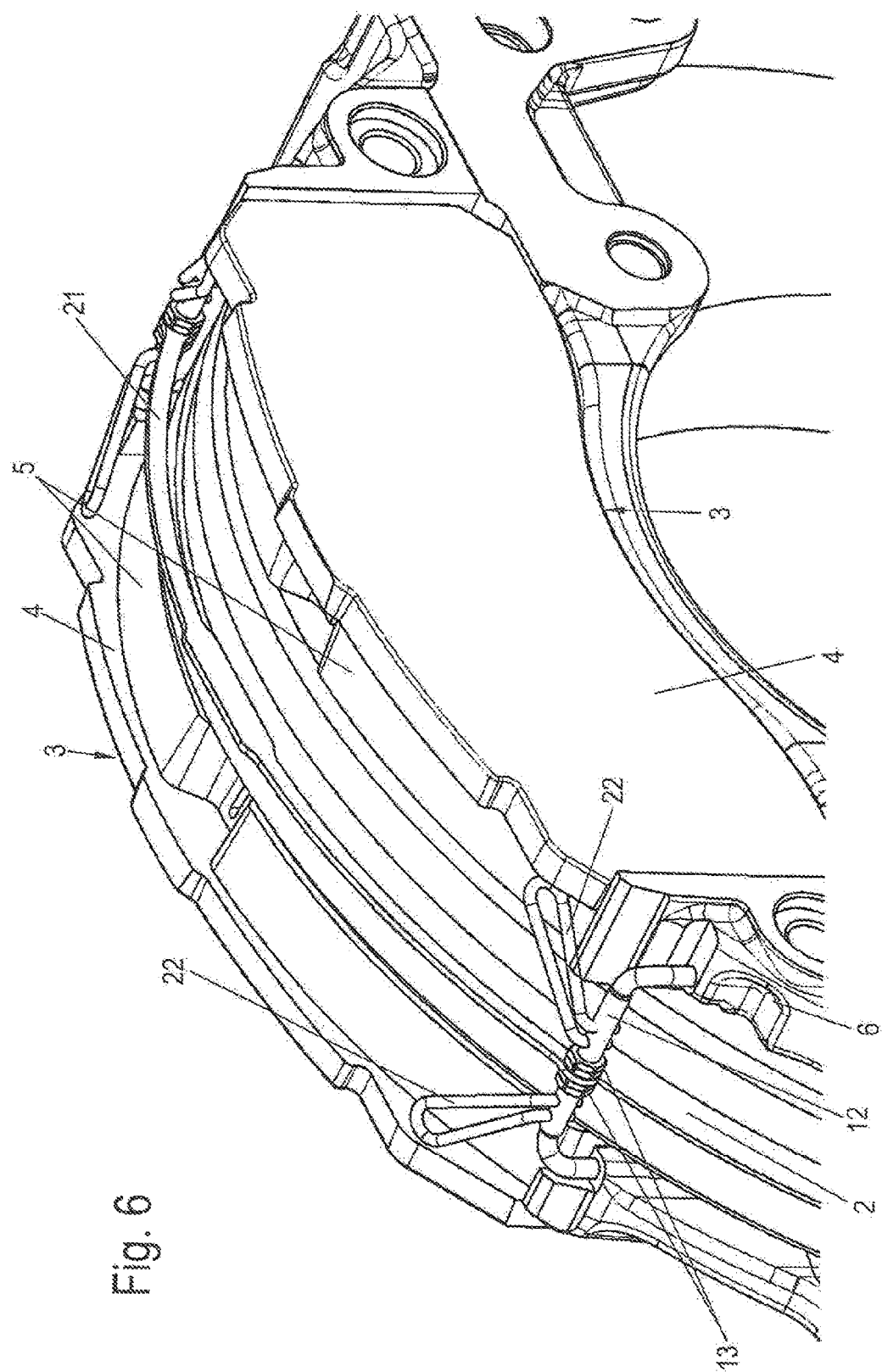

In FIG. 6, each spreading device 8 is composed of an abutment limb 22 which is connected rotatably to the stirrup 12 and which is formed in loop-shaped form from a spring wire and which likewise, like the spring arms 20 as per FIG. 5, lies against the edge region of the respectively associated pad carrier plate 4, wherein the two resilient abutment limbs 22 of each side lie against those sides of the pad carrier plates 4 which face toward one another.

Figure 7:
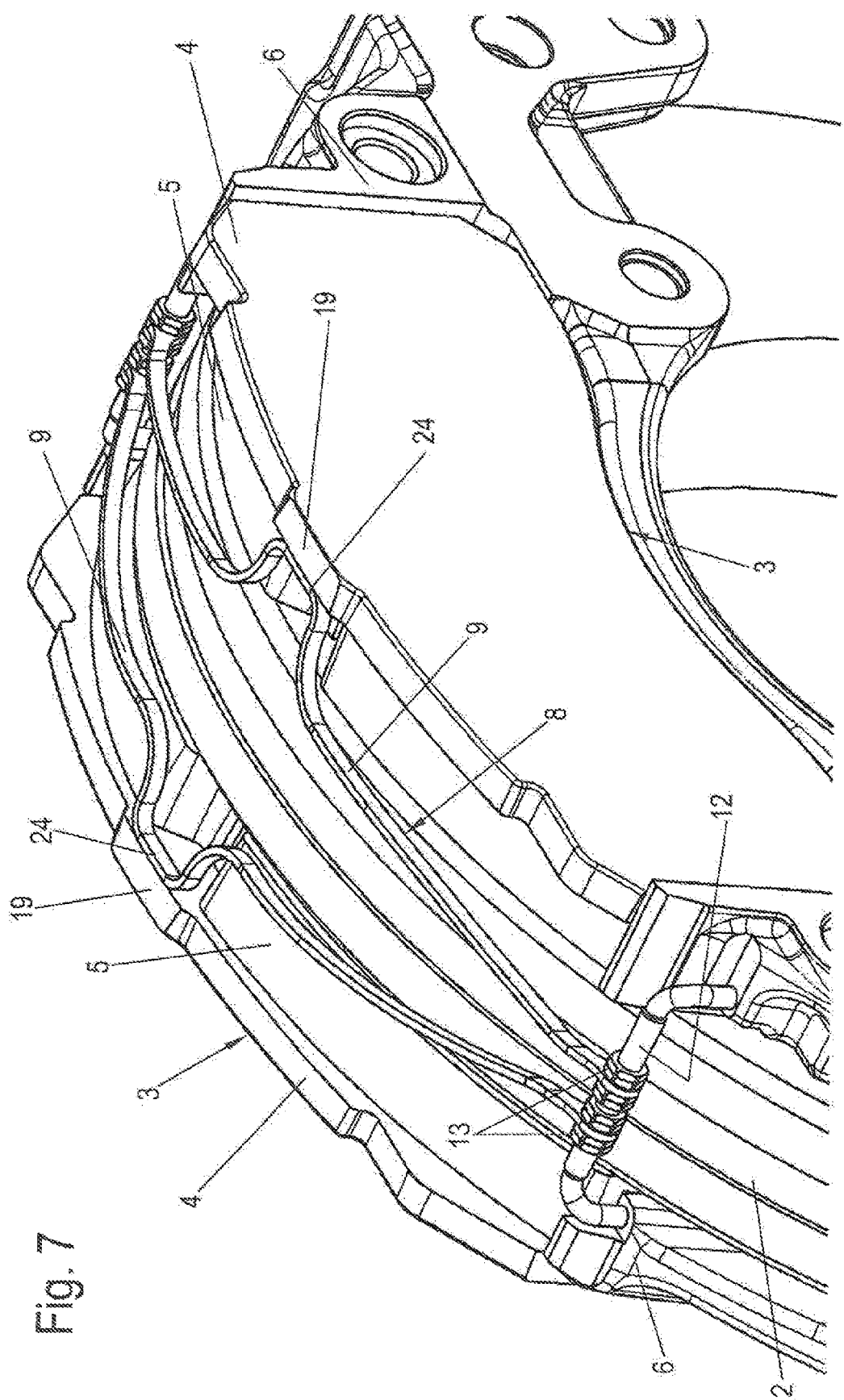

Finally, FIG. 7 illustrates a further variant of the invention, which is substantially similar to the embodiment as per FIG. 1. In this case, too, the flat spring 9 assigned to in each case one brake pad 3 engages centrally on the pad carrier plate 4, preferably on an abutment 19, wherein, for this purpose, the flat spring 9 is equipped with a turned-out abutment stirrup 24.

For the central adjustment of both flat springs 9 in relation to the brake disc 2, the flat springs 9 are fastened in axially displaceable fashion to the two mutually oppositely situated stirrups 12.

Figure 8:
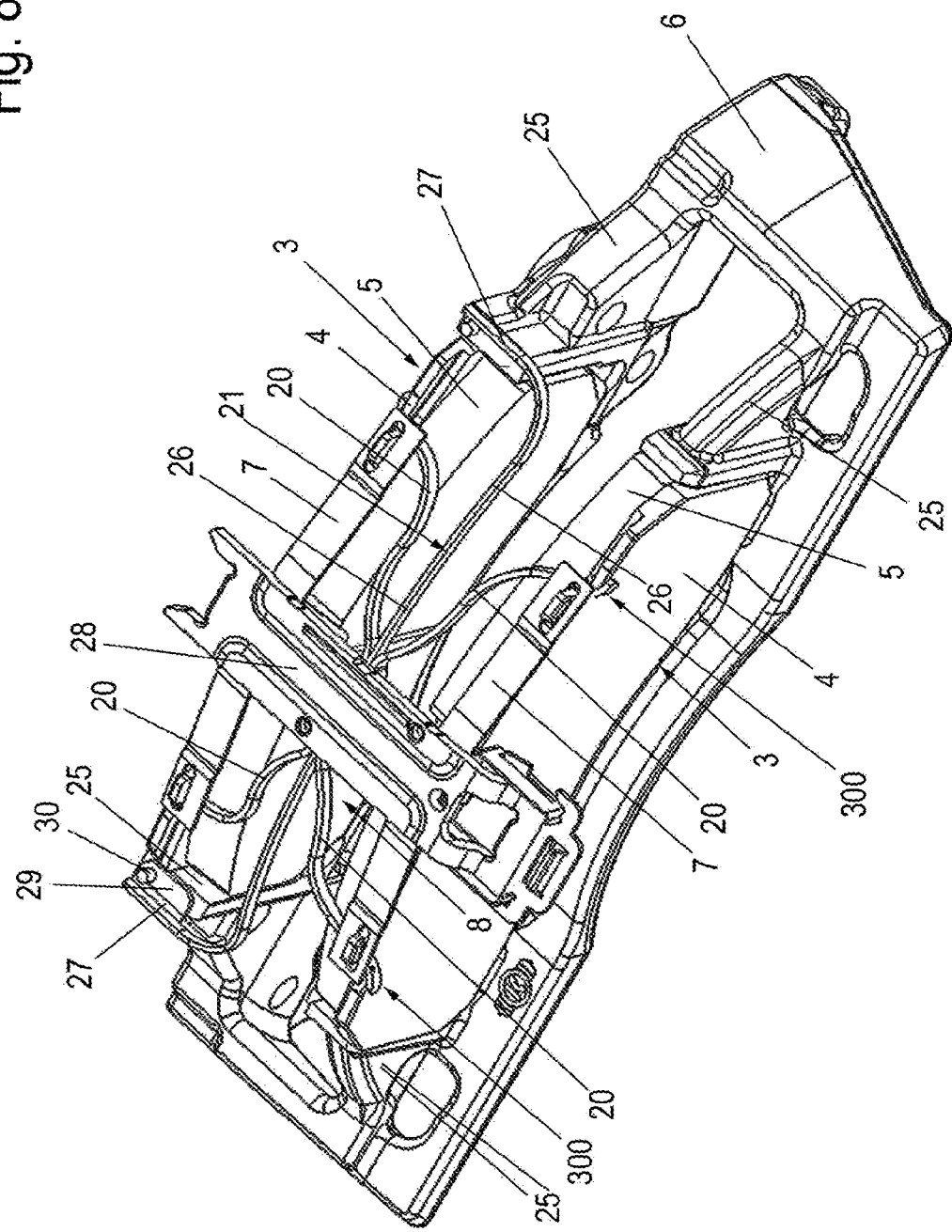

In the example shown in FIG. 8, the retaining bow 21 is of C-shaped form, having a center limb 26 which is arranged centrally in relation to the thickness of the brake disc 2 and which extends in the circumferential direction of said brake disc and which is adjoined at both sides by in each case one angled end limb 27.

Figure 9:
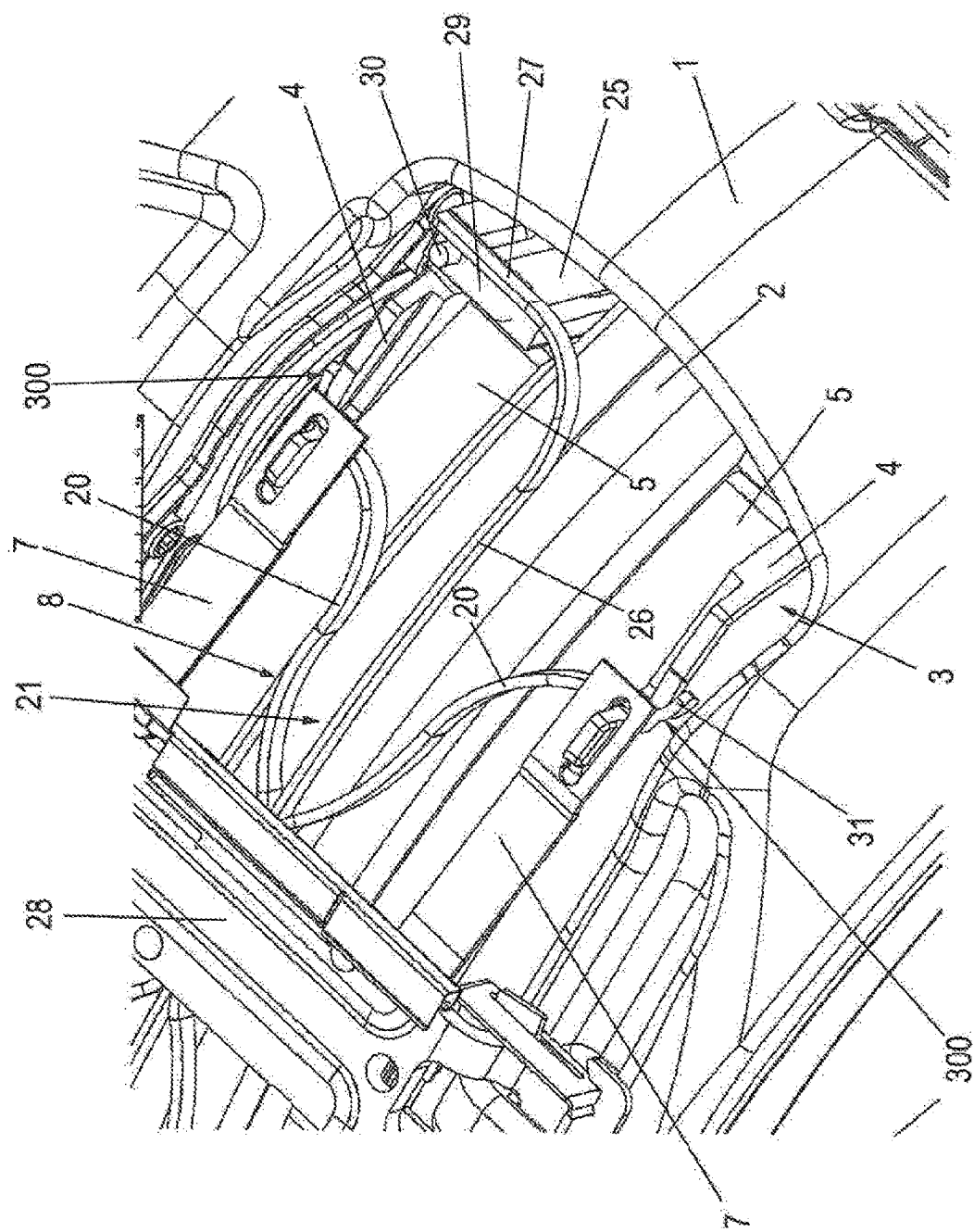
Figure 10:
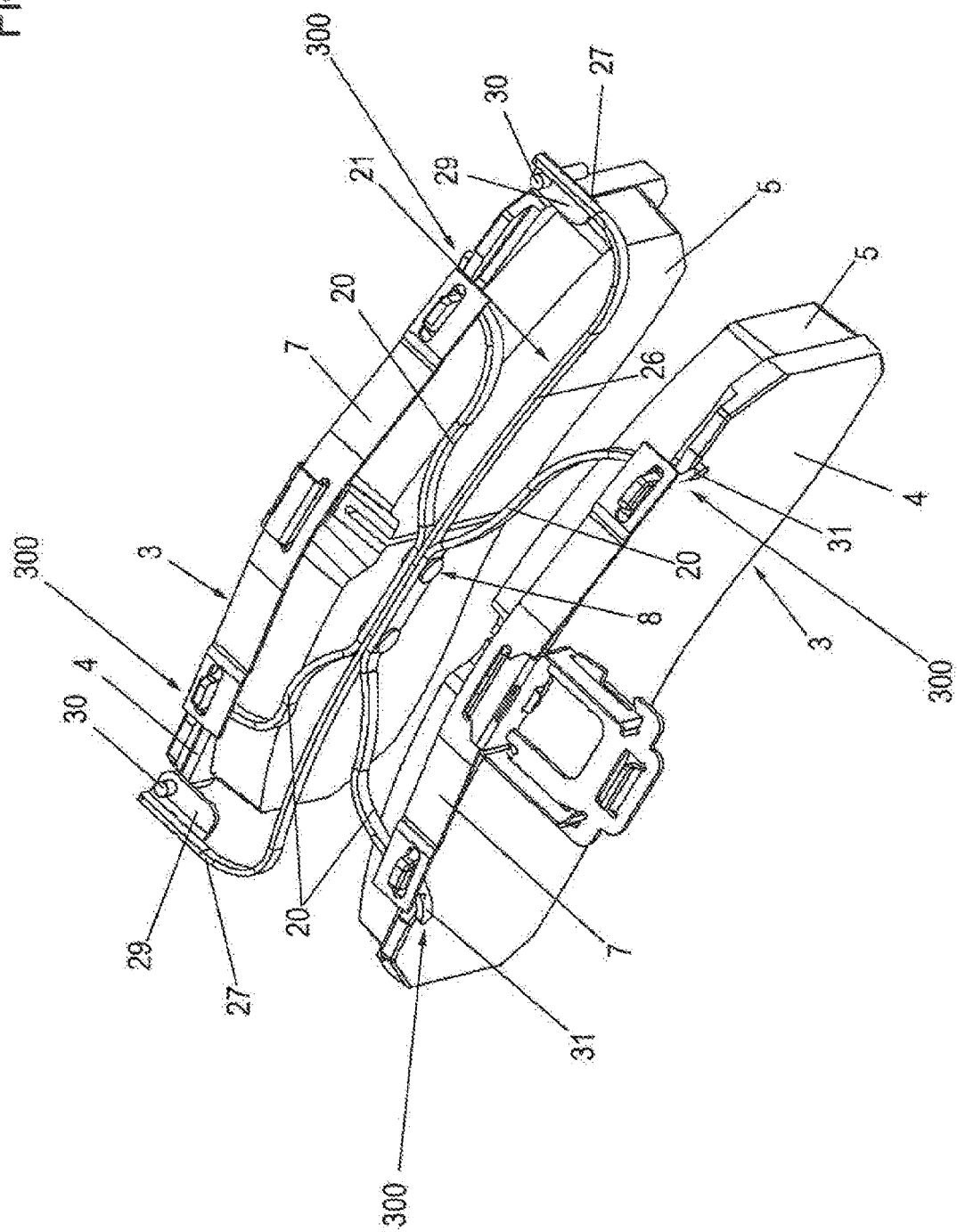

In FIG. 9, which shows a detail of a complete disc brake 100, whereas FIG. 8 shows merely the brake carrier 6 with the inserted brake pads 3, it can be clearly seen, as in FIG. 10, that the end limbs 27 are equipped, on the sides facing toward one another, with lugs 29, on which there are held pegs 30 which engage into bores 25a (see FIG. 26) of the brake carrier horns 25.

Here, the retaining bow 21 thus forms a centering device for the brake caliper 1, as the brake carrier 6, to which the retaining bow 21 is fastened, forms a positionally static part which is mounted so as to be displaceable relative to the brake caliper 1, such that, after a release of the brake and a spreading movement of the spreading device 8, that is to say after the brake pads 3 have been pushed apart, the brake caliper 1 is guided into a centered position.

FIG. 10 furthermore shows the brake pads 3 with the spreading device 8 and the retaining bow 21 on their own.

In FIGS. 8 and 9, it can also be seen that a pad retaining stirrup 28 that is held on the brake caliper 1 is supported on the pad retaining springs 7 of the brake pads 3, and holds down and braces the retaining bow 21.

As can be seen from FIG. 10, the spring arms 20 of the spreading device 8 are fixedly connected to one another in the central region, correspondingly to FIG. 5.

It can also be seen in FIGS. 9 and 10 that the spring arms 20 have, in each case at their free end, support limbs 31 which are supported on those edges of the pad carrier plates 4 which are assigned to the pad retaining springs 7, by means of which support limbs the spring arms 20 are prevented from departing from their position of abutment against the respective pad carrier plate 4 in the event of vibration movements during driving operation. Here, the support limbs 31 are braced between the pad retaining springs 7 and the associated pad carrier plate 4, wherein the pad carrier plate 4 has a cutout (not illustrated) through which the respective support limb 31 is guided. Tilting of the spring arms 20 is thus prevented.

This can be seen in an enlarged illustration in FIG. 11, which furthermore shows a thrust-imparting limb 32, integrally formed in curved fashion on the spring arm 20, of a spring end 300, which thrust-imparting limb lies against that edge surface of the pad carrier plate 4 which faces toward the friction pad 5, and which thrust-imparting limb, as stated above, forms a tilting prevention means. Moreover, the friction pad 5 is prevented from striking the spring arm 20. Here, the support limb 31, which lies on a narrow side, facing away from the brake carrier 6, of the pad carrier plate 4, and the thrust-imparting limb 32 form the prongs of a fork with a slot 301 as which the spring end 300 of the spring arm 20 is formed. As already mentioned, the spring end 300 of the spring arm 20 in the abutment region with the pad carrier plate 4, that is to say the thrust-imparting limb 32, is convexly curved in the direction of the pad carrier plate 4, in order to thereby ensure obstruction-free sliding on the pad carrier plate 4.

The support limb 31 of the spring end 300 lies by way of a bearing section 31a of its bottom side, facing toward the slot 301, on a bearing surface 305 of the top side of the pad carrier plate 4. The thrust-imparting limb 32 is in contact by way of an abutment section 32a, which points toward the pad carrier plate 4, with an abutment surface 303 of the pad carrier plate 4. The abutment surface 303 is situated on that side of the pad carrier plate 4 to which the friction pad 5 is applied. Here, the abutment surface 303 is arranged above the friction pad 5 in an end region of the pad carrier plate 4.

The bearing surface 305 on the top side of the pad carrier plate 4 may be arranged at an angle 306 with respect to an imaginary horizontal, said angle having a magnitude in a range of for example 5 to 15°.

The bearing surface 305 forms a guide for the support limb 31 of the spring end 300 of the spring arm 20 during the movements thereof in movement directions 302 (for example owing to wear compensation) and an abutment for said support limb in a direction toward the top side of the pad carrier plate 4.

Furthermore, the contact between the abutment surface 305 of the pad carrier plate 4 and the support limb 31 of the spring end 300 of the spring arm 20 forms a spring-loading means for the brake pad 3 in a radial direction. Furthermore, the pad carrier plate 4 and thus the brake pad 3 are pushed downward into their pad slot, and spring-loaded, as a result of said points of contact with the support limbs 31 of the spring ends 300. If the spreading device 8 is fixed for example as shown in FIG. 1a by the pad retaining stirrup 28, it is also possible under some circumstances for the brake pads 3 to be formed without pad retaining springs 7.

The abutment surface 303 forms a guide for the thrust-imparting limb 32 of the spring end 300 of the spring arm 20 during the movements thereof in movement directions 302 (for example in the event of wear compensation) and an abutment for said thrust-imparting limb in a direction toward the pad carrier plate 4 parallel to a brake disc axis of rotation 2a.

In an embodiment which is not shown, the abutment surface 303 may protrude from the pad carrier plate 4 or may be formed into the pad carrier plate 4, for example as a groove.

The abutment surface 303 and the bearing surface 305 may, as guide surfaces, be provided with a particular surface treatment, for example by grinding, such that they have a low friction resistance.

It is also possible for a projection 304 to be provided which protrudes from the pad carrier plate 4 toward the spring end 300 into the slot 301. In this way, the projection forms an additional guide for the spring end 300.

FIG. 12 shows an enlarged detail of the retaining bow 21 in the region of attachment to the brake carrier horn 25, wherein the lug 29 lies on a planar face side of the brake carrier horn 25. The peg 30 may be in the form of a rivet and plugged into a bore 25a (see FIG. 26) of the brake carrier horn 25. It is also possible for the peg 30 to be integrally formed on the brake carrier horn 25, or to have already been fixedly inserted as a separate component.

FIG. 13 shows the spreading device 8 as per FIGS. 8-13 as a detail. Here, at the free ends of the spring arms 20, respective spring ends 300 are formed as bent thrust-imparting limbs 32. The thrust-imparting limbs 32 each have the abutment section 32a already indicated above in FIG. 11. Furthermore, the thrust-imparting limbs 32 are in this case equipped, on their bottom sides, with a respective bearing section 32b which, for bearing contact as will be discussed in more detail below, is provided with a suitable surface condition with a low coefficient of friction.

Figure 13A:
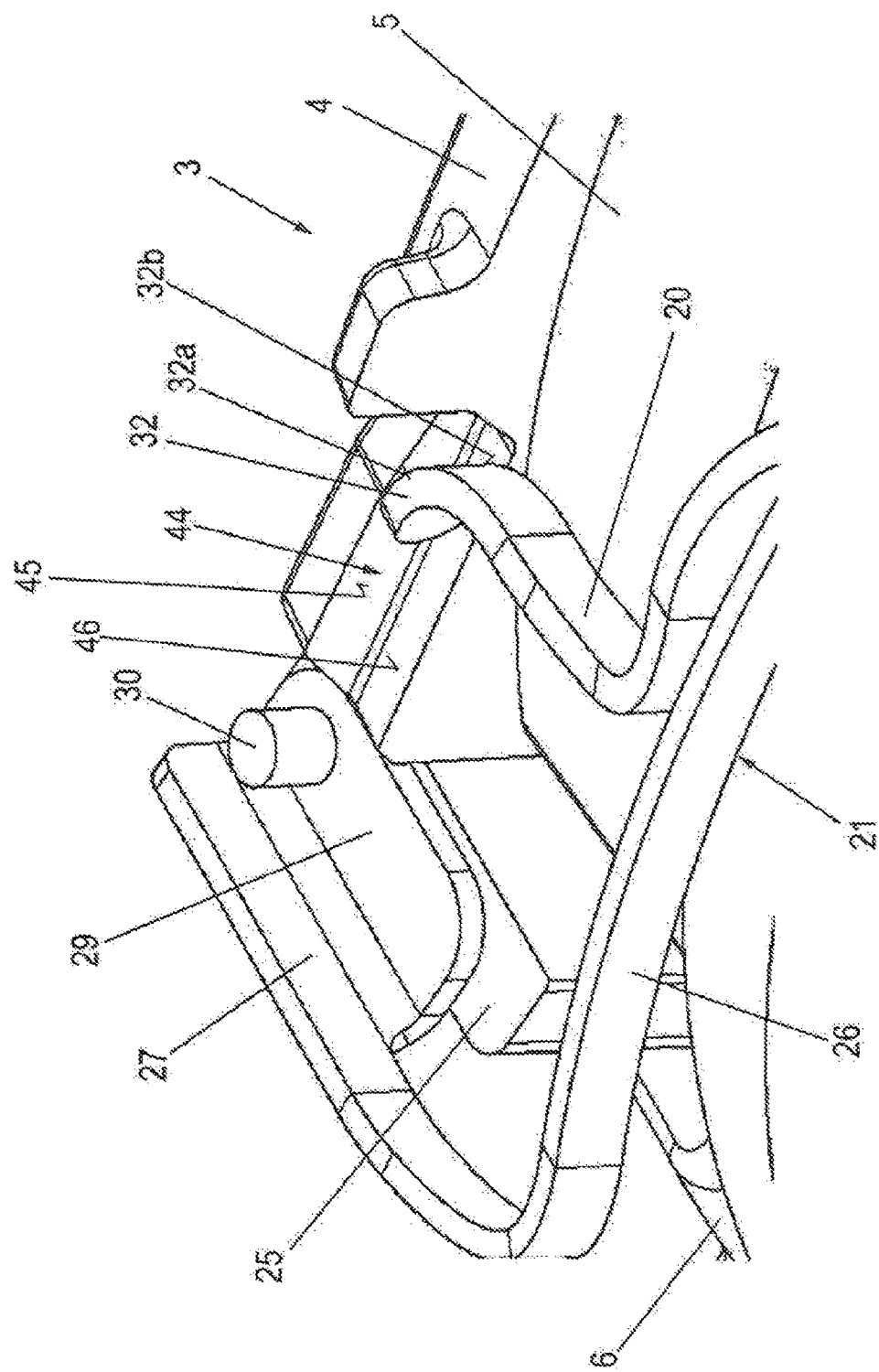

FIG. 13a shows, in this regard, an enlarged detail view of the end region of a pad carrier plate 4 of a brake pad 3 together with a thrust-imparting limb 32 of said type. The brake pad 3 has been inserted in its pad slot between two brake carrier horns 25, of which only one is illustrated here. As described above in conjunction with FIG. 12, an end limb 27 of the retaining bow 21 has been attached to said brake carrier horn 25.

The end region of the pad carrier plate 4 is in this case equipped with a support section 44 which is formed into the pad carrier plate 4, for example by mechanical machining. The support section 44 has an abutment surface 45 and a bearing surface 46. The tolerance situation can also be considerably improved by means of this mechanical machining. Accordingly, the spacings of the center of the brake disc 2 or center limb and engagement surface on the pad carrier plate 4/brake caliper 1 at the application side or thrust piece side can be kept very constant.

The abutment surface 45 runs parallel to, and so as to be offset with respect to, that side surface of the pad carrier plate 4 which is equipped with the friction pad 5, wherein the abutment surface 45 is spaced apart from said side surface in the direction of the brake disc axis of rotation 2a, that is to say axially, by an axial depth of the abutment surface 46.

The thrust-imparting limb 32 is arranged in the support section 44 and is in contact, by way of its abutment section 32a, with the abutment surface 45. At the same time, the thrust-imparting limb 32 lies by way of its bearing section 32b on the bearing surface 46. The thrust-imparting limb 32 is thus, during its movement, guided by the support section 44 as a result of its contact therewith. The abutment surface 45 and the bearing surface 46 may, by way of machining, be provided with particular friction characteristics for said movement.

Furthermore, the pad carrier plate 4 and thus the brake pad 3 are pushed downward into their pad slot, and spring-loaded, as a result of said points of contact with the thrust-imparting limbs 32 of the spring ends 300. If the spreading device 8 is fixed for example as shown in FIG. 1a by the pad retaining stirrup 28, it is also possible under some circumstances for the brake pads 3 to be formed without pad retaining springs 7.

Figure 14:
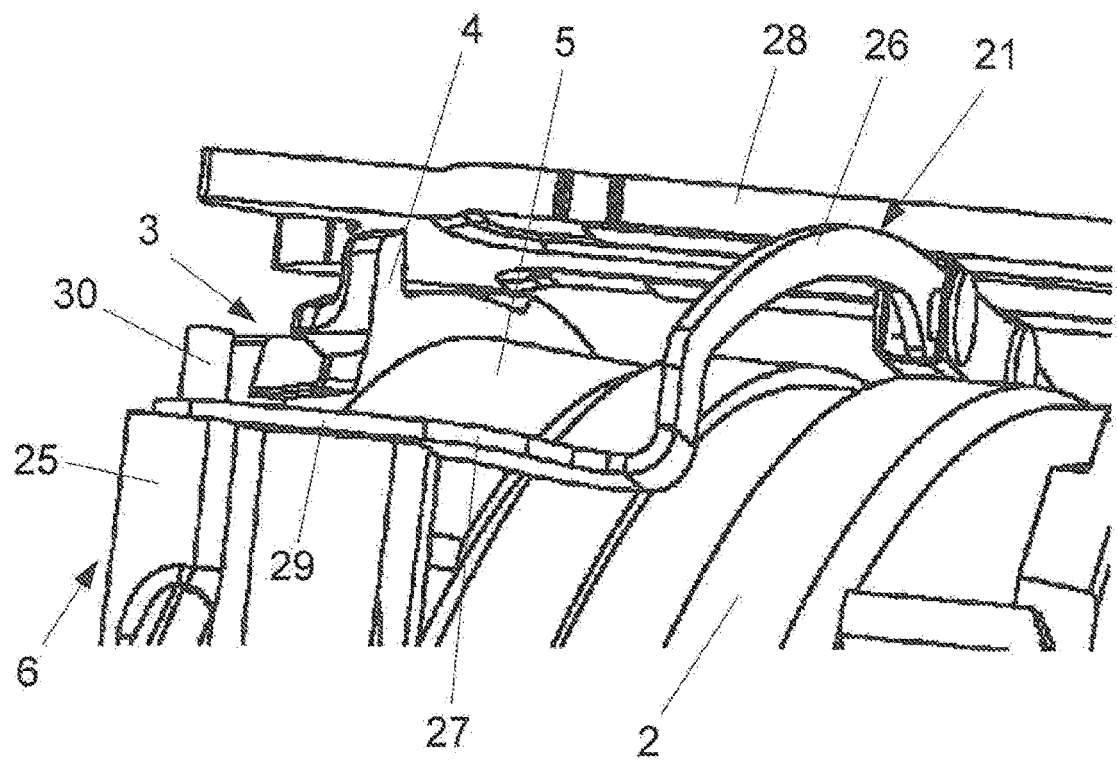

Whereas FIG. 14 shows a detail of the attachment region of the retaining bow 21 on the brake carrier horn 25 in an enlarged view. Here, as a tilting prevention means, a retaining plate 40 is provided which is fastened to the center limb 26 and against which the pad retaining stirrup 28 lies.

By contrast to the exemplary embodiment shown in FIG. 13, the lug 29 is not angled relative to the end limb 27 but rather is formed by said end limb so as to have the same profile, by way of corresponding shaping of the retaining bow 21.

Figure 15:
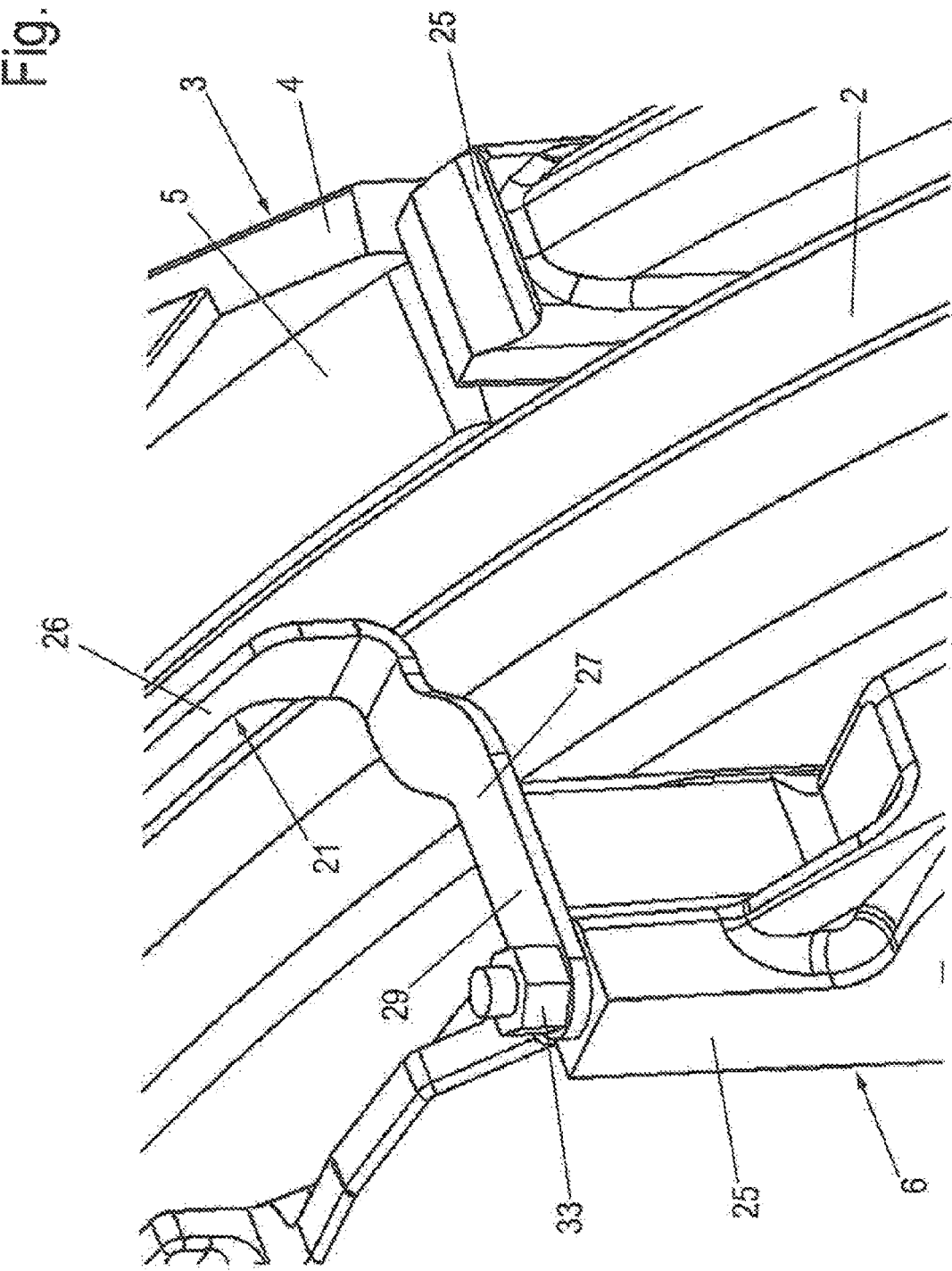

A similar design variant to this is illustrated in FIG. 15, in which, however, the securing of the end limb 27 or of the lug 29 is realized by way of a nut 33 which is screwed onto a threaded peg of the brake carrier horn 25 and which holds the lug 29 on the brake carrier horn 25.

Figure 16:
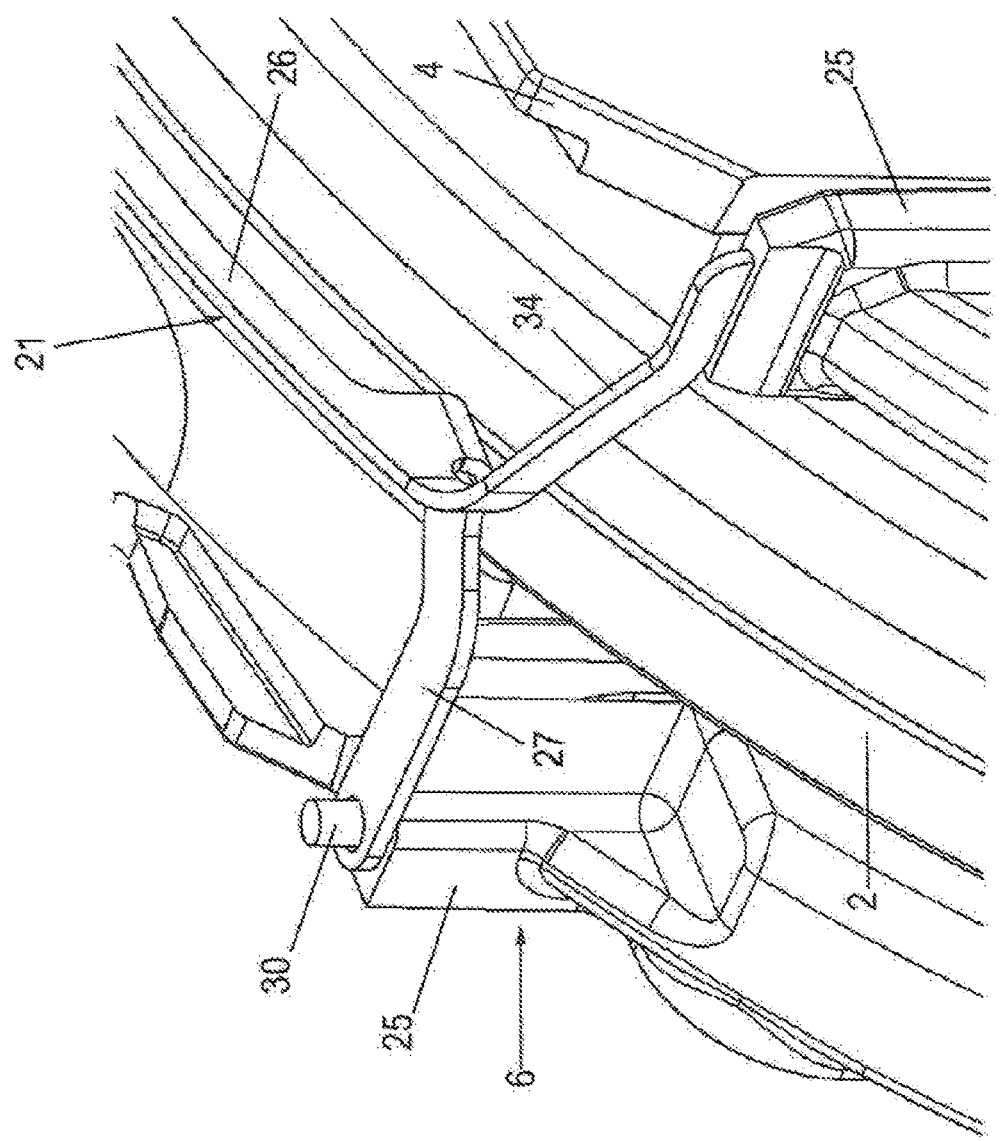

In FIG. 16, a support lug 34 is angled oppositely to the end limb 27 of the retaining bow 21, which support lug lies on the face side of the associated brake carrier horn 25 and, similarly to the support limb 31 as per FIG. 11, forms a radial securing means for the retaining bow 21 and thus for the spreading device 8.

Figure 17:
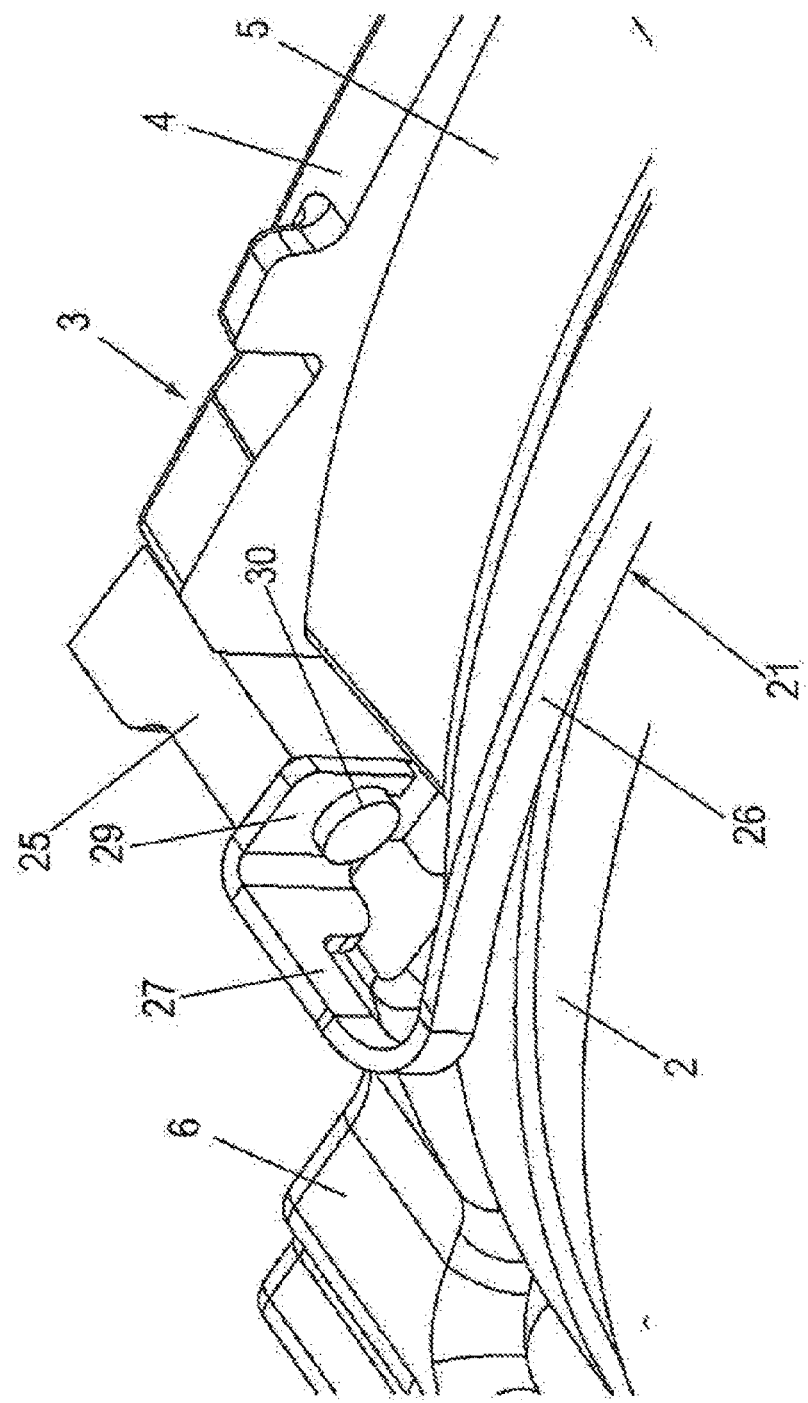

A further variant of the fastening of the retaining bow 21 to the brake carrier horn 25 can be seen in FIG. 17, which illustrates an enlarged detail of the corresponding region of the brake carrier 6.

Here, in this case, the end limb 27 is, at the end side, angled so as to be approximately parallel to the center limb 36 and is plugged onto the peg 30 that is fastened in the brake carrier horn 25.

Figure 18:
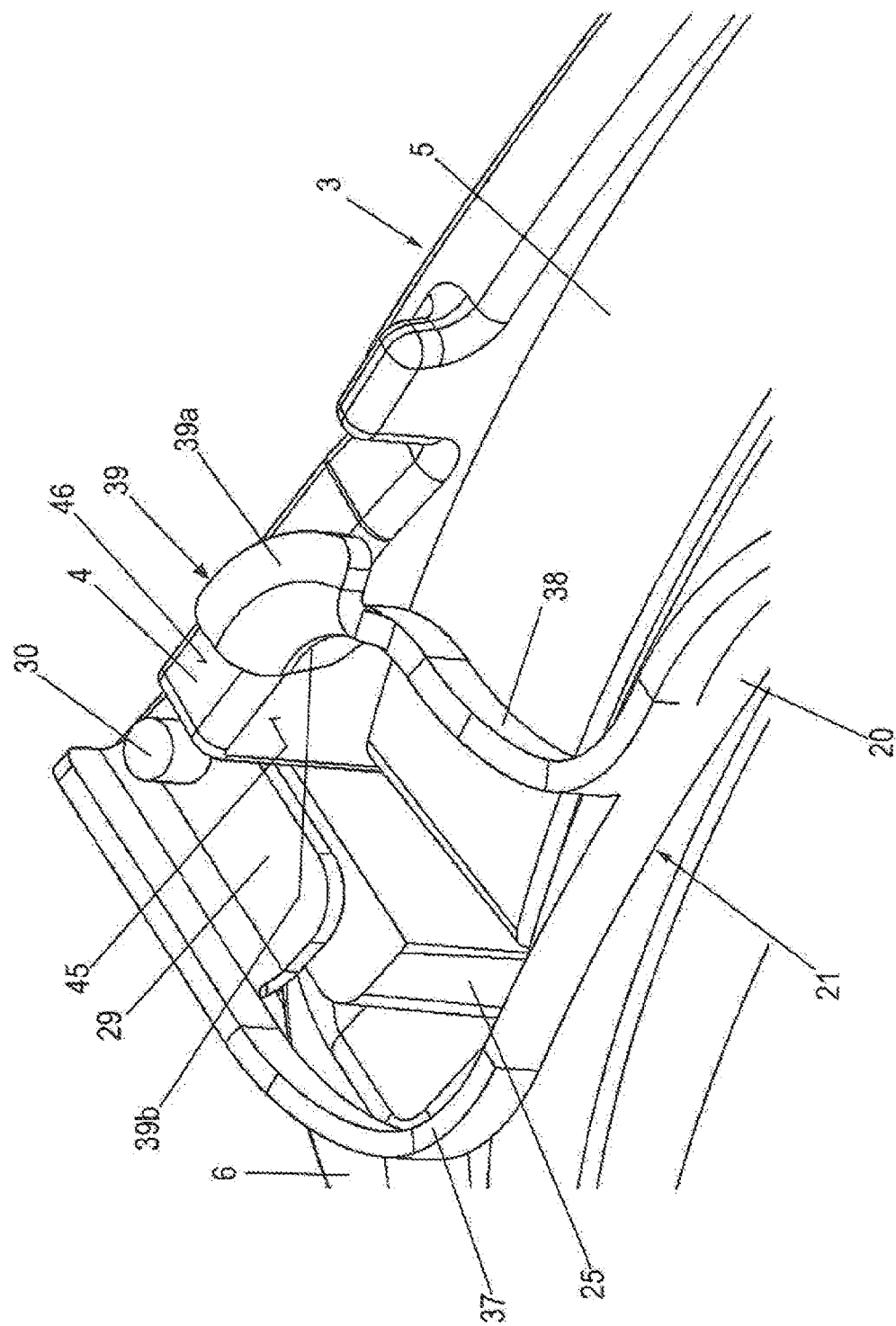

FIG. 18 illustrates a design variant of the spreading device 8 in which the spring arms 20, of which the end section of a spring arm 20 is illustrated, performs both the function of the retaining bow 21 and the spreading function.

For this purpose, the spring arm 20 is, in its end region, split in the longitudinal direction, with a spring web 38 and an attachment web 37 being formed. Here, the spring web 38, which is equipped with an angled lug 39 integrally formed on the end side, performs the spreading function, that is to say is, during the braking-induced displacement of the brake pad 3, braced counter to the spring force, and, after the release of the brake, forces the brake pad 3 into its end position, wherein the angled lug lies against the pad carrier plate 4 both in the bracing direction and in the radial direction, that is to say lies against the upper edge of the pad carrier plate 4.

Similarly to the embodiment as per FIG. 11, the angled lug 39 is divided into two different limbs and has a support limb 39a and a thrust-imparting limb 39b lying at right angles to said support limb. In this example, the support limb 39a and the thrust-imparting limb 39b are however formed not separately but rather so as to be connected together in the form of the angled lug 39. The support limb 39a is in contact, in a radial direction with respect to the brake disc axis of rotation 2a, with the bearing surface 46, wherein the thrust-imparting limb 39b is in contact, in an axial direction parallel to the brake disc axis of rotation 2a, with the abutment surface 45.

By contrast, the attachment web 37 is equipped, on the end, with a lug 29 which has a peg 30, wherein the peg 30 is plugged into a bore 25a (see FIG. 26) of the brake carrier horn 25 in order, as described, to permit centering of the brake caliper 1 after a braking process.

Figure 19:
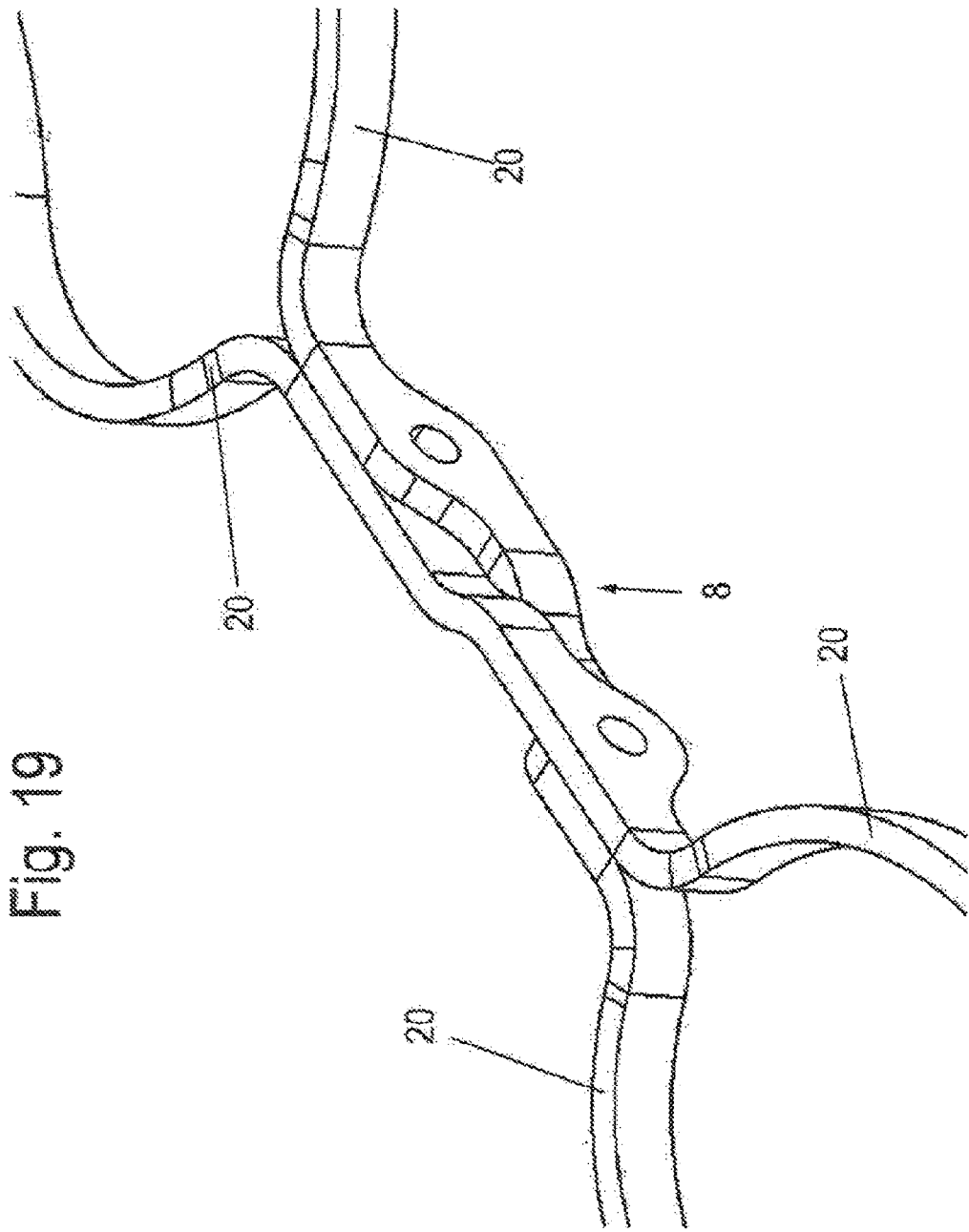

FIG. 19 shows the central region of a further exemplary embodiment of the spreading device 8, in which the spring arms 20 are formed from two criss-crossing individual springs which are fixedly connected to one another in the central region. Here, a spring arm 20 of one individual spring lies against one pad carrier plate 4 and the other spring arm of said individual spring lies against the other, opposite pad carrier plate 4, with a similar situation applying to the spring arms 20 of the other individual spring.

Figure 20:
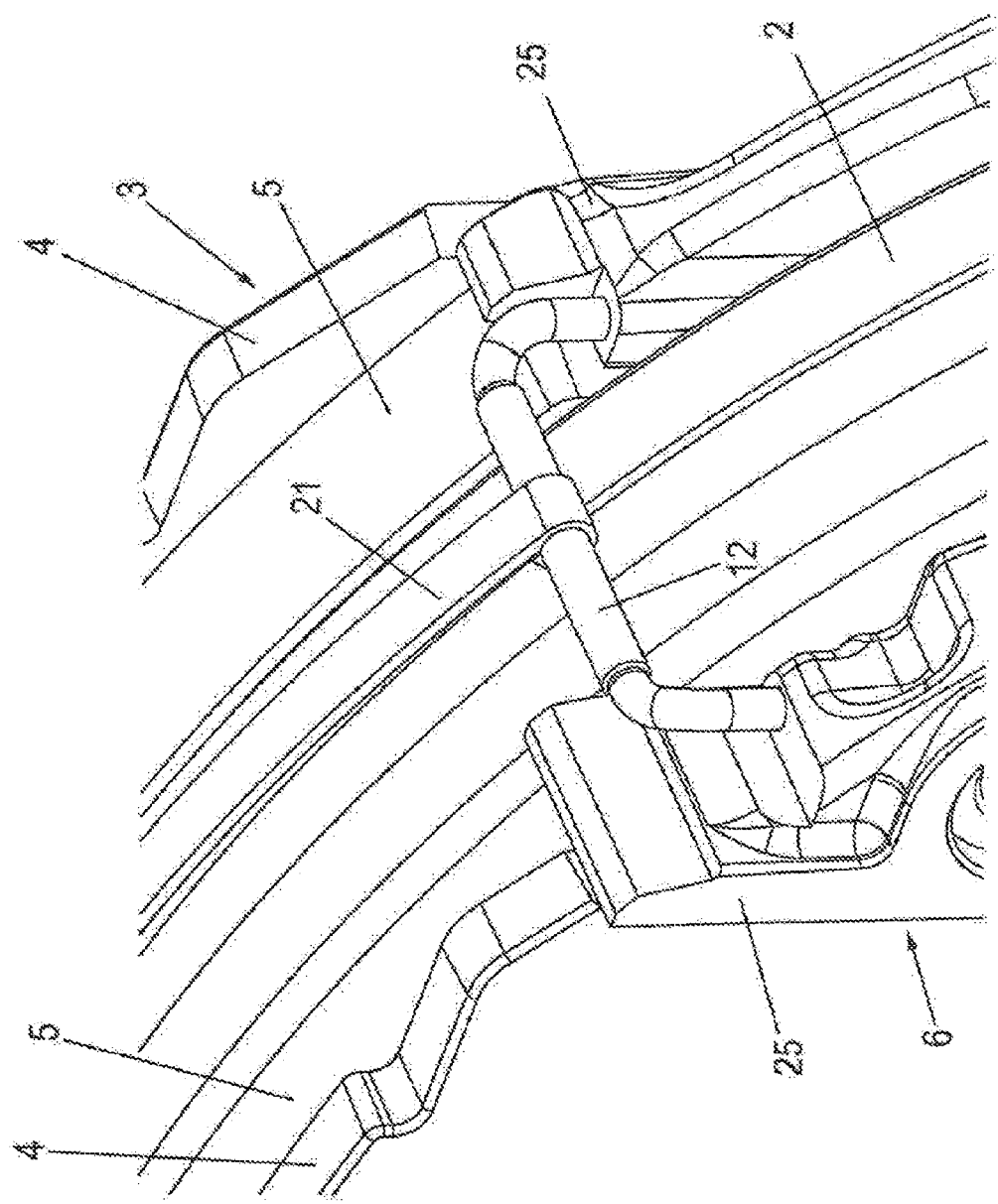

A fastening of the stirrup 12 similar to FIG. 5 is illustrated in FIG. 20. Here, however, the securing means 13 for the retention of the retaining bow 21 has been dispensed with. Instead, the retaining bow 21 is held in axially secured fashion on the stirrup 12 in particular by way of frictional engagement, though conceivably also by way of a positively locking action. Furthermore, the stirrup 12 is plugged into bores 25a of the mutually oppositely situated brake carrier horns 25.

Figure 21:
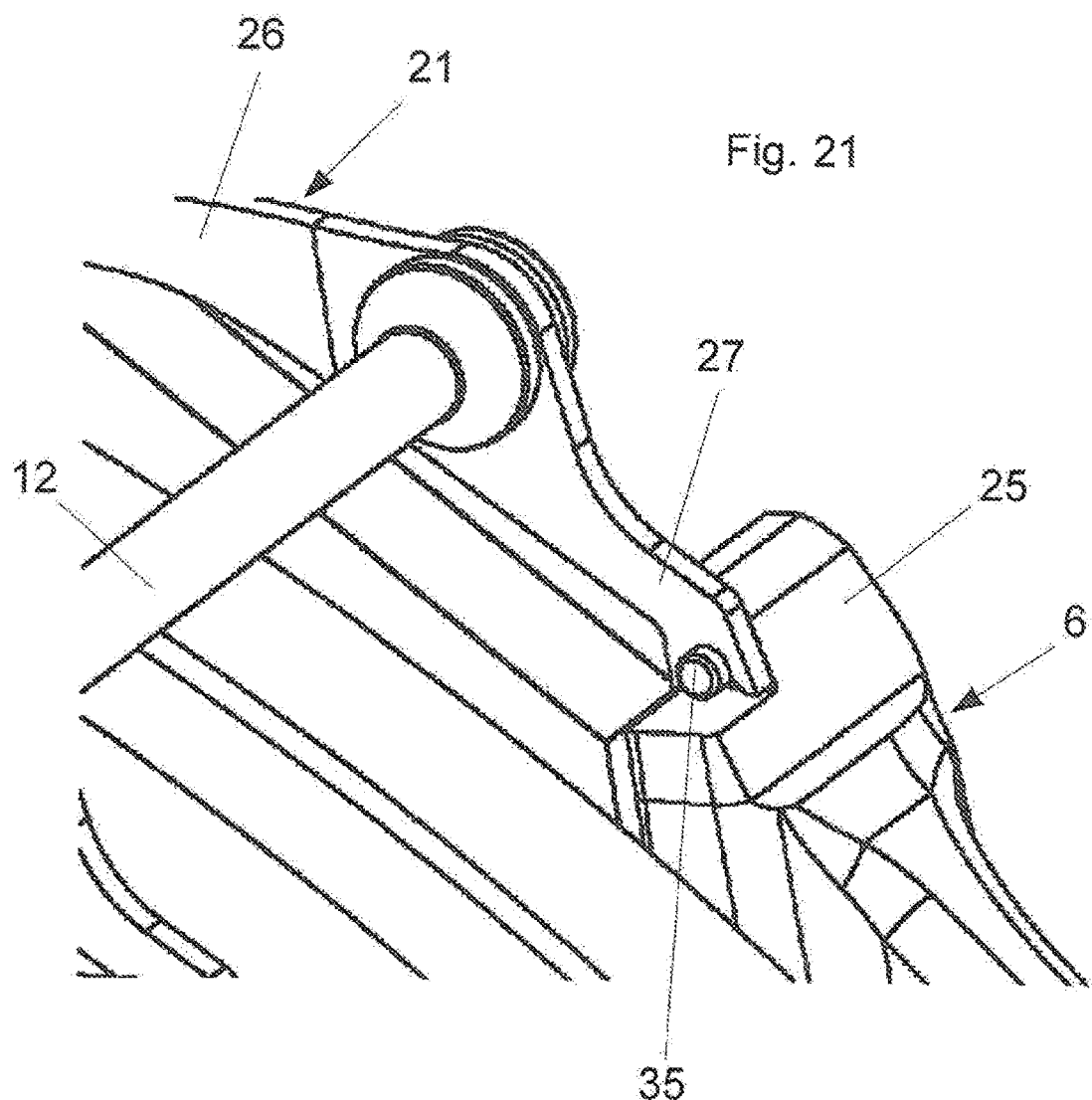

A construction that differs from this can be seen in FIG. 21, which shows an enlarged detail of a fastening of the retaining bow 21.

Here, the stirrup 12 is in the form of a straightened bar and is fastened at the end to the retaining bow 21, the end limb 27 of which adjoins the center limb 26 in an aligned manner, wherein the end limb 27 has a fork-shaped end which engages over a pin 35 which is recessed into the brake carrier horn 25.

Figure 22:
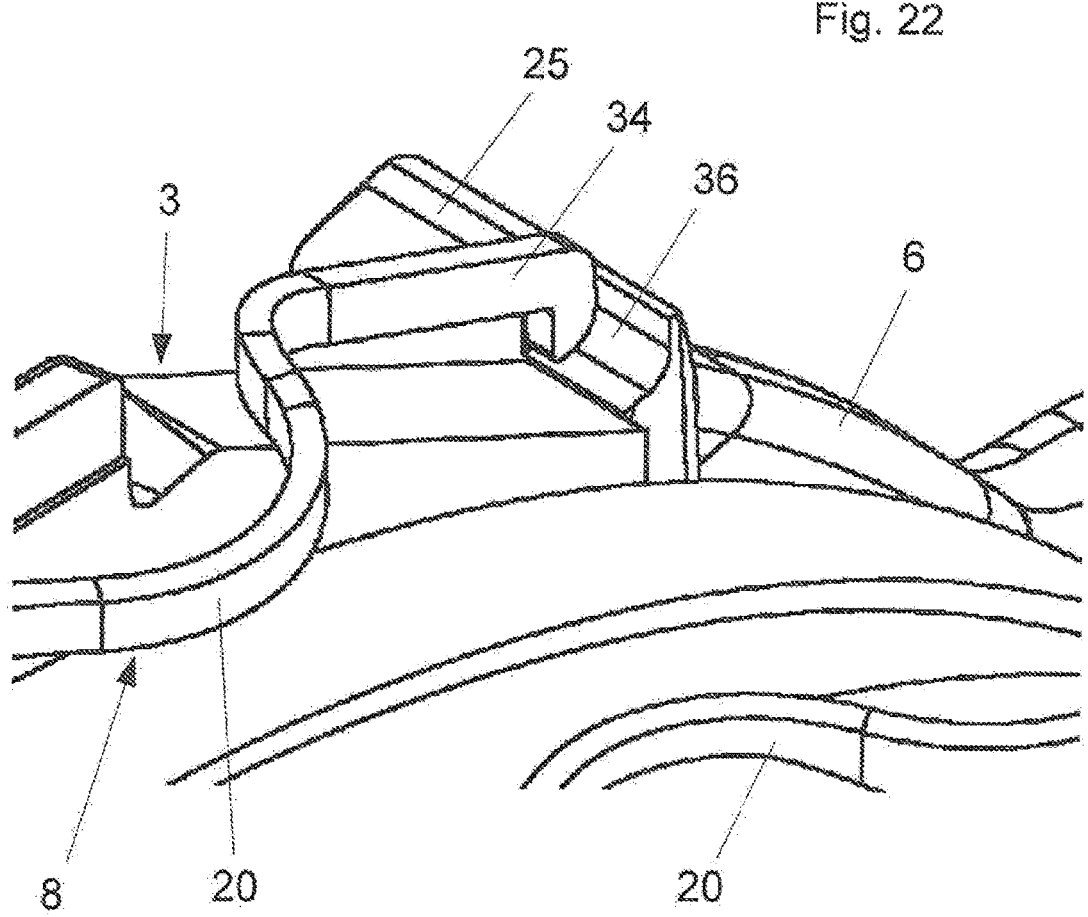

In FIG. 22, likewise an enlarged detail in the region of a brake carrier horn 25, it can be seen that a spring arm 20 of the spreading device 8 is adjoined by a support lug 34 which lies against a support surface 36 of the brake carrier horn 25 and which is supported both in a radial direction with respect to the brake disc 2 and in an axial direction with respect thereto.

Figure 23:
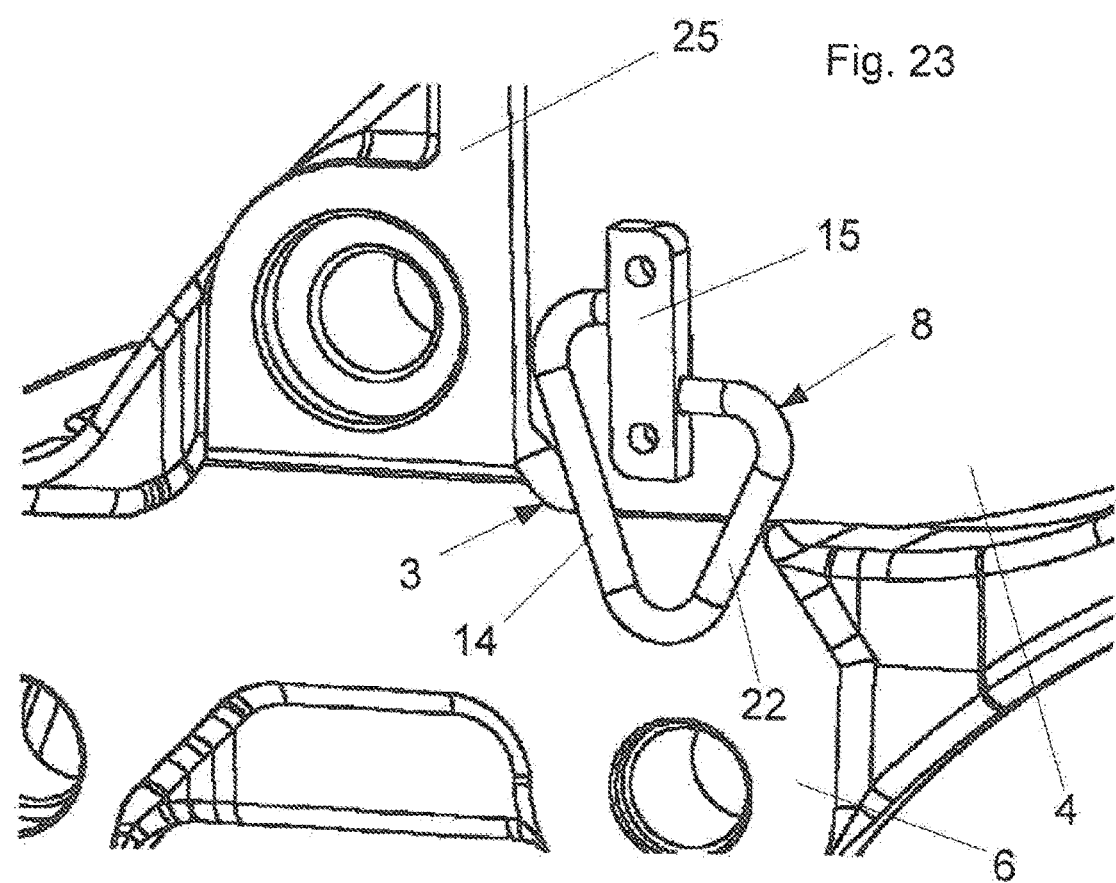

Similarly to the embodiment as per FIG. 2, FIGS. 23 and 24 each illustrate a design variant of the spreading device 8 which is composed of a spring stirrup 14 and an abutment limb 22, which are both inserted, at the end by way of in each case one fastening end 14a, 22a, into the bracket 15, wherein the latter is fastened to the pad carrier plate 4.

Here, the spring stirrup 14 and the abutment limb 22 are fastened, offset with respect to one another and on opposite sides, to the bracket 15 and are supported at the other side on the brake carrier 6, specifically below the pad carrier plate 4 in the example shown in FIG. 23 and on the brake carrier horn 25 in the example shown in FIG. 24.

The bracket 15 is in the form of an elongate rectangular plate with two longitudinal sides 15a, 15b. Here, two diagonally opposite ends are rounded. The fastening end 14a of the spring stirrup 14 is connected to the bracket 15 eccentrically to the right at the top narrow longitudinal side 15a shown in FIG. 24, whereas the fastening end 22a of the abutment limb 22 is connected to the bracket 15 eccentrically to the left at the bottom, other narrow longitudinal side 15b.

The other ends of the spring stirrup 14 and of the abutment limb 22 run obliquely toward one another and are fixedly connected by a connecting bend 220.

The plate of the bracket 15 is in this case equipped with two fastening holes 15c for fastening purposes, for example by way of screws or rivets.

Figure 25:
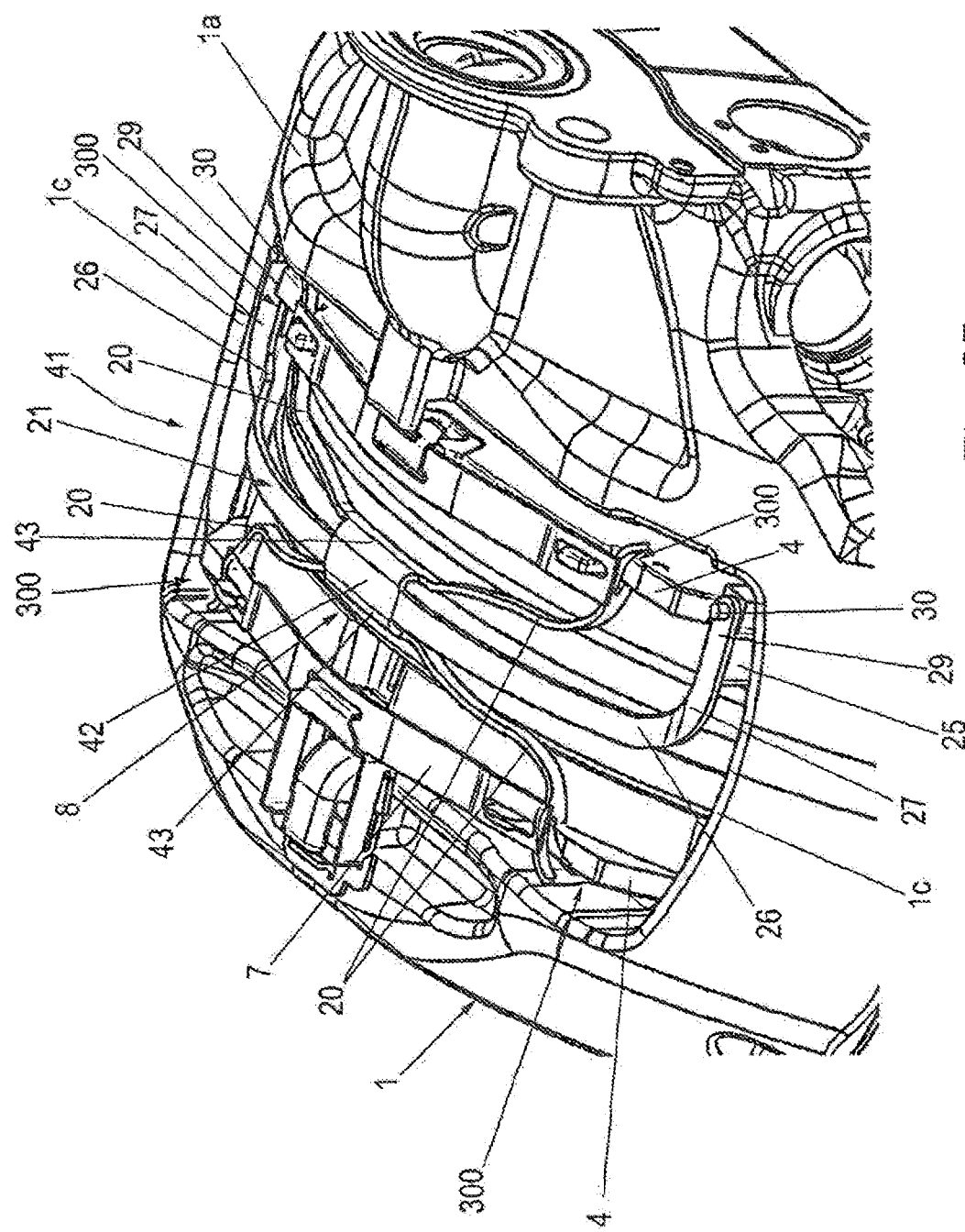

FIG. 25 shows a further exemplary embodiment which is of similar construction to that described in FIGS. 8 to 11, but with some differences.

The retaining bow 21 and the spring arms 20 are in this case formed in one piece, for example as a punched and bent part, and are fixedly connected in a central region by a common base section 42. The base section 42 lies in the virtual center of the opening 41 and in a plane which runs tangentially with respect to the brake disc 2.

From said base section 42, the center limbs 26 of the retaining bow 21 extend to both sides in a downwardly bent manner over the brake disc 2, as shown in the exemplary embodiment as per FIG. 4, as flat strip sections almost as far as the tension struts 1c which laterally delimit the opening 41. At these points, the two center limbs 26 are bent toward the application section 1a of the brake caliper 1 and transition in each case into an end limb 27.

Each end limb 27 has the lug 29 with the peg 30, similarly to the exemplary embodiment as per FIG. 8, but with the difference that the lug 29 is not of widened form. Each end limb 27 runs with its lug 29 in a plane such that the lug 29 lies on the associated brake carrier horn 25. Here, the peg 30 is received in a bore 25a (similarly to the situation shown in FIG. 26) and is fastened to the brake carrier horn 25. This self-evidently applies to both sides and to both brake carrier horns 25.

Furthermore, the base section 42 has, on its two longitudinal sides, in each case one connecting section 43 bent downward through approximately 90° toward the brake disc 2. Each connecting section 43 connects, on each longitudinal side of the base section 42, in each case two spring arms 20 to the base section 42 parallel to the imaginary longitudinal central line of the opening 41, such that an arrangement similar to that in FIG. 8 is obtained. Here, each connecting section 43 lies in a respective plane which is arranged at approximately 90° with respect to the plane of the base section 42 and which runs substantially parallel to the plane of the brake disc 2.

The spring ends 300 of the spring arms 20 are designed as illustrated and described in the exemplary embodiment as per FIG. 8 and in FIG. 11.

Figure 26:
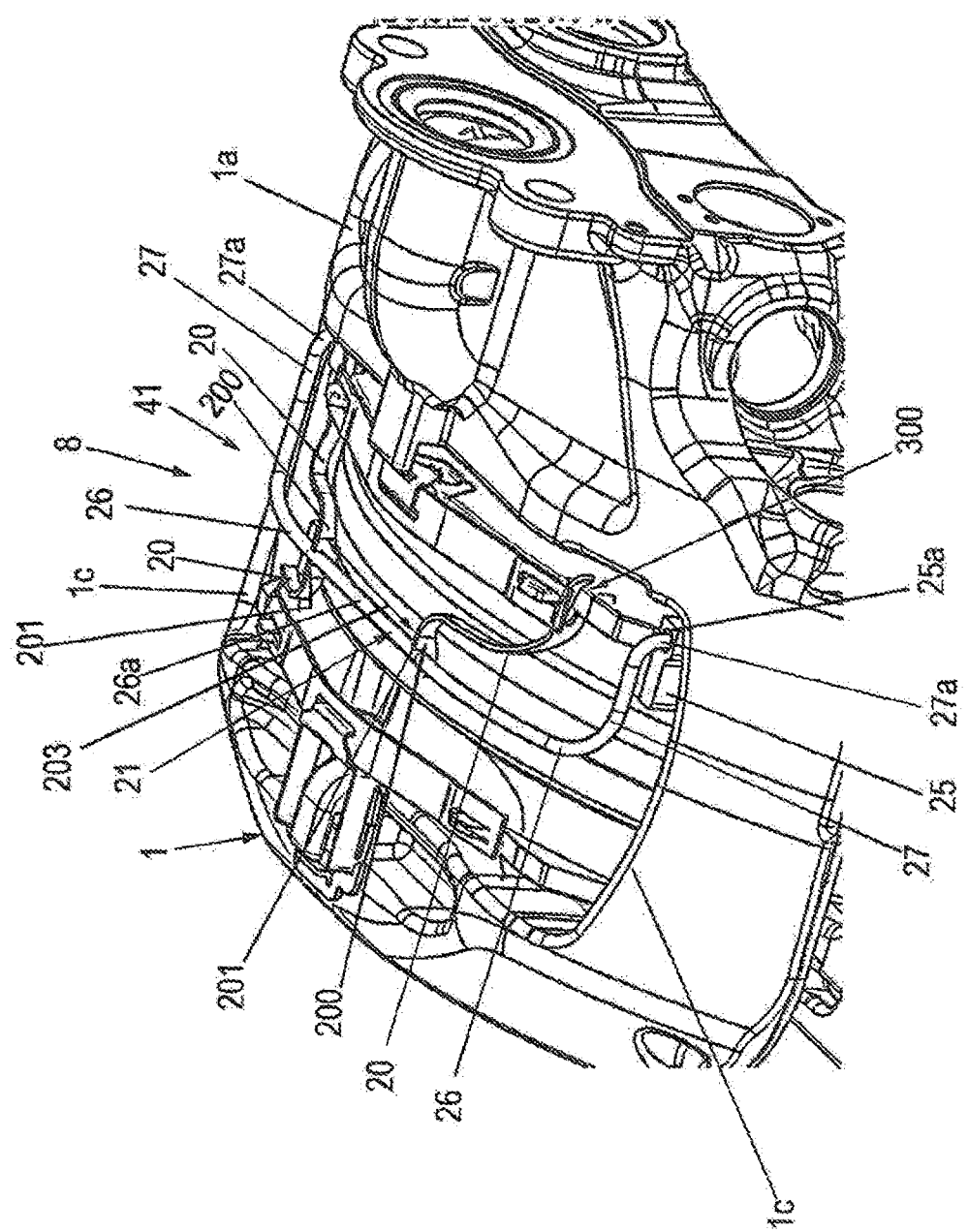

FIG. 26 illustrates a further exemplary embodiment, in which the retaining bow 21 is of wire-like form and has, for example, a circular cross section.

The retaining bow 21 comprises a central section 26a in a central region of the opening 41. The central section 26a is adjoined, on each side, by a center section 26 which runs in each case in an arc in the direction of the application section 1a through an end limb 27 to the respective brake carrier horn 25. Each end limb 27 is then bent downward through approximately 90° into in each case one fastening section 27a. Each fastening section 27a is fastened in a bore 25a of each brake carrier horn 25 of the pad slot of the action-side brake pad 3 and thus realizes the retention of the retaining bow 21 with the spreading device 8 in the brake carrier 6.

Here, the spring arms 20 are connected in each case in pairwise fashion by a connecting section 200 not in the longitudinal direction of the opening 41 but in the transverse direction of the opening 41. Each connecting section 200 is widened in a downward radial direction toward the brake disc axis of rotation 2a and has a recess 201. Each recess 201 communicates with the outer contour of the retaining bow 21 and, here, has a semi-circular cross section which is upwardly open for the purposes of receiving the retaining bow 21. The connecting section 200 of the spring arms 20 thus arranged in pairwise fashion are arranged with a spacing 203 on the central section 26a of the retaining bow 21, wherein the center of the central section 26a is assigned to the virtual center of the opening 41 and forms the center of the spacing 203. A dimension of the spacing 203 corresponds in this case to approximately one quarter of the longitudinal extent of the opening 41. The dimension of the spacing 203 may for example lie in a range of 30 to 50% of the longitudinal extent of the opening 41 either symmetrically with respect to the virtual center of the opening 41 or without a relationship to the virtual center of the opening 41. The spring arms 20 may be connected to the retaining bow 21 for example by welding, pressing or both.

The spring arms 20 and the connecting sections 200 thereof are for example formed in one piece as punched and bent parts composed of spring steel strip.

Figure 27:
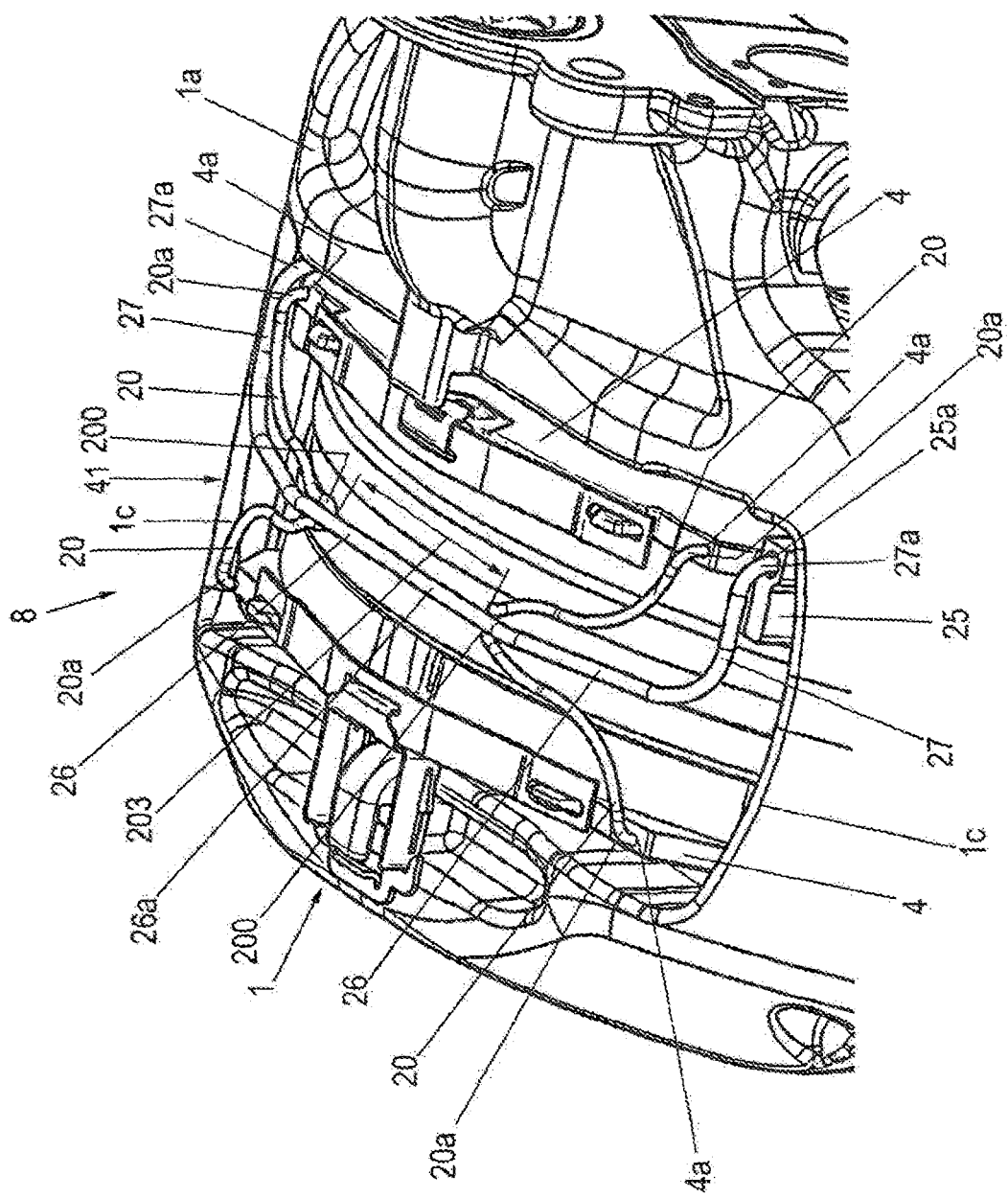

In the exemplary embodiment of FIG. 27, the retaining bow 21 is designed as in the embodiment as per FIG. 26. Here, however, the spring arms 20 arranged in pairwise fashion in the transverse direction of the opening 41, including their connecting sections 200, are of wire-like form. The connecting sections 200 are bent so as to form receptacles for the retaining bow 21. The spring arms 20 are in each case fixed upwardly by the retaining bow 21, which is in turn pushed downward by the pad retaining stirrup 28. With increasing pad wear, the connecting sections 200 move toward one another in the direction of the center.

The ends of the spring arms 20 are in each case in the form of a downwardly bent fastening section 20a. Each fastening section 20a is received, from the top side, in a receiving hole 4a on each end region of a pad carrier plate 4. In this way, the spreading device 8 transmits its spreading forces between each fastening section 20a in the associated receiving hole 4a to the respective pad carrier plates 4.

Figure 28:
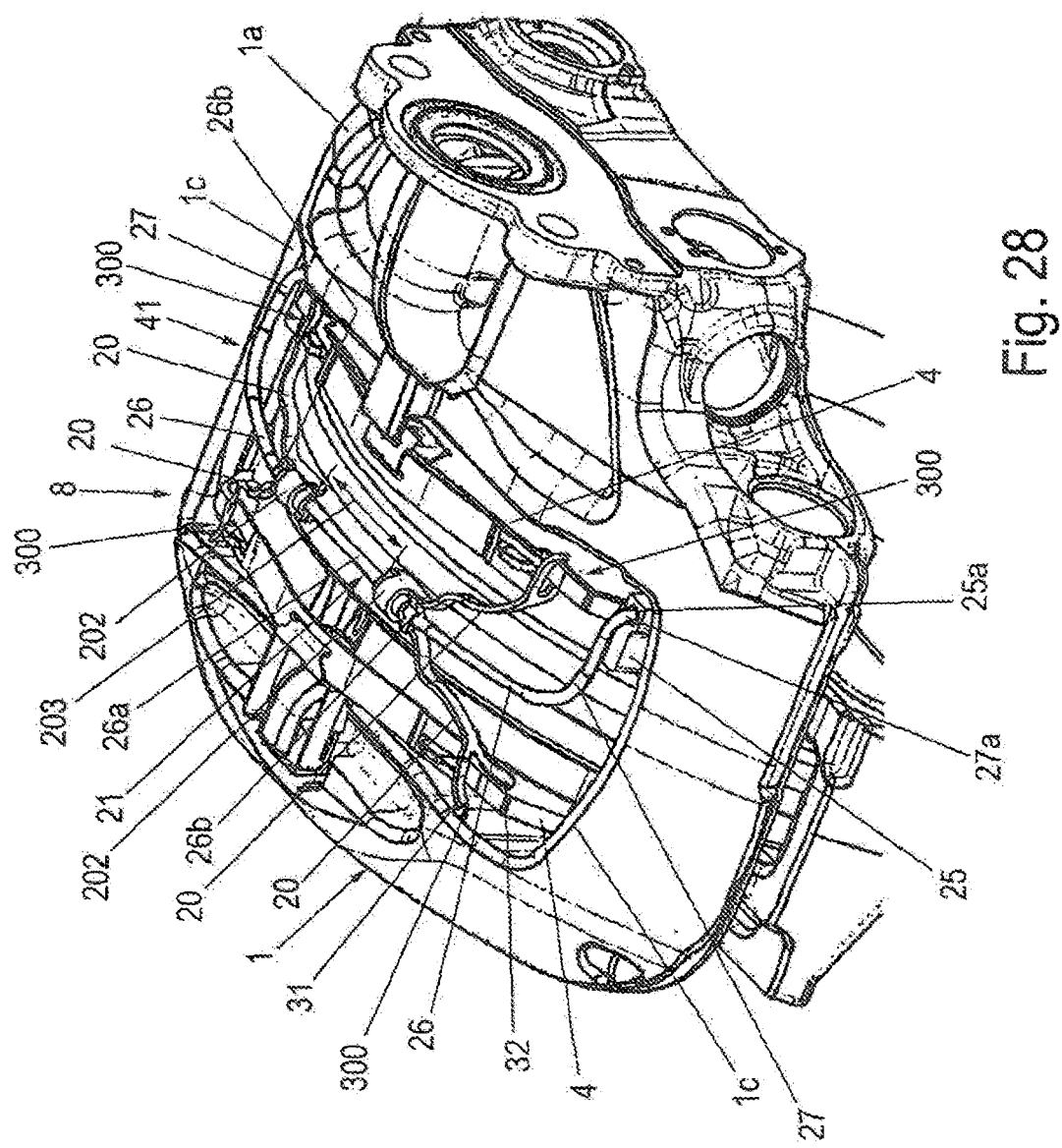

FIG. 28 shows an exemplary embodiment in which the retaining bow 21 is, as in the embodiments as per FIGS. 26 and 27, of C-shaped form. The spring arms 20 have spring ends 300 as per FIG. 11. Furthermore, the spring arms 20 are arranged in pairwise fashion in the transverse direction of the opening 41. Each pair of spring arms 20 is connected, at the other ends thereof, by way of a respective hood-type connector 202.

Each hood-type connector 202 has a receiving opening, pointing downwardly toward the brake disc 2, in the longitudinal direction of the central section 26a of the retaining bow 21, which receiving opening communicates with the outer contour of the central section 26a of the retaining bow 21.

The spring arms 20 which are connected in pairwise fashion to in each case one hood-type connector 202 are arranged with their respective hood-type connector 202 on the central section 26a. To fix the two spring arms 20 or spreading elements on the retaining bow 21, in each case two clamps are introduced, which are composed of half-shells and which, offset with respect to one another, clamp the spreading elements to the retaining bow 21. To ensure the spacing 203, weld points are additionally also formed between the components. Furthermore, clamps serve as spacers between the retaining bow 21 and spring arms 20. This is necessary in the embodiment as per FIG. 28 because the hardened spring arm 21 cannot be placed with such a small radius on the retaining bow 21.

Figure 29:
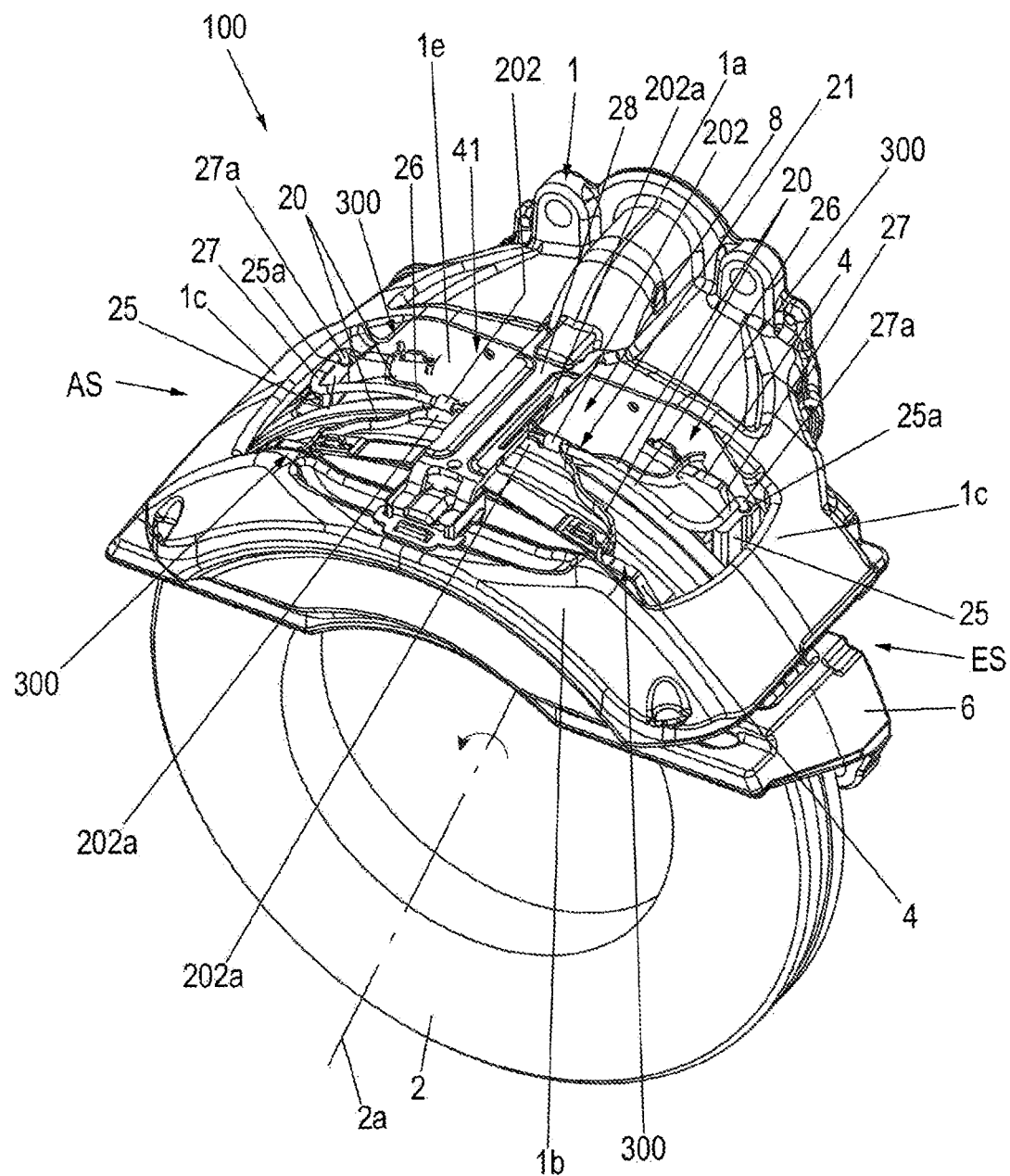
FIG. 29 shows a perspective view of a further exemplary embodiment of the disc brake.

FIG. 29 shows a disc brake 100 in a perspective illustration with the brake disc 2 and the brake disc axis of rotation 2a.

A rotation arrow about the brake disc axis of rotation 2a indicates a main direction of rotation for forward travel of a vehicle to which the disc brake 100 is assigned. A run-in side ES and, opposite, a run-out side AS, of the disc brake 100 are defined in relation to the main direction of rotation of the brake disc 2. Accordingly, the brake carrier horns 25 on the run-in side ES are referred to as run-in-side brake carrier horns 25, and those on the run-out side AS are referred to as run-out-side brake carrier horns 25.

In this exemplary embodiment, the spreading device 8 is constructed in substantially the same way as the spreading device 8 of the exemplary embodiment as per FIG. 28. A difference in relation to the exemplary embodiment as per FIG. 28 however consists in the fact that, in FIG. 29, the hood-type connectors 202 on both sides of the retaining bow 21 are connected by way of in each case one longitudinal connector 202a. Furthermore, the embodiment has no additional clamps. By contrast a FIG. 28, the spreading device 8 is composed of one part with four spring arms 20.

In preferred embodiments, a length of the spring arms 20, taken together, in the longitudinal direction of the opening 41 corresponds to approximately 60 to 95% of a pad slot length, particularly preferably 70 to 80% of a pad slot length. The pad slot length is to be understood to mean the spacing of the associated brake carrier horns 25.

The spreading device 8 is composed of two spreading elements, which are connected to one another in a longitudinal direction. The two spreading elements are connected to one another centrally (in relation to the brake carrier horns 25). It is thus possible to ensure a spring force which is identical—in a small tolerance range—both on the run-in side and on the run-out side. Different spring forces between run-out side AS and run-in side ES, which can lead to oblique wear, are minimized by way of the unilateral engagement of in each case one spring arm 20 per brake pad. The central web between the two spreading elements may be connected to the retaining bow 21 by means of a weld seam.

A uniform application of force by the spring arms 20 on the action side and on the reaction side, or on the side of the application section 1a (thrust-piece side) and on the side of the caliper rear section 1b (caliper side), can be realized by way of a flexible adjustment of the center web, that is to say of the retaining bow 21. Furthermore, it is possible for slight incorrect geometrical positioning of brake disc 2, friction pad 5 and pad carrier plate 4 to be compensated by way of the flexible center web.

By way of the center web, it is possible for the spreading device 8 as an active resetting device (ACR) to be easily positioned and held down by the pad retaining stirrup 28. It is advantageously possible, during a pad change, for the spreading device 8 to be easily removed and also exchanged.

Through the utilization of the entire pad slot length between the brake carrier horns 25, it is possible for use to be made of spreading elements or spring arms 20 with a relatively low spring rate in order to impart substantially constant forces in the event of pad wear. Owing to the long spring travels, the spring arms 20 can be tolerant with regard to spring forces. The spring travels lead to a constant spring rate with low tolerances.

In one design variant, use may be made of only two springs.

The spreading elements, that is to say the spring arms 20, may be formed from inexpensive and geometrically flexible metal sheets.

As a result of the offset with different centers of rotation, it is possible to replicate a relatively low spring rate (see FIGS. 2, 23 and 24). It is advantageously the case that only a small number of windings is required.

Figure 30:
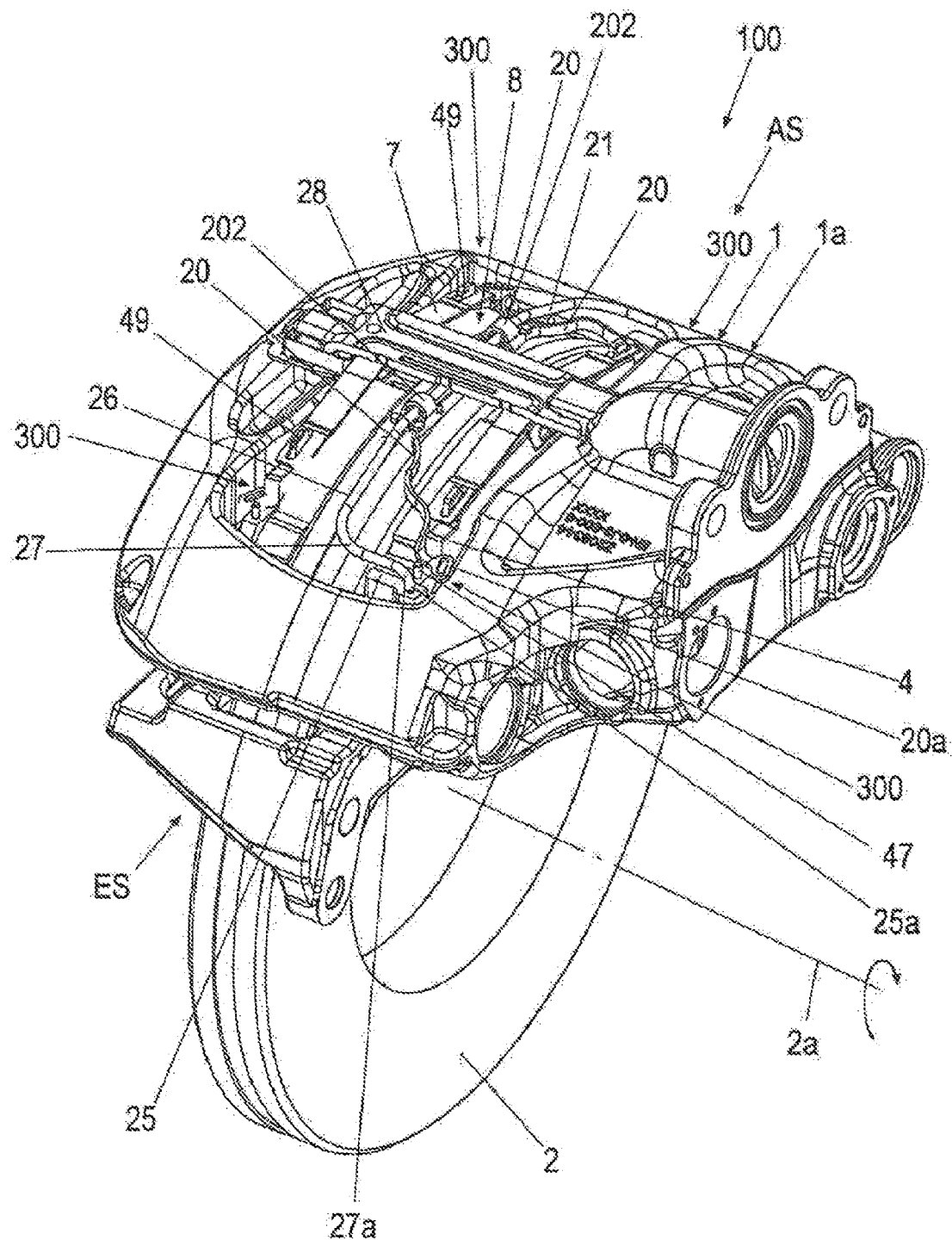
FIG. 30 shows a perspective view of a yet further exemplary embodiment of the disc brake.
Figure 31:
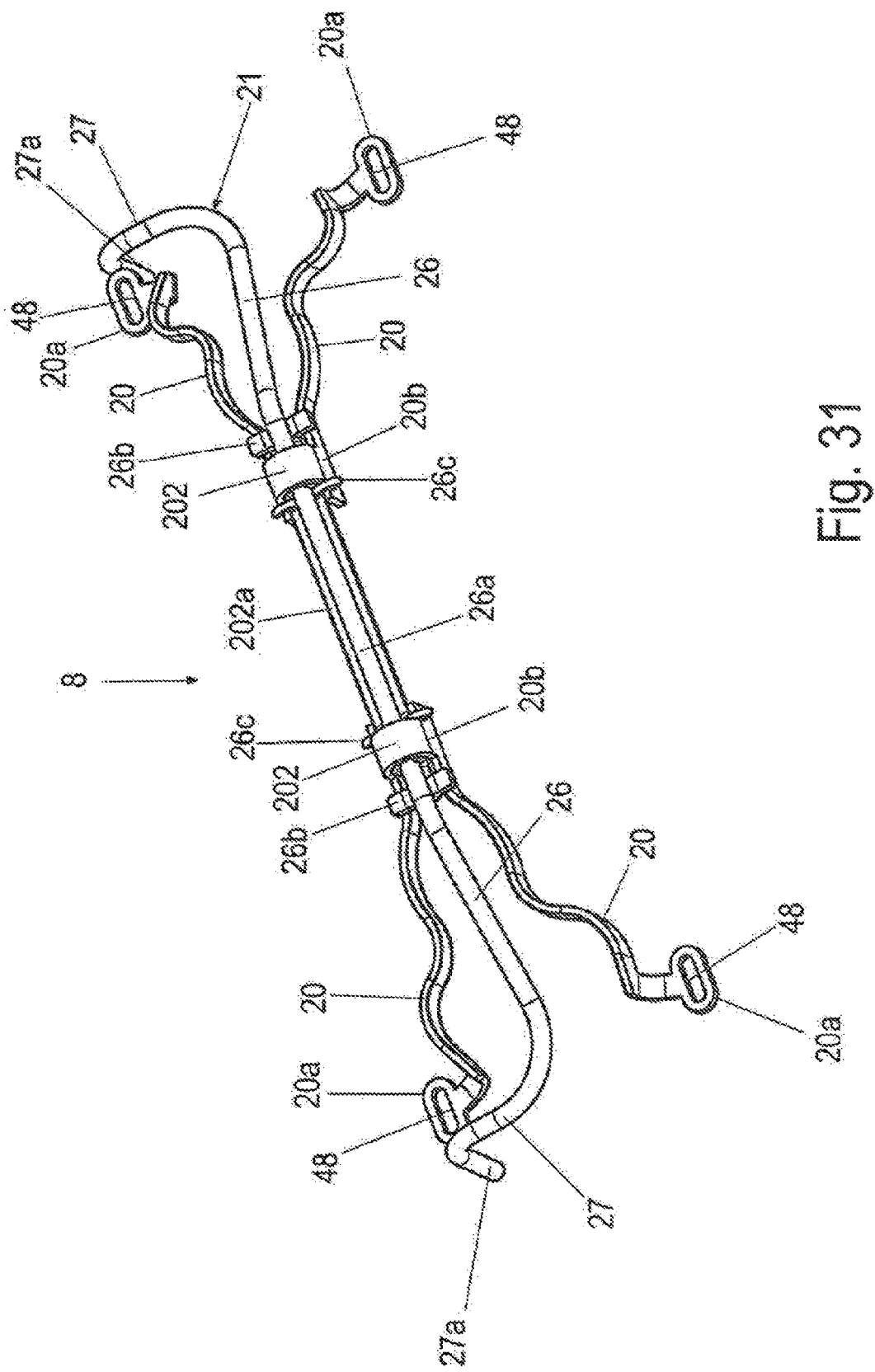
FIG. 31 shows a perspective view of the spreading device of the exemplary embodiment of the disc brake as per FIG. 30.
Figure 32:
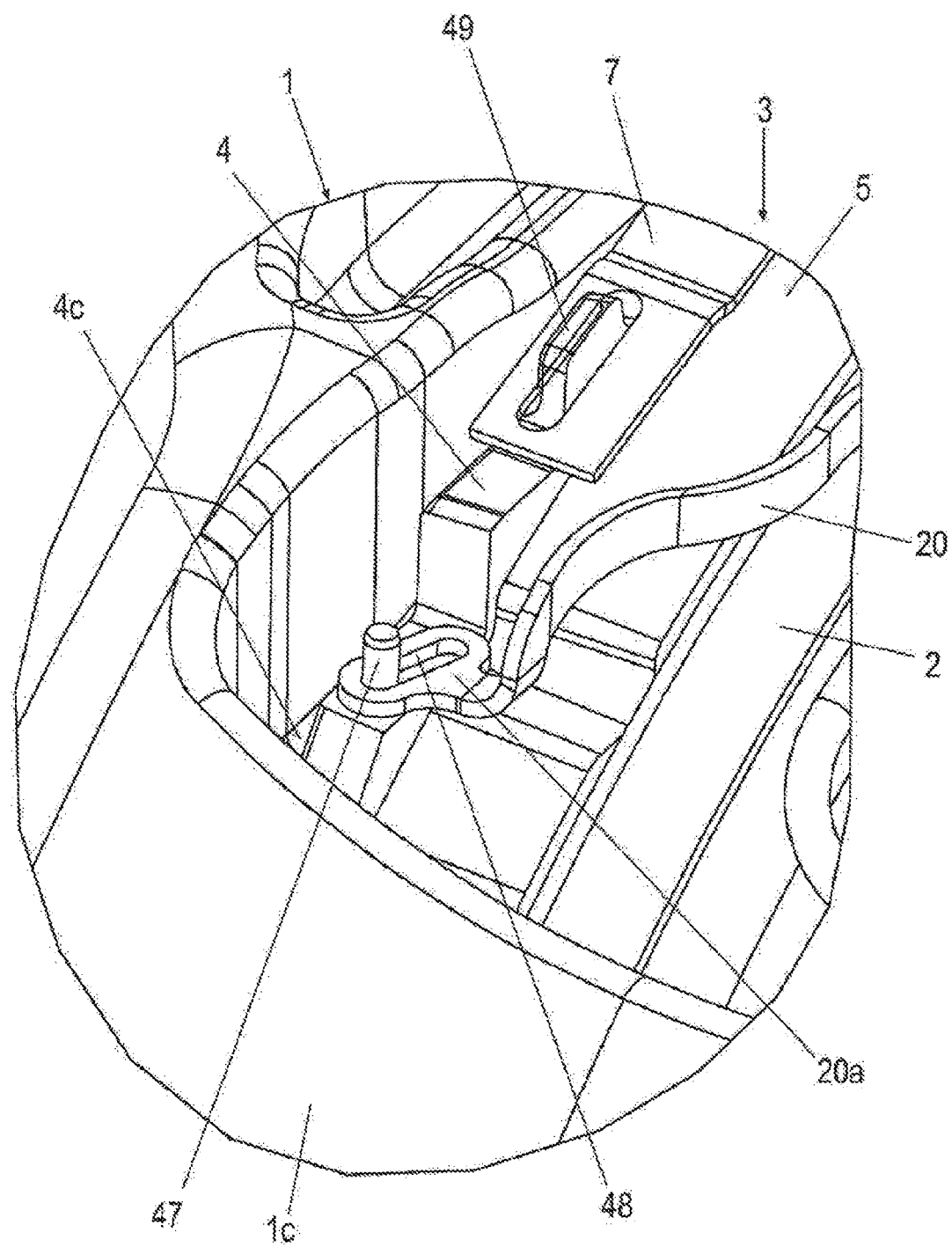
FIGS. 32-33 shows enlarged detail illustrations of the spreading device as per FIG. 31.
Figure 33:
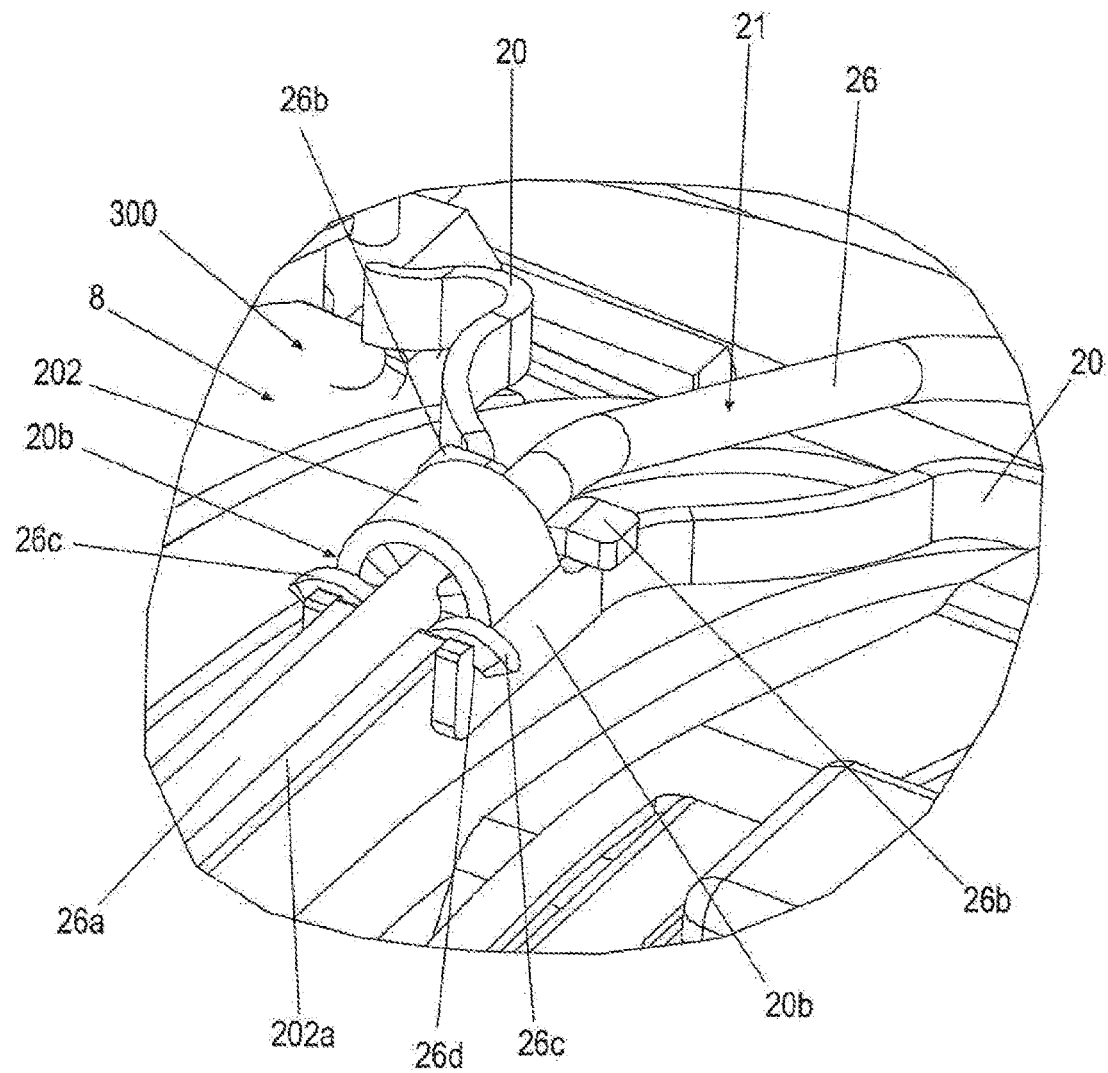

FIG. 30 shows a perspective view of a yet further exemplary embodiment of the disc brake 100. FIG. 31 shows a perspective view of the spreading device 8 of the exemplary embodiment of the disc brake 100 as per FIG. 30. FIGS. 32 and 33 illustrate enlarged detail illustrations of the spreading device 8 as per FIG. 31.

This further exemplary embodiment is of similar construction to the exemplary embodiment of the disc brake 100 as per FIGS. 28 and 29. It is therefore sought to discuss only the differences.

The spreading device 8 is in this case equipped with elongate fastening sections 20*a* on the spring ends 300 of the spring arms 20. Said fastening sections 20*a* are formed, in their respective longitudinal direction, with an elongated hole 48 which serves as a guide section for the spring ends 300 of the spreading device 8.

In the assembled state of the disc brake 100, the fastening sections 20*a* interact, by way of their elongated holes 48, in each case with a pin 47, as can be clearly seen for example in FIG. 32. Here, the outer surface of the pin 47 has an abutment surface of the pad carrier plate 4. A pin 47 is fixedly connected to the pad carrier plate 4, for example inserted into a bore, at each end of a pad carrier plate 4. Here, an end, protruding from the pad carrier plate 4, of the pin 47 extends through the associated elongated hole 48 of the respective spring end 300 of the spreading device 8. Central axes of the pins 47 run parallel to one another and perpendicular to the brake disc axis of rotation 2*a*. The elongated holes 48 permit relative movements between the spring arms 20 of the spreading device 8 and the brake pads 3, which move in the direction of the brake disc axis of rotation 2*a*. The spring forces of the spring arms 20 make it possible for the brake pads 3 to be released from the brake disc 2 and reset after a braking operation, as already described above. The bore for the pin 47 is in turn arranged very exactly relative to the center of the brake disc 2. The above remarks regarding tolerances in conjunction with FIG. 13*a* also apply in this regard.

Here, the fastening sections 20*a* lie in each case on a bearing surface 4*c* of the respective pad carrier plate 4. The bearing surfaces 4*c* run tangentially with respect to the brake disc 2 and, in the case of each brake pad 3, lie in a plane.

The design of the spreading device 8 is illustrated in FIG. 31.

The spreading device 8 comprises two spreading elements with in each case two spring arms 20, a clamp and the retaining bow 21.

The hood-type connectors 202 are connected on both sides in each case to a connecting section 20*b* which forms in each case an extension of the spring arms 20, and said hood-type connectors are bent into a sleeve-shaped form around the central section 26*a* of the retaining bow 21. In this way, each hood-type connector 202 together with the two associated spring arms 20 is mounted rotatably on the central section 26*a* of the retaining bow 21, wherein the spring arms 20 are connected to one another by means of the hood-type connector 202.

The clamp has a central web, which is referred to here as longitudinal connector 202*a*, four bent-over lugs as securing elements 26*c*, and four hold-down means as widened portions 26*b*, which are intended to push the spring arms 20 onto the pad carrier plates 4.

The widened portions 26*b* lie, in each case at both sides at the transition of the central section 26*a* to the center limb 26 of the retaining bow 21, on the connecting sections 20*b* of the spring arms 20. In this way, the widened portions 26*b* prevent a lift-off of the hood-type connectors 202 from the central section 26*a*. At the same time, the widened portions 26*b* form an axial stop for the hood-type connectors 202, with the spring arms 20 fastened thereto, in the direction of the longitudinal axis of the central section 26*a* outward, that is to say in each case outward from the center of the opening 41 toward the tension struts 1*c* (see FIGS. 30 and 33).

The respective two connecting sections 20*b* of the spring arms 20 point with their free ends toward the center of the opening 41 and are in each case connected in their end regions to the securing element 26*c*. The securing element 26*c* is composed of in each case two bent-over lugs which are fixed in each case with one end in a groove 26*d* in each case one end region of the connecting sections 20*b*. In this way, the securing elements 26*c* serve to further secure the hood-type connector 202 against release from the central section 26*a*.

By contrast to the embodiment as per FIG. 30, only one clamp is required here instead of four clamps. The bracing of the spreading elements is ensured by means of the bent-over lugs as securing elements 26*c* of the clamp, which are bent over during the installation process and engage into the groove 26*d*. The spreading element is thus secured such that it does not slip in the direction of the center and tilt toward the pad carrier plate 4.

By virtue of the fact that the center web (longitudinal connector 202*a*) of the clamp is furthermore of continuous form, the clamp can also no longer slip axially on the retaining bow 21. It is thus possible to dispense with weld seams or further fixing means. The clamp additionally also serves again as a spacer (see FIG. 28).

Figure 34:
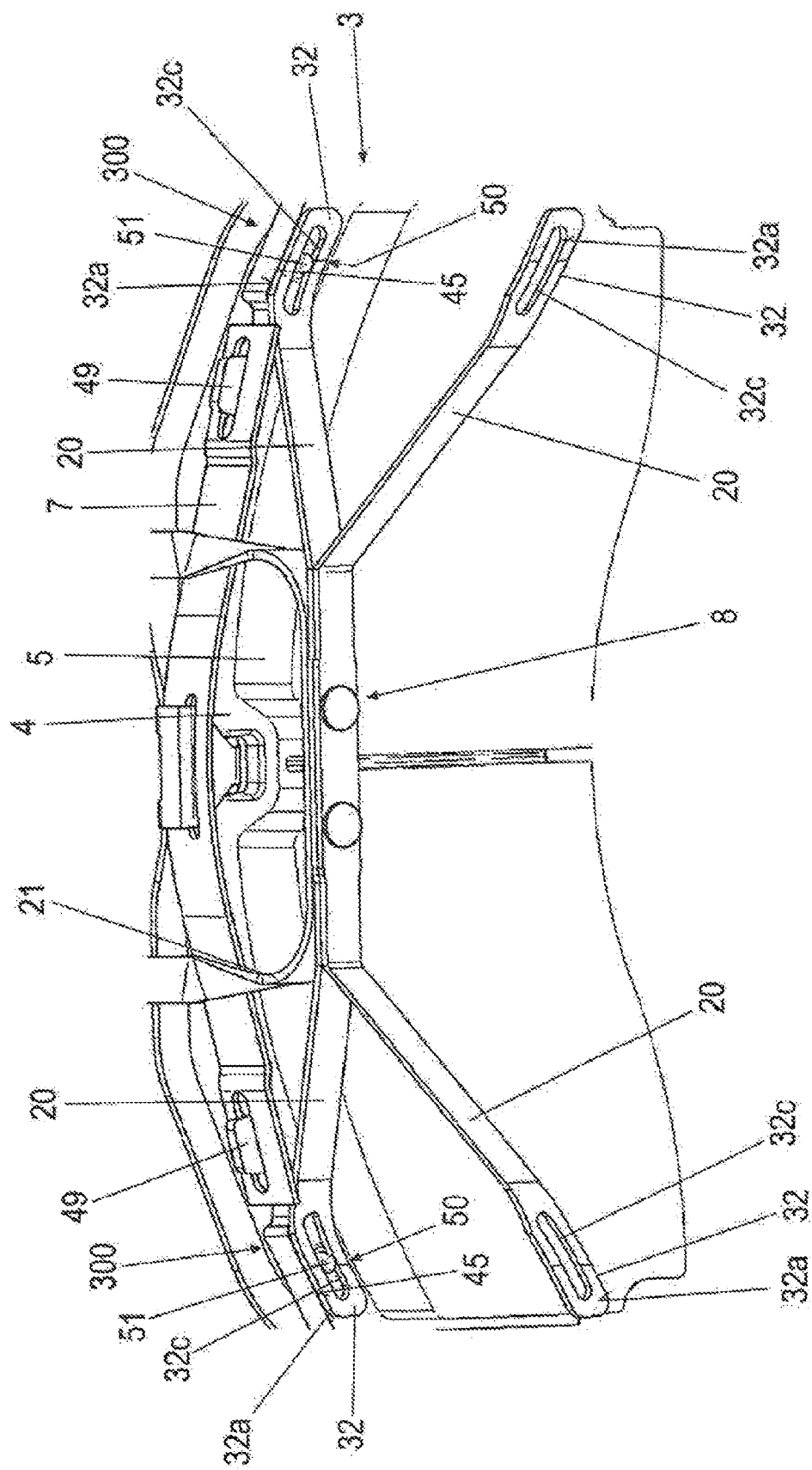
FIGS. 34-41 show further exemplary embodiments of the invention, in each case as a detail of the disc brake.
Figure 35:
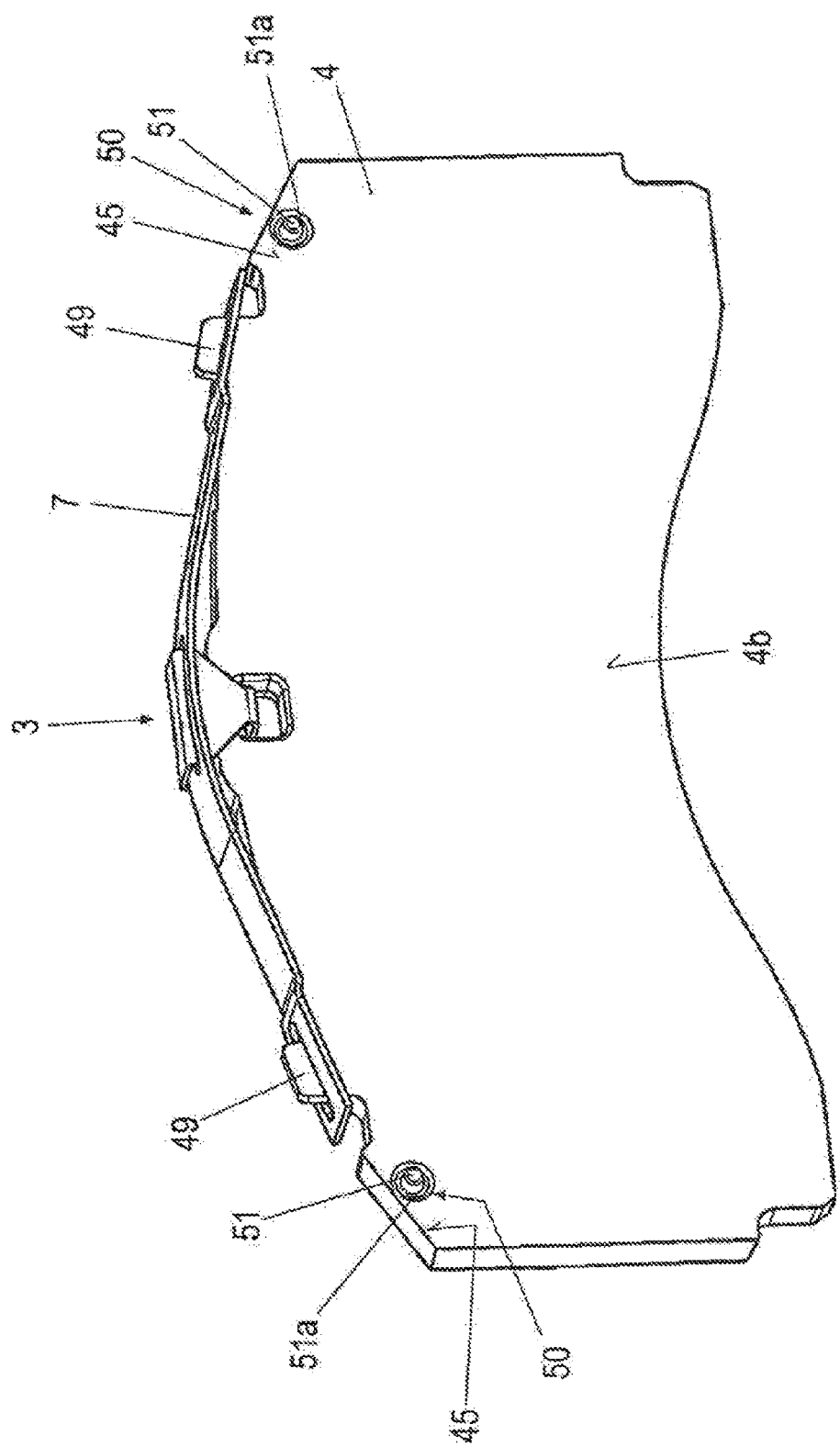
Figure 36:
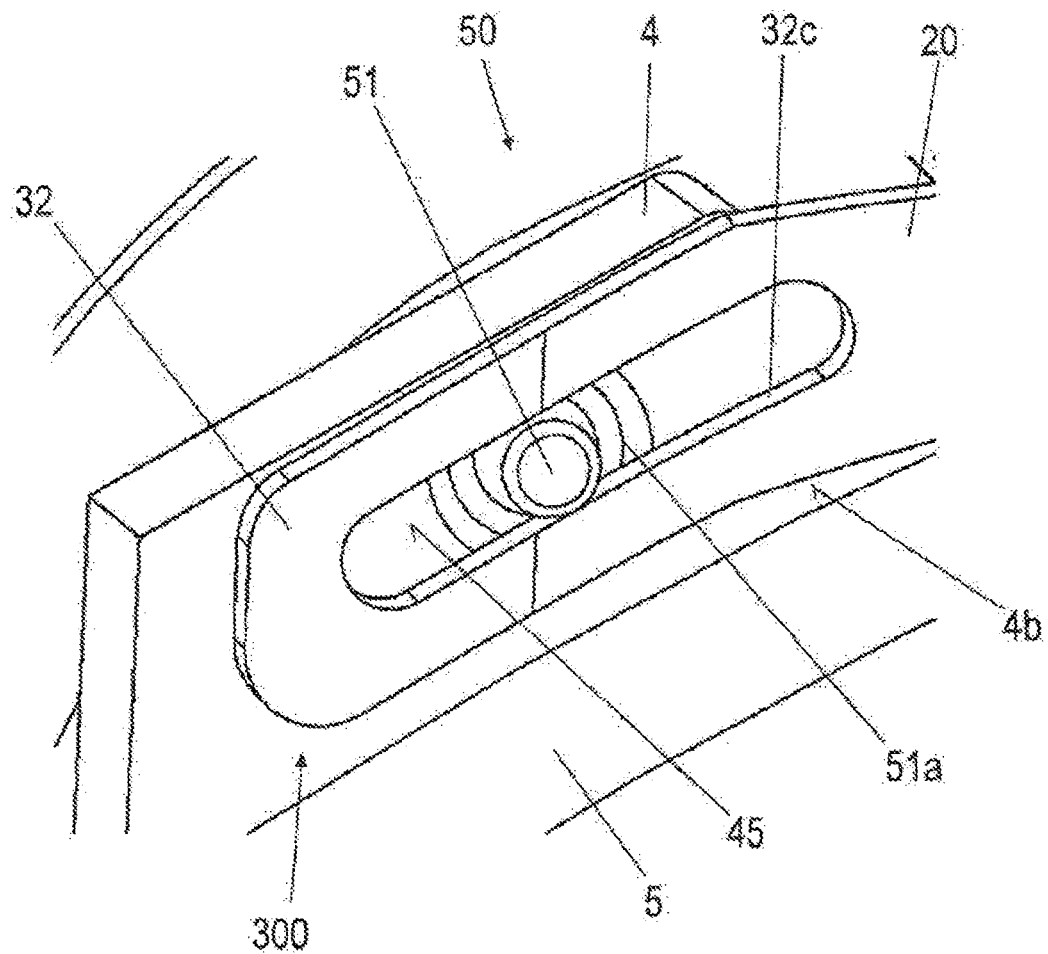

FIG. 34 shows a perspective view of a further spreading device 8. FIG. 35 shows an associated pad carrier plate 4 in a view of its pad side 4*b*. FIG. 36 illustrates an enlarged view of a thrust-imparting limb 32 with a contour 50.

The embodiment of the further spreading device 8 is similar to the embodiment as per FIG. 5 and FIG. 13. By contrast thereto, the spring ends 300 of the spring arms 20 in this case have in each case one thrust-imparting limb 32 with a guide opening 32*c*. The guide openings 32*c* respectively interact with a contour 50 which, in this case, is formed as a cylindrical projection in the form of a peg 51.

The contour 50 is also referred to as interference contour and is for example molded as a peg 51 onto the pad side 4*b* of the pad carrier plate 4. Required casting radii 51*a* may in this case run so as to be offset into the pad carrier plate 4. The peg 51 protrudes from the pad side 4*b* in the direction of the brake disc axis of rotation 2*a*. In each case one peg 51 is provided at each corner, that is to say between a projection 49 for the retention of the pad retaining spring 7 and a side edge. The abutment surface 45 is arranged around each peg 51.

The thrust-imparting limbs 32 are, during the installation process, mounted with their guide sections 32*c* over the respective interference contour 50. Here, each peg 51 extends through the associated guide section 32*c* of the thrust-imparting limb 32. The thrust-imparting limbs 32 are in contact, by way of their abutment sections 32*a*, with the respective abutment surface 45 of the pad carrier plate 4.

In this way, during actuation of the disc brake 100, each guide section 32*c* can, with the thrust-imparting section 32, move laterally with respect to the peg 51, wherein the guide sections 32*c* thus guide each spring arm 20 in a radial direction. However, in a radial direction, slipping of the spring arms 20 is prevented by means of positive locking in both radial directions. Thus, vibrations and other disruptive influences cannot impair the function of the system.

The guide sections 32*c* are formed as elongated holes, wherein the elongated holes are preferably of involute form.

Figure 37:
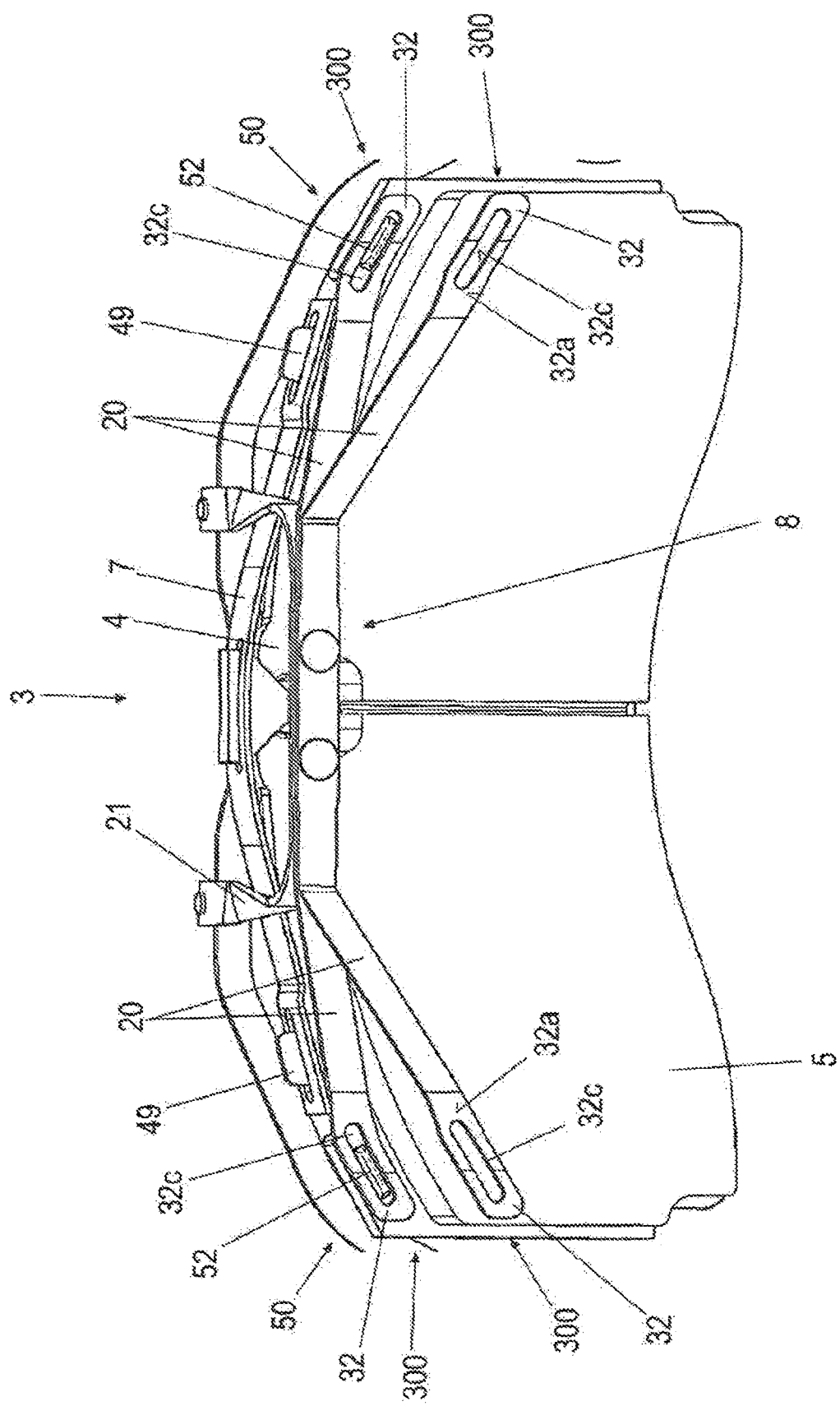
Figure 38:
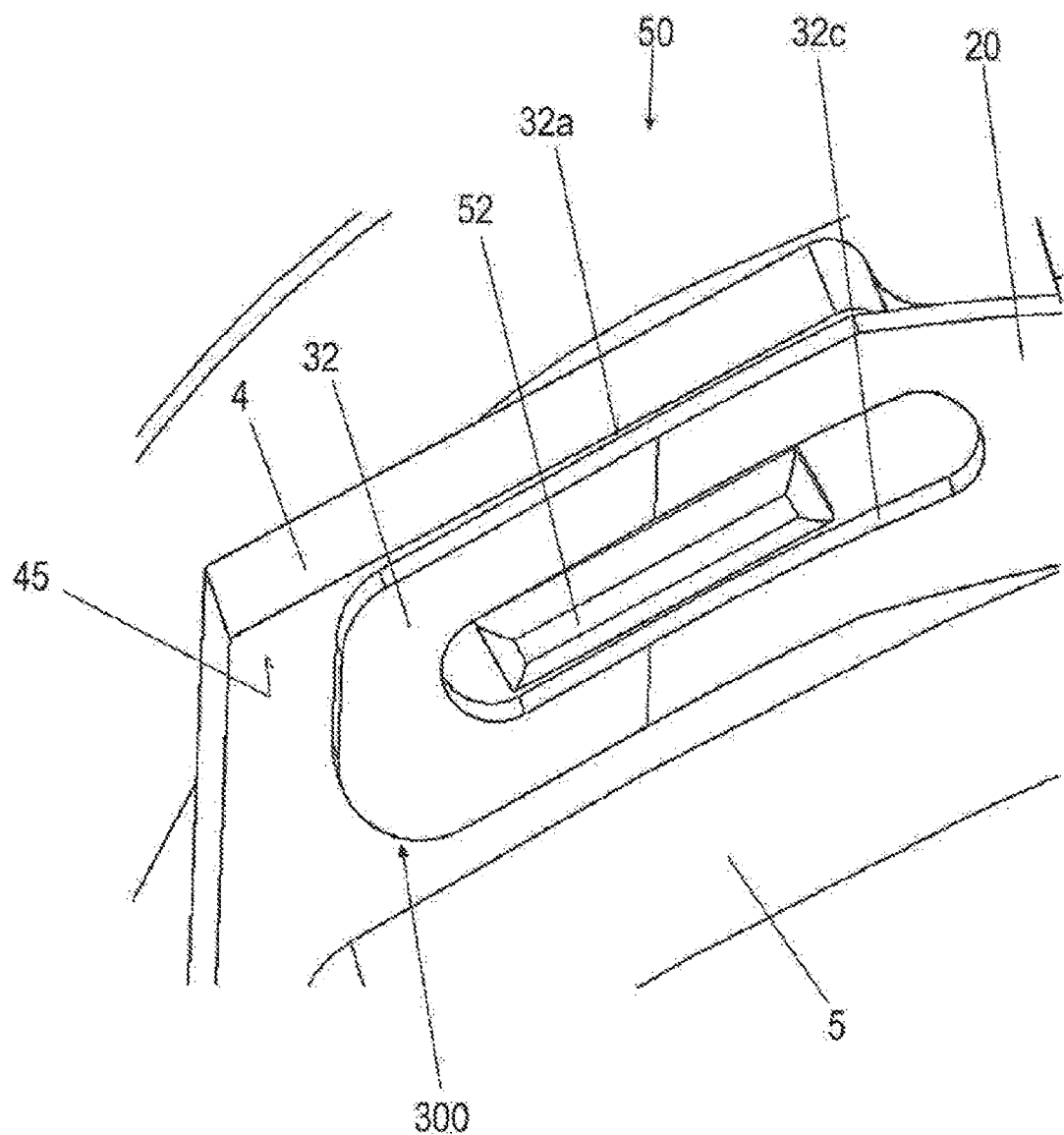

The contour 50 may also be of a form other than an interference contour. FIG. 37 thus shows a perspective view of a variant of the spreading device 8 as per FIG. 34. FIG. 38 shows an enlarged view of the thrust-imparting limb 32 with the contour 50, which in this variant is formed as a prismatic projection 52 with a rectangular outline.

In FIGS. 34 to 38, the contour 50 is formed in an axial direction, that is to say the contour 50 protrudes from the pad carrier plate 4 in a direction parallel to the brake disc axis of rotation 2*a*. It is also possible for the contour 50 to be provided as an interference contour in a radial and/or tangential direction relative to the brake disc 2 or relative to its brake disc axis of rotation 2*a*.

Figure 39:
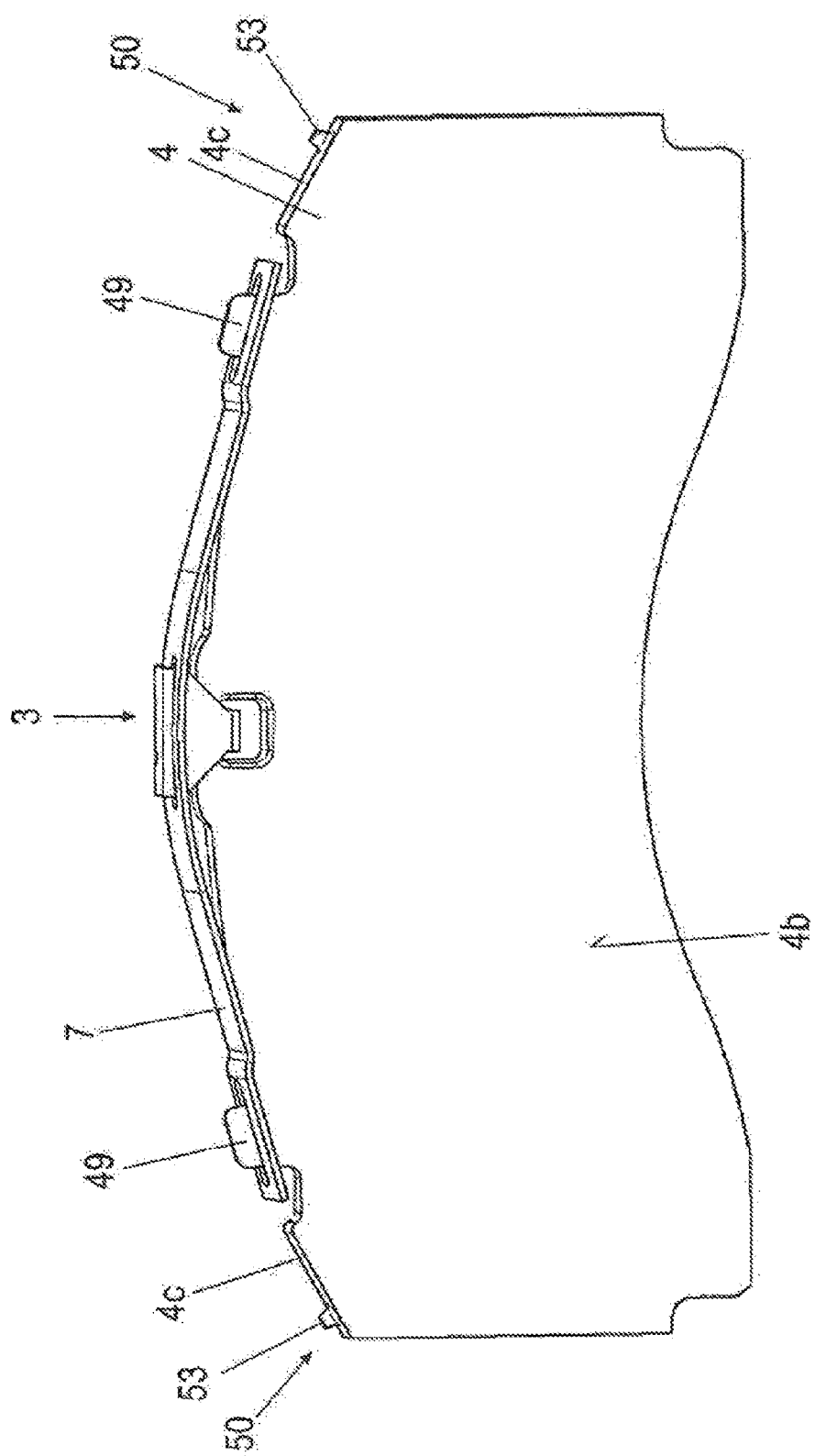

FIG. 39 shows contours 50 as interference contours formed in a radial direction. Here, projections 53 are formed on each upper corner of the pad carrier plate 4, on in each case one oblique bearing surface 4*c* of the top side of the pad carrier plate 4.

Figure 40:
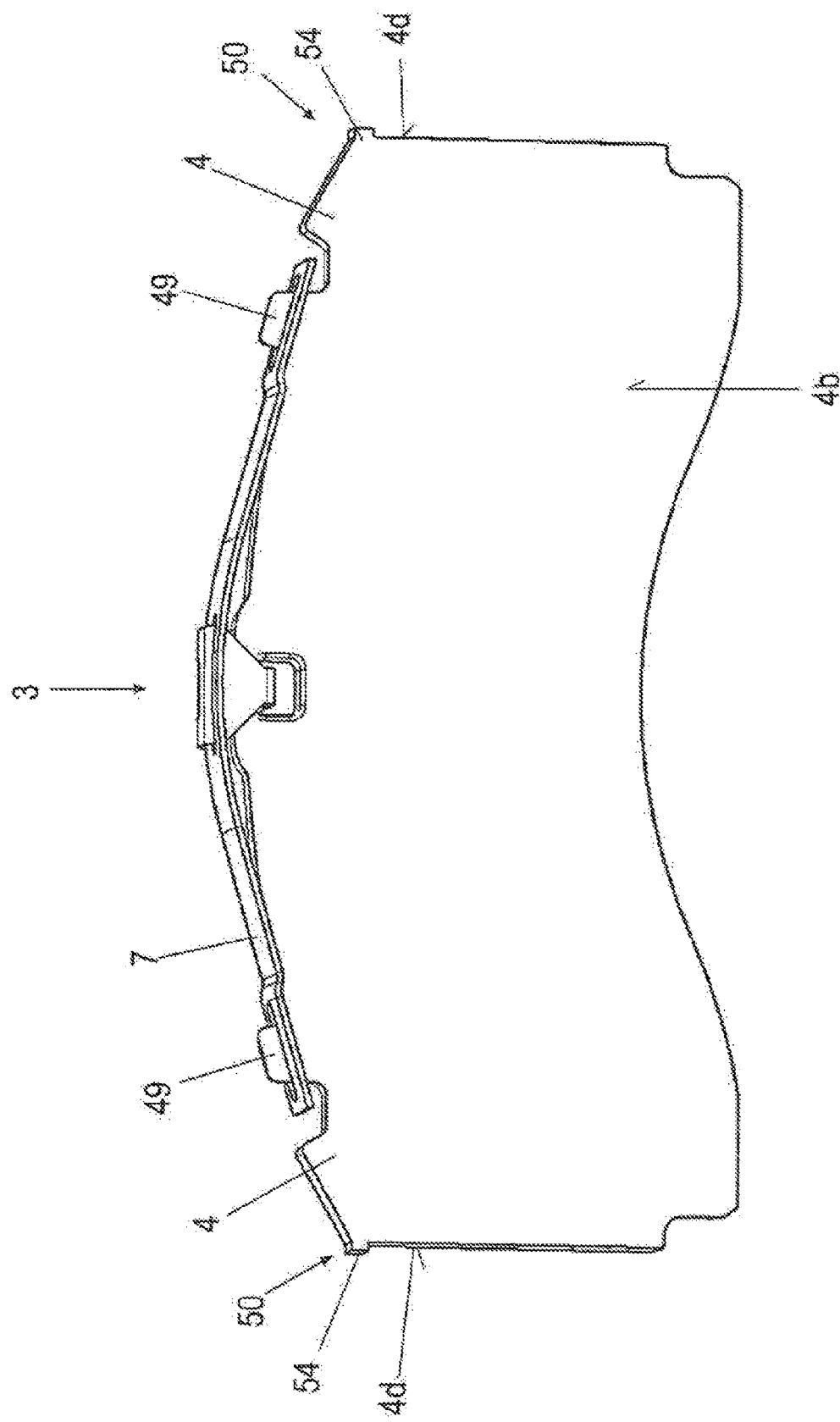

FIG. 40 illustrates contours 50 in a tangential direction. Here, projections 54 are likewise integrally formed on each upper corner, but in each case on a side surface 4*d*.

Figure 41:
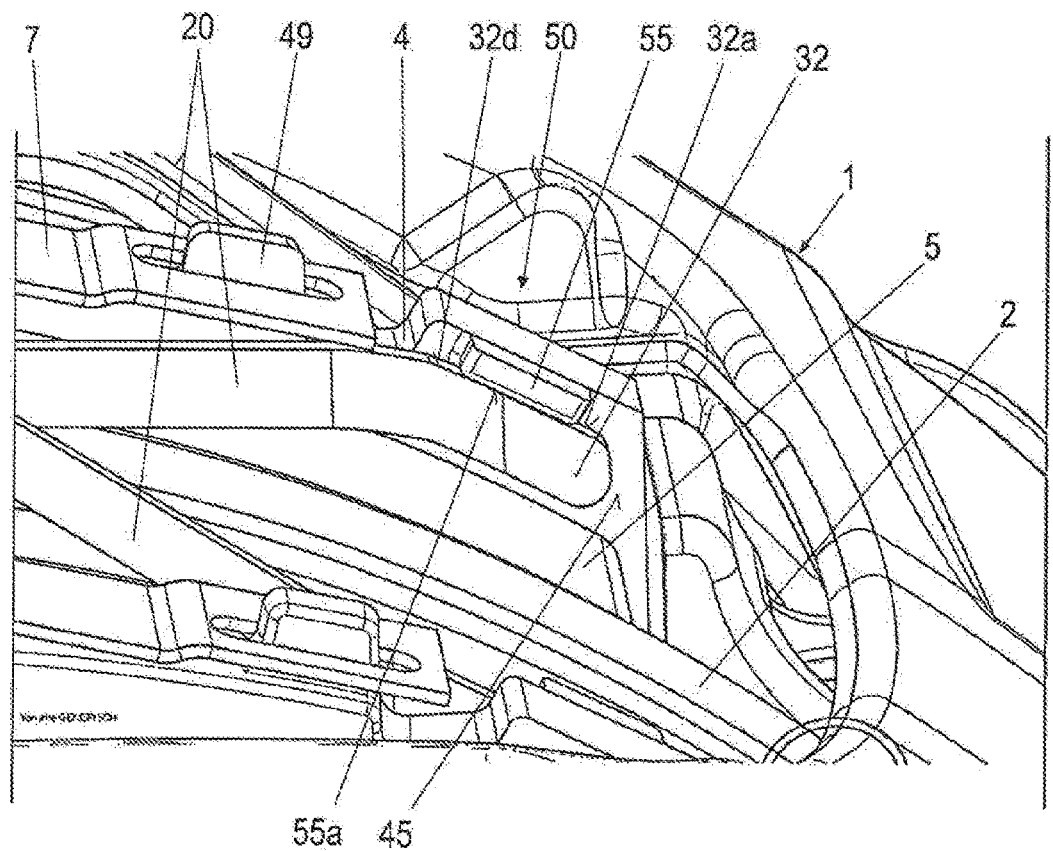

A further variant is shown in FIG. 41. In this variant, a contour 50 is applied as a cuboidal guide projection 55 below an upper edge of a corner region of the pad carrier plate 4, on the pad side 4*b* thereof. A lower side of the guide projection 55, as guide surface 55*a*, is in contact with an upper surface of a second abutment section 32*d* of the thrust-imparting limb 32. The guide surface 55*a* runs approximately at right angles to the abutment surface 45 of the pad carrier plate 4. Here, the thrust-imparting limb 32 has no guide opening 32*c* but is in contact, by way of its first abutment section 32*a* (see also FIG. 13), with the abutment surface 45. This is contact in an axial direction, whereas the abutment section 32*d* is fixed in a radial direction by the guide projection 55. The first abutment section 32*a* lies at right angles to the second abutment section 32*d*, which is formed in a simple manner by the upper side surface of the thrust-imparting limb 32. The abutment section 32*d* can thus move in a lateral direction relative to the guide section.

Furthermore, the contour 50 may be designed in any form, and may also be of recessed or raised form. In the case of a recessed contour 50, it is accordingly the case that the thrust-imparting limb 32 of the spring arm 50 is designed with a suitable guide contour of the guide section 32*c*. The number of provided contours 50 may vary depending on the embodiment.

The contour 50 may also form a pad coding. For example, the application-side brake pad 3 may have the pegs 51 as contour 50, wherein the rear-side brake pad 3 has the prismatic projections 52.

Figure 42:
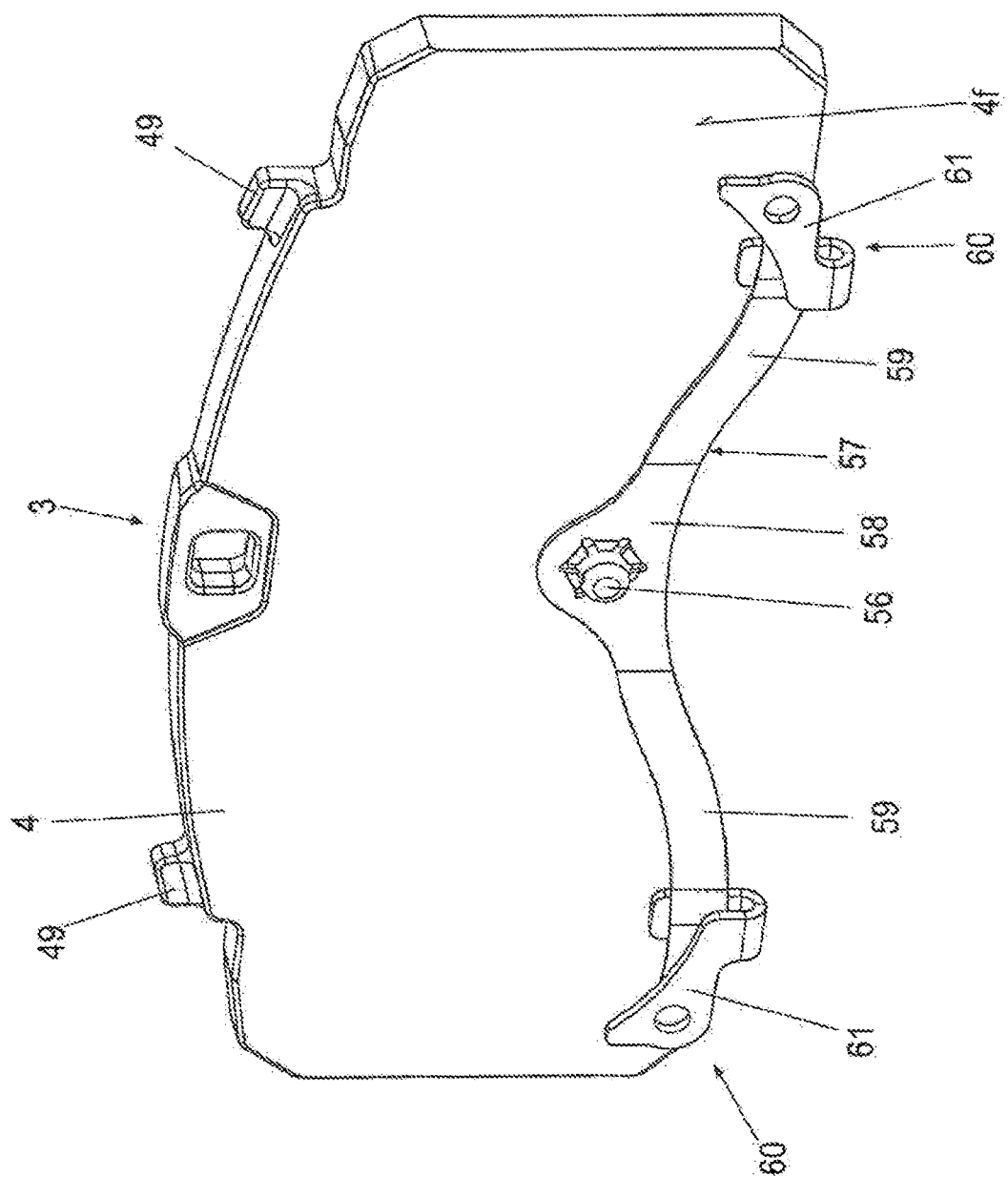
Figure 43:
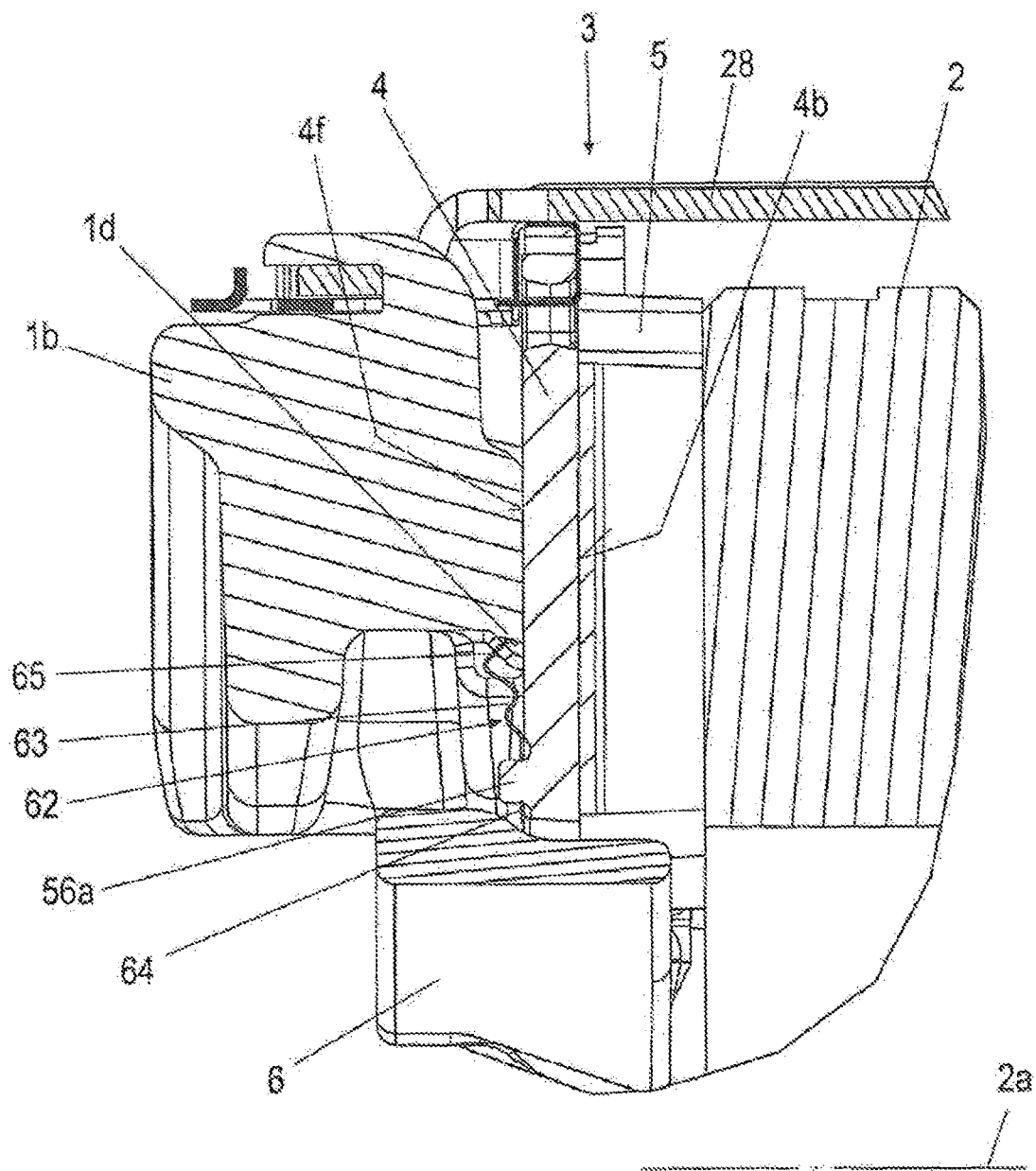

FIGS. 42-44 show views of a yet further exemplary embodiment of the disc brake 300 having a spreading device with additional resetting elements.

FIG. 42 shows a perspective view of a thrust side 4*f* of the pad carrier plate 4 of the application-side or inner brake pad 3 with a resetting element 57. FIG. 43 shows a sectional view, in a plane running through the brake disc axis of rotation 2*a*, of the disc brake with the rear-side or outer brake pad 3 with a further resetting element 62. FIG. 44 illustrates a variant of the spreading device 8 with attached resetting elements 66, 67 in a sectional view in a plane, running through the brake disc axis of rotation 2*a*, of the disc brake with the brake pads 3.

The thrust side 4*f* of the pad carrier plate 4 is that side of the pad carrier plate 4 which does not bear a friction pad 5, and which is in contact either with the application device or with the caliper rear section 1*b*.

The resetting elements 57, 62; 66, 67 each provide assistance of the resetting of the brake pads 3 from the brake disc 2 after a braking process. Here, the resetting elements 57, 62; 66, 67 engage with a section in a lower region on the respective pad carrier plate 4 in addition to the engagement point(s) at the top side of the spring arms 20, wherein said resetting elements are connected with a different section to a section positionally static relative thereto, for example brake caliper 1 and/or brake carrier.

For this purpose, the resetting element 57 in the embodiment as per FIG. 42 is fastened, with a section in a lower region of the pad carrier plate 4 on the thrust side 4*f* thereof, to a retaining section 56, which in this case is formed as a pin or peg-like projection. Furthermore, the resetting element 57 is attached with a further section in a lower region of the base plate 1*e* (see FIG. 29) of the application section 1*a* of the brake caliper 1.

Here, the resetting element 57 is a spring element with a central section 58, two spring arms 59 and two fastening sections 60 with in each case one U-shaped lug 61. The central section 58 is connected centrally to the retaining section 56 by means of a clamping/claw-type connection. At each side, the central section 58 transitions symmetrically into the respective spring arm 59. Each spring arm 59 extends to the left and to the right from the central section 58 in a lower region along the pad carrier plate 4, and is shaped correspondingly to the contour thereof. The ends of each spring arm 59 are connected in each case to the fastening section 60. Each fastening section 60 is shaped such that the bends of the U shapes are aligned with one another and lie in a tangential direction with respect to the brake disc axis of rotation 2*a*. That limb of the fastening sections 60 which points in each case toward the base plate 1*e* runs outward as a lug 61 and widens so as to have in each case one fastening bore for the fixing, by means of existing screws of the base plate 1*e*, to said base plate.

The rear-side brake pad 3 is equipped with the further resetting element 62, as shown in FIG. 43.

The further resetting element 62 is formed as a type of leaf spring with a spring body 63 with in each case one spring end 64, 65. One spring end 64 is articulated, in a lower region of the outer pad carrier plate 4 on the thrust side 4*b* thereof, on a retaining section 56*a*, for example an eyelet. The other spring end 65, with a suitable design, digs into a fastening section 1*d* of the caliper rear section 1*b* of the brake caliper 1.

In this way, the resetting elements 57, 62 each exert a pulling force in the direction of the brake disc axis of rotation 2*a* pointing away from the brake disc 2, whereby, after every braking process, the brake pads 3 are acted on with a force for a resetting action in the lower region by the resetting elements 57, 62 as well as by the spring arms 20 of the spreading device 8.

In the embodiment as per FIG. 44, two mutually oppositely situated resetting elements 66, 67 in spring form, for example leaf and/or wire springs, are fastened in each case with one end to the central section 26*a* of the retaining bow 21 of the spreading device 8. From said fastening point, each resetting element 66, 67 extends downwardly in an arc in the direction of the brake disc axis of rotation 2*a* as far as into the region of a lower region of each brake pad 3. Each resetting element 66, 67 has a free end with in each case one thrust-imparting limb 66*a*, 67*a*, and is arranged in each case in an elongate intermediate space between friction pad 3 and the pad side 4*b* of the pad carrier plate 4, wherein the thrust-imparting limbs 66*a*, 67*a* are each case in contact with the respective pad carrier plate 4. In this embodiment, the resetting elements 66, 67 each exert a thrust force in the direction of the brake disc axis of rotation 2*a* pointing away from the brake disc 2, whereby, after every braking process, the brake pads 3 are acted on with a force for a resetting action in the lower region by the resetting elements 66, 67 as well as by the spring arms 20 of the spreading device 8.

It is also possible for the resetting elements 57, 62; 66, 67 to be attached for example to the pad retaining stirrup 28 and/or to the attachment sections thereof.

The invention is not restricted by the exemplary embodiments described above. It may be modified within the scope of the appended claims.

It is for example conceivable that, in a further variant, which is not illustrated but which is easily imaginable, of the spreading device 8 as per FIGS. 30, 31, 32 or FIGS. 34, 37, the spring ends 300 are mounted with the thrust-imparting limbs 32 over the projections 49 over the pad retaining springs 7. In other words, the projections 49 extend through the guide openings 32c, which are adapted correspondingly to the projections 49, of the respective thrust-imparting limbs 32 of the spring arms 20, wherein the spring arms 20 are shaped correspondingly for this purpose.

LIST OF REFERENCE DESIGNATIONS

1 Brake caliper
1a Application section
1b Caliper rear section
1c Tension strut
1d Fastening section
1e Base plate
2 Brake disc
2a Brake disc axis of rotation
3 Brake pad
4 Pad carrier plate
4a Receiving hole
4b Pad side
4c Contact surface
4d, 4e Side surface
4f Thrust side
5 Friction pad
6 Brake carrier
7 Pad retaining spring
7a Clip element
8 Spreading device
9 Flat spring
10 Slot
11 Lug
11a Thrust section
12 Stirrup
13 Securing means
14 Spring stirrup
14a Fastening end
15 Bracket
15a, 15b Longitudinal side
15c Fastening hole
16 Scissor element
17 Leaf spring
18 Spring limb
19 Abutment
20 Spring arm
20a Fastening section
20b Connecting section
21 Retaining bow
22 Abutment limb
22a Fastening end
23 Dome
24 Abutment stirrup
Brake carrier horn
25a Bore
26 Center limb
26a Central section
26b Widened portion
26c Securing element
26d Groove
27 End limb
27a Fastening section
28 Pad retaining stirrup
29 Lug
30 Peg
31 Support limb
31a Bearing section
32 Thrust-imparting limb
32a Abutment section
32b Bearing section
32c Guide opening
32d Abutment section
33 Nut
34 Support lug
35 Pin
36 Support surface
37 Attachment web
38 Spring web
39 Angled lug
39a Support leg
39b Thrust-imparting limb
40 Retaining plate
41 Opening
42 Base section
43 Connecting section
44 Support section
45 Abutment surface
46 Bearing surface
47 Pin
48 Elongated hole
49 Projection
50 Contour
51 Peg
51a Casting radii
52, 53, 54 Projection
55 Guide projection
55a Guide surface
56, 56a Retaining section
57 Resetting element
58 Central section
59 Spring arm
60 Fastening section
61 Lug
62 Resetting element
63 Spring body
64, 65 Spring end
66, 67 Resetting element
66a, 67a Spring end
100 Disc brake
150 Connection
151, 152 Mount
200 Connecting section
201 Recess
202 Hood-type connector
202a Longitudinal connector
203 Spacing
220 Connecting bend
300 Spring end
301 Slot
302 Movement direction
303 Abutment surface
304 Projection
305 Bearing surface
306 Angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
a brake caliper which engages over a brake disc and which is in the form of a sliding caliper and which is fastened to a positionally static brake carrier and which has a central opening over the brake disc,
two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and
at least one resetting device by which the brake caliper can be reset after a braking-induced displacement and release of the brake, wherein
the resetting device has a spreading device which engages on the opposite brake pads and which acts equally counter to the respective application direction and which has resilient spreading elements which engage on the respective pad carrier plate,
the spreading device is arranged in the central opening,
the spreading elements engage, outside the friction pads, directly or indirectly on one side at at least two abutment regions arranged spaced apart from one another relative to the center, of the brake pads, wherein the abutment regions have in each case one abutment surface and one bearing surface on which the spreading elements are movably arranged,
the spreading device has spring arms, of which in each case two lie against an associated pad carrier plate, wherein the spring arms are connected to one another in the central region of the opening, and
the spring arms are connected to a retaining bow which is attached to the brake carrier.

2. The disc brake as claimed in claim 1, wherein
the retaining bow is attached to two mutually oppositely situated stirrups which are connected to the brake carrier.

3. The disc brake as claimed in claim 1, wherein
the retaining bow is connected to two brake carrier horns which delimit a pad slot, wherein the retaining bow is of C-shaped form with two mutually oppositely situated end limbs and with a center limb.

4. The disc brake as claimed in claim 3, wherein
the end limbs have in each case one lug into which pegs of the brake carrier horns are inserted.

5. The disc brake as claimed in claim 1, wherein
the spring arms and/or a retaining bow are/is supported in a radial direction on the brake carrier.

6. The disc brake as claimed in claim 1, wherein
each spring arm is formed, at the end, with a fork-shaped spring end such that a support limb and a thrust-imparting limb are formed, wherein the support limb lies movably on a bearing surface of a narrow side of the pad carrier plate, and the thrust-imparting limb lies movably with pressure against an abutment surface of that side of the pad carrier plate which faces toward the friction pad.

7. The disc brake as claimed in claim 6, wherein
the bearing surface is arranged at an angle with respect to a horizontal, wherein the angle lies in a range from 3 to 15°.

8. The disc brake as claimed in claim 7, wherein
the abutment surface protrudes from the pad carrier plate or is formed into the pad carrier plate.

9. The disc brake as claimed in claim 6, wherein
a projection is provided on the abutment surface, wherein the projection protrudes from the abutment surface into a slot between the support limb and the thrust-imparting limb.

10. The disc brake as claimed in claim 1, wherein
each spring arm is formed, at the end, with a spring end with a thrust-imparting limb, wherein the thrust-imparting limb is in contact with a support section of that side of the pad carrier plate which faces toward the friction pad,
the thrust-imparting limb, by way of an abutment section, lies movably with pressure against an abutment surface of the support section of the pad carrier plate, and at the same time, by way of a bearing section, lies movably on a bearing surface of the support section of the pad carrier plate.

11. The disc brake as claimed in claim 10, wherein
a thrust-imparting limb and a support limb at right angles thereto are formed in the manner of an angled lug.

12. The disc brake as claimed in claim 11, wherein
the support section with the abutment surface and the bearing surface is formed into the pad carrier plate.

13. The disc brake as claimed in claim 1, wherein
the spring arm is, in the abutment region against the pad carrier plate, of convex form on the side facing toward the abutment surface.

14. The disc brake as claimed in claim 1, wherein
at least those spring arms which are assigned to one brake pad have, at the end, a spring web, which lies against the pad carrier plate, and an attachment web, which is connected to the brake carrier.

15. The disc brake as claimed in claim 1, wherein
each spring arm is formed, at the end, with a spring end with a fastening section which, in its longitudinal direction, is formed with an elongated hole which is a guide section for the spring end of the spreading device.

16. The disc brake as claimed in claim 15, wherein
each fastening section lies in each case on a bearing surface of a respective pad carrier plate, wherein the elongated holes of each fastening section interact in each case with an abutment section of the pad rear plate.

17. The disc brake as claimed in claim 16, wherein
a pin fixedly connected to the pad carrier plate has the abutment surface, which interacts with the respective elongated hole, of the pad carrier plate, wherein the bearing surfaces run in each case tangentially with respect to the brake disc and lie in a plane.

18. The disc brake as claimed in claim 16, wherein
the elongated holes form a guide opening which interacts with a contour of the pad carrier plate, wherein the contour is formed as a peg or a projection.

19. The disc brake as claimed in claim 18, wherein
the contour protrudes from the pad carrier plate in an axial direction, in a radial direction and/or in a tangential direction relative to the brake disc.

20. The disc brake as claimed in claim 19, wherein
the contour is a projection which forms a retainer for a pad retaining spring.

21. The disc brake as claimed in claim 1, wherein
each spring arm is formed, at the end, with a spring end with a thrust-imparting limb, wherein the thrust-imparting limb is in contact with a guide projection of that side of the pad carrier plate which faces toward the friction pad,
the thrust-imparting limb, by way of a first abutment section, lies movably with pressure against an abutment surface of the pad carrier plate, and at the same time, by way of a second abutment section arranged at right angles to the first abutment section, lies movably on a guide surface of the guide projection.

22. The disc brake as claimed in claim 21, wherein
the guide projection is of cuboidal form and is arranged below an upper edge of a corner region of the pad carrier plate on the pad side thereof.

23. A disc brake for a commercial vehicle, comprising:
a brake caliper which engages over a brake disc and which is in the form of a sliding caliper and which is fastened to a positionally static brake carrier and which has a central opening over the brake disc,
two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and
at least one resetting device by which the brake caliper can be reset after a braking-induced displacement and release of the brake, wherein
the resetting device has a spreading device which engages on the opposite brake pads and which acts equally counter to the respective application direction and which has resilient spreading elements which engage on the respective pad carrier plate,
the spreading device is arranged in the central opening,
the spreading device has spring arms,
the spring arms are connected to a retaining bow which is attached to the brake carrier, and
the spring arms are arranged in pairwise fashion in a transverse direction of the opening.

24. A disc brake for a commercial vehicle, comprising:
a brake caliper which engages over a brake disc and which is in the form of a sliding caliper and which is fastened to a positionally static brake carrier and which has a central opening over the brake disc,
two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and
at least one resetting device by which the brake caliper can be reset after a braking-induced displacement and release of the brake, wherein
the resetting device has a spreading device which engages on the opposite brake pads and which acts equally counter to the respective application direction and which has resilient spreading elements which engage on the respective pad carrier plate,
the spreading device is arranged in the central opening,
the spreading device has spring arms,
the spring arms are connected to a retaining bow which is attached to the brake carrier, and
respective ends of the spring arms are formed as a downwardly bent fastening section and the fastening section is received in a respective receiving hole of the respective pad carrier plate.

\* \* \* \* \*